United States Patent
Le

(10) Patent No.: US 10,004,060 B2
(45) Date of Patent: Jun. 19, 2018

(54) SCHEDULING SYSTEMS AND METHODS FOR WIRELESS NETWORKS

(71) Applicant: Conversant Intellectual Property Management Incorporated, Ottawa (CA)

(72) Inventor: Khiem Le, Coppell, TX (US)

(73) Assignee: Conversant Intellectual Property Management Inc., Ottawa (CA)

( * ) Notice: Subject to any disclaimer, the term of this patent is extended or adjusted under 35 U.S.C. 154(b) by 240 days.

(21) Appl. No.: 14/666,799

(22) Filed: Mar. 24, 2015

(65) Prior Publication Data

US 2015/0282148 A1   Oct. 1, 2015

Related U.S. Application Data

(60) Provisional application No. 61/970,105, filed on Mar. 25, 2014.

(30) Foreign Application Priority Data

May 19, 2014 (GB) .................................. 1408817.3
May 19, 2014 (GB) .................................. 1408865.2

(51) Int. Cl.
*H04W 72/04* (2009.01)
*H04W 76/04* (2009.01)

(52) U.S. Cl.
CPC ........ *H04W 72/0406* (2013.01); *H04W 76/04* (2013.01)

(58) Field of Classification Search
CPC ...................................................... H04L 5/003
See application file for complete search history.

(56) References Cited

U.S. PATENT DOCUMENTS 8,493,920 B2   7/2013   Park et al.
8,611,221 B2   12/2013   Cai et al.
(Continued)

FOREIGN PATENT DOCUMENTS

WO   2013017154   2/2013

OTHER PUBLICATIONS

Rajan, Karthik, "Dynamic Scheduling, Persistent Scheduling and Semi Persistent Scheduling in LTE", Sep. 23, 2011, http://lte-research.blogspot.ca/2011/09/dynamic-scheduling-persistent.html.
(Continued)

*Primary Examiner* — Shukri Taha
(74) *Attorney, Agent, or Firm* — Borden Ladner Gervais LLP

(57) ABSTRACT

In one embodiment, a method is performed by a base station in a wireless network. The method includes receiving from a user device a request to reconfigure already-active uplink semi-persistent scheduling (SPS). The already-active uplink SPS grants the user device a resource block allocation (RBA) and a modulation and coding scheme (MCS) for periodic uplink transmissions. The already-active uplink SPS includes a time-interval parameter, the time-interval parameter specifying a time interval between the periodic uplink transmissions. The request includes information related to a proposed adjustment of the time-interval parameter. The method further includes reconfiguring the already-active uplink SPS. The reconfiguring includes modifying the time-interval parameter based, at least in part, on the information.

19 Claims, 27 Drawing Sheets

(56) References Cited

U.S. PATENT DOCUMENTS

| | | |
|---|---|---|
| 2010/0113058 A1 | 5/2010 | Wu |
| 2011/0038334 A1 | 2/2011 | Huang et al. |
| 2012/0069805 A1* | 3/2012 | Feuersanger ..... H04W 72/1284 |
| | | 370/329 |
| 2012/0314680 A1 | 12/2012 | Kela |
| 2013/0142140 A1 | 6/2013 | Tseng et al. |
| 2013/0308610 A1* | 11/2013 | Bergstrom ............ H04W 56/00 |
| | | 370/336 |
| 2013/0343265 A1 | 12/2013 | Ehsan et al. |
| 2014/0177487 A1* | 6/2014 | Hammarwall .... H04W 72/1289 |
| | | 370/280 |

OTHER PUBLICATIONS

3GPP, "3GPP TS 36.321 V11.3.0", Jun. 2013, 3rd Generation Partnership Project; Technical Specification Group Radio Access Network; Evolved Universal Terrestrial Radio Access (E-UTRA); Medium Access Control (MAC) protocol specification, Release 11, France.

Bormann, et al., "RObust Header Compression (ROHC): Framework and four profiles: RTP, UDP, ESP, and uncompressed", The Internet Society, Jul. 2001.

* cited by examiner

SF: SUBFRAME
q = *Starting_SF_UL*
p = *New_semiPersistSchedIntervalUL*
FOR SIMPLICITY, HARQ FEEDBACKS AND RETRANSMISSIONS ARE NOT SHOWN

SCHEDULING SYSTEMS AND METHODS FOR WIRELESS NETWORKS

CROSS-REFERENCE TO RELATED APPLICATIONS

This patent application claims priority from, and incorporates by reference the entire disclosure of, U.S. Provisional Patent Application No. 61/970,105, filed Mar. 25, 2014. This patent application claims priority from, and incorporates by reference the entire disclosure of, U.K. Patent Application No. 1408865.2, filed May 19, 2014 and U.K. Patent Application No. 1408817.3, filed May 19, 2014.

BACKGROUND

Technical Field

The present disclosure relates generally to wireless networks and more particularly, but not by way of limitation, to scheduling systems and methods for wireless networks.

History of Related Art

In Long Term Evolution (LTE) networks, scheduling decisions are normally dynamic. That is, every transmission time interval (TTI) (e.g., 1 millisecond), a base station can decide which wireless devices will be allocated resources for transmission in the uplink and downlink, along with the transmission parameters such as modulation, coding, antennas, etc. Since the scheduling decision can change every TTI, it has to be signaled to the wireless devices every TTI. While dynamic scheduling can be well suited for bursty data applications, it has some disadvantages for voice. Voice is natively carried in LTE networks as Voice over Internet Protocol (VoIP) packets, which have a small payload (e.g., 20-50 bytes). Due to the small payload, the relative overhead resulting from the dynamic scheduling signaling can be very high.

SUMMARY OF THE INVENTION

In one embodiment, a method is performed by a base station in a wireless network. The method includes receiving from a user device a request to reconfigure already-active uplink semi-persistent scheduling (SPS). The already-active uplink SPS grants the user device a resource block allocation (RBA) and a modulation and coding scheme (MCS) for periodic uplink transmissions. The already-active uplink SPS includes a time-interval parameter, the time-interval parameter specifying a time interval between the periodic uplink transmissions. The request includes information related to a proposed adjustment of the time-interval parameter. The method further includes reconfiguring the already-active uplink SPS. The reconfiguring includes modifying the time-interval parameter based, at least in part, on the information.

In one embodiment, a method is performed by a user device in a wireless network. The method includes identifying a proposed adjustment to a time-interval parameter of already-active uplink semi-persistent scheduling (SPS). The already-active uplink SPS grants the user device a resource block allocation (RBA) and a modulation and coding scheme (MCS) for periodic uplink transmissions. The already-active uplink SPS comprises a time-interval parameter, the time-interval parameter specifying a time interval between the periodic uplink transmissions. In addition, the method includes transmitting to a base station a request to reconfigure the already-active uplink SPS, the request comprising information related to the proposed adjustment.

In one embodiment, a method is performed by a base station in a wireless network. The method includes receiving from a user device a request to reconfigure already-active uplink semi-persistent scheduling (SPS) to accommodate at least one packet-size change. The already-active uplink SPS includes a modulation and coding scheme (MCS) and a resource block allocation (RBA) for periodic uplink transmissions. The request includes information related to a size of each of one or more future uplink packets. The method further includes reconfiguring the already-active uplink SPS. The reconfiguring includes modifying at least one of the RBA and the MCS to accommodate at least a next packet of the one or more future uplink packets.

In one embodiment, a method is performed by a user device in a wireless network. The method includes determining at least one packet-size change in one or more future uplink packets. The method further includes transmitting to a base station a request to reconfigure already-active uplink SPS to accommodate the at least one packet-size change. The already-active uplink SPS includes a modulation and coding scheme (MCS) and a resource block allocation (RBA) for periodic uplink transmissions. The request includes information related to a size of the one or more future uplink packets.

In one embodiment, a method is performed by a base station in a wireless network. The method includes detecting a trigger, by a user device subject to already-active uplink semi-persistent scheduling (SPS), of a SPS-reconfiguration event. The already-active uplink SPS grants the user device a resource block allocation (RBA) and a modulation and coding scheme (MCS) for periodic uplink transmissions. The already-active uplink SPS comprises a time-interval parameter, the time-interval parameter specifying a time interval between the periodic uplink transmissions. The detected trigger comprises transmission by the user device of one or more empty packets. The SPS-reconfiguration event is associated with a preconfigured adjustment to at least one configuration parameter of the already-active uplink SPS. The method further includes reconfiguring the already-active uplink SPS based, at least in part, on the preconfigured adjustment.

In one embodiment, a method is performed by a user device in a wireless network. The method includes identifying at least one configuration parameter of already-active uplink semi-persistent scheduling (SPS) for adjustment. The already-active uplink SPS grants the user device a resource block allocation (RBA) and a modulation and coding scheme (MCS) for periodic uplink transmissions. The already-active uplink SPS comprises a time-interval parameter, the time-interval parameter specifying a time interval between the periodic uplink transmissions. The method further includes, responsive to the identifying, triggering a SPS-reconfiguration event. The triggering includes transmitting to a base station one or more empty packets. The SPS-reconfiguration event is associated with a preconfigured adjustment to the at least one configuration parameter.

In one embodiment, a method is performed by a base station in a wireless network. The method includes, responsive to a reconfiguration determination, reconfiguring already-active downlink semi-persistent scheduling (SPS) to accommodate a plurality of non-uniformly-sized future downlink packets. The already-active downlink SPS grants a user device a resource block allocation (RBA) and a modulation and coding scheme (MCS) for periodic downlink transmissions. The already-active downlink SPS includes a time-interval parameter, the time-interval parameter specifying a time interval between the periodic downlink transmissions. The method further includes sending to the user device a notification of the reconfigured already-active downlink SPS, the notification including information related to a size of each of the plurality of non-uniformly-sized future downlink packets.

In one embodiment, a method is performed by a user device in a wireless network. The method includes receiving from a base station a notification of reconfigured downlink semi-persistent scheduling (SPS). The reconfigured downlink SPS reconfigures already-active downlink SPS to accommodate a plurality of non-uniformly-sized future downlink packets. The already-active downlink SPS grants the user device a resource block allocation (RBA) and a modulation and coding scheme (MCS) for periodic downlink transmissions. The already-active downlink SPS comprises a time-interval parameter, the time-interval parameter specifying a time interval between the periodic downlink transmissions. The notification includes information related to a size of each of the plurality of non-uniformly-sized future downlink packets. In addition, the method includes implementing the reconfigured downlink SPS.

In one embodiment, a method is performed by a base station in a wireless network. The method includes, responsive to a reconfiguration determination, reconfiguring already-active downlink semi-persistent scheduling (SPS). The reconfiguring includes modifying a time-interval parameter of the already-active downlink SPS. The already-active downlink SPS grants a user device a resource block allocation and a modulation and coding scheme (MCS) for periodic downlink transmissions. The time-interval parameter specifies a time interval between the periodic downlink transmissions. The method further includes sending to the user device a notification of the reconfigured already-active downlink SPS. In addition, the method includes determining one or more times when the user device should send a channel status report (CSR) to the base station based, at least in part, on the modified time-interval parameter. The method also includes transmitting to the user device information sufficient to identify the determined one or more times.

In one embodiment, a method is performed by a user device in a wireless network. The method includes receiving, from a base station, a notification of reconfigured downlink SPS. The reconfigured downlink SPS reconfigures already-active downlink SPS. The already-active downlink SPS grants the user device a resource block allocation (RBA) and a modulation and coding scheme (MCS) for periodic downlink transmissions. The already-active downlink SPS includes a time-interval parameter, the time-interval parameter specifying a time interval between the periodic downlink transmissions. The reconfigured downlink SPS includes a modified time-interval parameter. The method further includes receiving from the base station information sufficient to identify one or more times at which a channel status report (CSR) should be sent.

The above summary is not intended to represent each embodiment or every aspect of the present disclosure.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION OF ILLUSTRATIVE EMBODIMENTS

Figure 1:
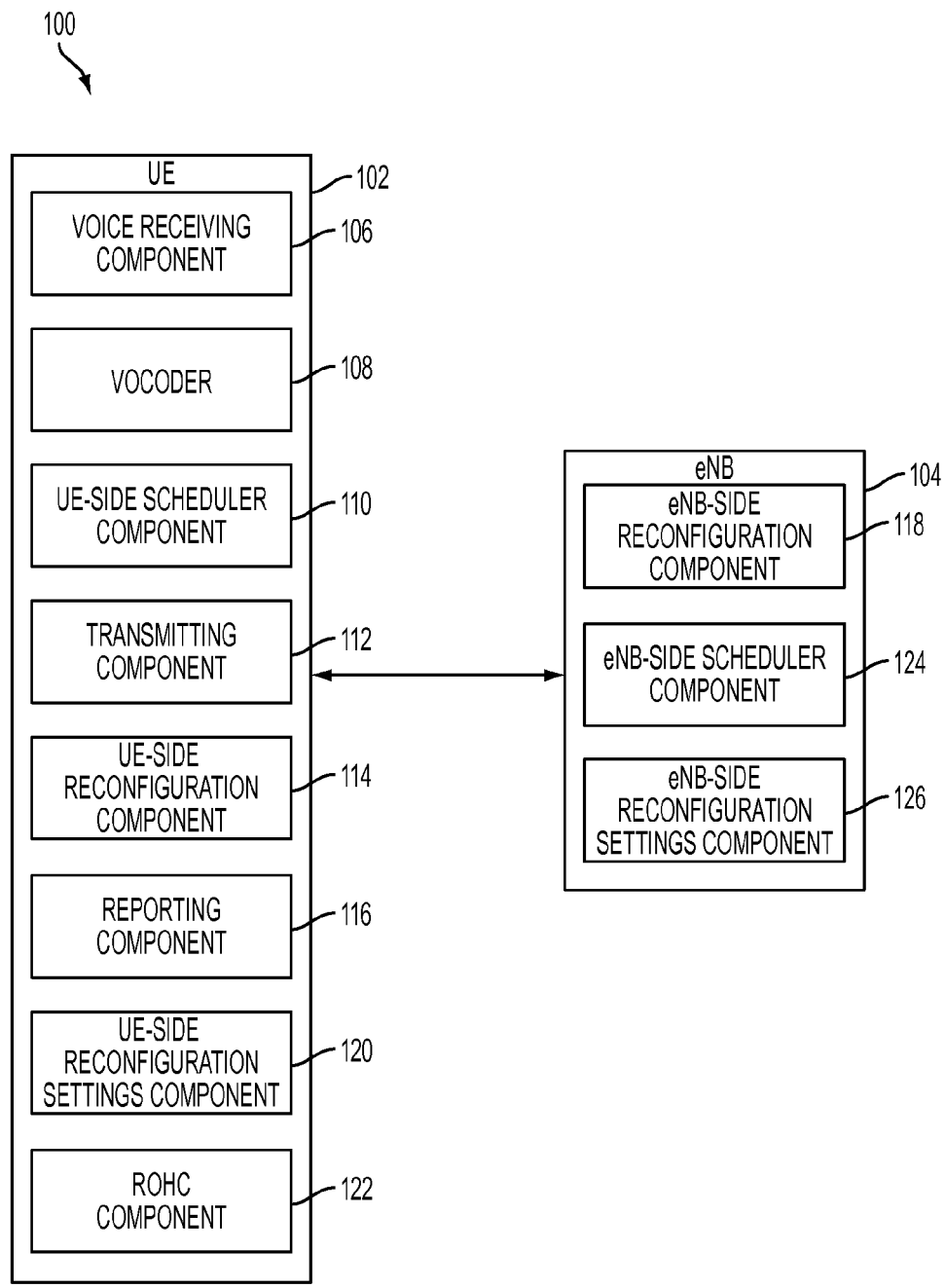
FIG. 1 illustrates an example of a wireless communication system that can facilitate SPS reconfiguration.

In wireless telecommunications systems, a base station can exchange signals with user equipment (UE) located in a geographical region known as a cell. A particular base station may also be referred to by those skilled in the art as an evolved Node B (eNB), a base transceiver station, a radio base station, a radio transceiver, a transceiver function, or as some other suitable term. For illustrative purposes, the term "eNB" may be periodically used herein in order to provide examples relative to Long Term Evolution (LTE) networks. However, it should be appreciated that each such utilization should be considered to further encompass meanings associated with any suitable term for a base station, including the illustrative terms listed above.

Examples of UEs include a cellular phone, a smart phone, a wearable or body-borne computer, a session initiation protocol (SIP) phone, a desktop computer, a laptop computer, a tablet computer, a personal digital assistant (PDA), a global positioning system, a multimedia device, a video device, a digital audio player (e.g., MP3 player), a camera, a game console, a set-top box, or any other similar functioning device. A particular UE may also be referred to by those skilled in the art as a mobile station, a subscriber station, a mobile unit, a subscriber unit, a wireless unit, a remote unit, a mobile device, a wireless device, a wireless communications device, a user device, an end-user device, a remote device, a mobile subscriber station, an access terminal, a mobile terminal, a wireless terminal, a remote terminal, a handset, a user agent, a mobile client, a client, or as some other suitable term.

In order to reduce signaling overhead in LTE networks, the 3rd Generation Partnership Project (3GPP) LTE specifications have defined Semi-Persistent Scheduling (SPS). SPS can be activated by an eNB and can be applied to uplink (e.g., the UE is granted a transmission opportunity every mth transmission time interval (TTI) until further notice) as well as downlink (e.g., the UE expects to receive transmission from the network every pth TTI further notice). This periodic time interval (e.g., m TTIs or p TTIs) may be referred to herein as a time-interval parameter.

According to SPS, a resource is initially granted and then substantially the same resource is periodically used for subsequent data packets. That is, in SPS, the resource that an eNB provides for data packets on an uplink or downlink is allocated at regular intervals based on a grant and/or a single scheduling request (SR). An original grant of an SPS resource can be referred to as SPS activation. If, at a subsequent time, the eNB needs to reallocate an SPS resource with different parameters, the subsequent grant can be referred to as SPS reconfiguration.

An eNB typically grants an uplink or downlink resource to a UE by sending SPS activation/reconfiguration signaling to the user device over a control channel such as, for example, the physical downlink control channel (PDCCH) or enhanced PDCCH (ePDCCH). Among the data that the eNB might include in the SPS activation/reconfiguration signaling are the size of a resource block allocation (RBA), other parameters related to the resource allocation, such as a modulation and coding scheme (MCS) that will be used for the resource, a time-interval parameter that specifies a periodic time interval between transmissions (uplink or downlink, as applicable), etc.

An RBA may specify one or more resources (e.g., frequency and/or time) that may be used for communication by one or more devices of a communication network. For example, in LTE, the smallest modulation structure is a resource element. A resource element can be, for example, one 15 kHz subcarrier by one symbol. Resource elements can aggregate into resource blocks. In general, a resource block has dimensions of subcarriers by symbols. In an example, twelve consecutive subcarriers in the frequency domain and six or seven symbols in the time domain can form each resource block. In certain embodiments, a number of resource blocks assigned to a given UE can constitute its resource block allocation. In a typical embodiment, the MCS summarizes a modulation order (e.g., binary phase-shift keying (BPSK), quadrature phase-shift keying (QPSK), etc.) and a coding rate (e.g., a number of bits that can be transmitted in an allocated period of time). The coding rate can be determined as a function of the modulation order and the RBA. The MCS can be based on factors such as, for example, a channel quality indication (CQI) received from the UE.

A maximum size of a data packet can be derived from the SPS parameters described above. With SPS, scheduling signaling is generally only needed for the initial transmission. Subsequent transmissions can reuse the same scheduling decision as in the initial transmission and thereby avoid additional scheduling signaling. While SPS can help to reduce the signaling overhead, there are some disadvantages when it is used for voice traffic. A voice conversation alternates between talk spurts (when the user is talking) and silence intervals (when the user is listening). During a talk spurt, a speech packet may be issued by a vocoder every N milliseconds (ms). When the conversation transitions from a talk spurt to a silence interval, the vocoder may stop generating speech packets and start generating comfort-noise packets, which are sent at a lower periodicity (e.g., every K ms, with K>N). For example, for vocoders implementing Adaptive Multi-Rate (AMR) or Adaptive Multi-Rate Wideband (AMR-WB) codecs, it may be that K=160 and N=20.

In some embodiments, it may be advantageous to configure SPS with a time-interval parameter such that m=N during talk spurts and m=K during silence intervals. However, the eNB, and not the UE, typically makes scheduling decisions. At least with respect to uplink transmissions from the UE, the eNB is generally unaware of transitions from a talk spurt to a silence interval or from a silence interval to a talk spurt. To conserve radio resources when, for example, the UE transitions from a talk spurt to a silence interval, uplink SPS can be configured to be implicitly released when the UE transmits a certain number of consecutive empty packets (e.g., a media access control (MAC) protocol data unit (PDU) with no MAC service data unit (SDU)). The certain number can be specified, for example, in an implicit-release parameter of the uplink SPS.

One option is to configure the implicit-release parameter with a low value (e.g., 2) so that the uplink SPS is released easily. This option can result in significant signaling overhead. When another uplink packet needs to be transmitted by the UE, a procedure to acquire uplink resources is executed. The procedure can be similar to the following: (1) the UE sends a SR; (2) the eNB provides an uplink grant; (3) the UE sends a Buffer Status Report (BSR) to indicate its resource requirements; (4) the eNB provides an uplink grant; and (5) the UE sends the uplink packet. After SPS implicit release, if no new uplink SPS is activated, a similar procedure may be executed for every uplink packet.

Another option is to configure the implicit-release parameter with a high value so that the uplink SPS is released much less easily. However, resource waste can still result. Because transmission opportunities are maintained on a periodic basis, when there is no uplink data to send, an empty packet is typically transmitted at each opportunity. For example, upon transition from a talk spurt to a silence interval, the UE may transmit many empty packets without ever reaching the number of consecutive empty packets specified by the implicit-release parameter. The same scheduling decision that was made for the talk spurt remains in effect even though such resources may no longer be needed.

This option can also have other disadvantages such as unnecessarily causing UE battery drain and increased interference.

In addition to lacking an ability to adjust the time-interval parameter as described above, the eNB is also not typically able to adjust SPS, uplink or downlink, to accommodate variable packet sizes such as, for example, a set of non-uniformly-sized future packets. In general, a packet size can be a sum of a header size and a payload size. Packet-size fluctuation or changes can be caused by various factors that affect the header size, the payload size, or both.

For example, relative to voice traffic, packet headers can be much larger than packet payload (e.g., on the order of 40-60 bytes for headers and on the order of 20-50 bytes for payload). Robust header compression (ROHC) as defined, for example, in IETF RFC 3095, can be used in the LTE Packet Data Convergence Protocol (PDCP) layer to compress the packet headers before transmission over a radio interface. The size of the ROHC-compressed packet headers may fluctuate. By way of further example, adaptive codecs such as AMR or AMR-WB may also change a size of packet payloads. One option for addressing fluctuating packet sizes is to assign, at the time of SPS activation, a transport block size larger than what is needed. A disadvantage of this option is inefficient utilization of radio resources.

Moreover, because a RBA and MCS remain the same at every TTI following SPS activation, the eNB generally cannot adjust uplink SPS, for example, to changing radio-channel conditions. This can result in transmission failures and/or non-optimal radio-resource usage. One option to mitigate the problem is for the eNB to assign, at the time of uplink SPS activation, a more robust MCS than, for example, what is recommended by the UE. While such a conservative approach might reduce a risk of transmission failure, it fails to eliminate that risk and can result in far less efficient utilization of radio resources.

The present disclosure describes examples of facilitating reconfiguration of both uplink SPS and downlink SPS after SPS activation. In certain embodiments, the reconfiguration can occur in response to transitions from talk spurts to silence intervals, packet-size changes, radio conditions, and/or other factors. In many cases, the reconfiguration can occur via explicit signaling. In other cases, the reconfiguration can occur implicitly. Further, in certain embodiments, an eNB can improve downlink scheduling decisions by optimizing when each UE sends status information such as can be contained within a channel status report (CSR).

I. Example of a Wireless Communication System for SPS Reconfiguration

FIG. 1 illustrates an example of a wireless communication system 100 that can facilitate SPS reconfiguration. The system 100 includes a UE 102 that communicates with an eNB 104 to access a wireless network. The UE 102 can be a mobile terminal, a stationary terminal, a tethered device (such as a modem), a portion thereof, and/or the like. Moreover, the eNB 104 can be a macro node, femto node, pico node, micro node, or similar eNB, a relay node, a mobile base station, a UE (e.g., communicating in peer-to-peer or ad-hoc mode with the UE 102), a portion thereof, and/or the like. In addition, the eNB 104 can facilitate UE 102 communication with a core network (not shown) to receive wireless network services, such as packet-switched (PS) voice services including voice-over-internet protocol (VoIP), other data services, and/or the like.

The UE 102 can include a voice receiving component 106 for obtaining audio input (e.g., analog voice signals), a vocoder component 108 for generating digital voice data packets based on the input, a UE-side scheduler component 110 for scheduling data communication with the eNB 104 based on resources scheduled with the eNB 104, a transmitting component 112 for communicating data packets to the eNB 104 over scheduled resources, a UE-side reconfiguration component 114 for identifying SPS adjustments or modifications, a reporting component 116 for generating and initiating transmission of CSRs, a UE-side reconfiguration settings component 120 for establishing and/or storing SPS reconfiguration settings, and a ROHC component 122. The eNB 104 includes an eNB-side reconfiguration component 118 for reconfiguring already-active SPS and other functionality, an eNB-side scheduler component 124, and an eNB-side reconfiguration settings component 126 for establishing and/or storing SPS reconfiguration settings.

According to an example, the voice receiving component 106 can obtain analog audio signals for encoding. The analog signals, for example, can include analog voice signals received over a microphone or other input device. The vocoder component 108 can generate digital data packets from the voice signals for communicating in a wireless network. In one example, the vocoder component 108 can generate the packets every 20 milliseconds (ms). The vocoder component 108 can provide the packets to a lower layer for scheduling/transmission thereof. In various embodiments, the vocoder component 108 can implement a codec such as AMR, AMR-WB, and/or the like.

The UE-side scheduler component 110 can receive resource assignments from the eNB 104 for communicating in the wireless network. Such assignments can be received and/or requested according to certain time intervals. The resource assignments can be established, for example, by the eNB-side scheduler component 124. The UE-side scheduler component 110, for example, can include a MAC layer scheduler.

The transmitting component 112 can transmit data, including the digital data packets generated by vocoder component 108, during the scheduled resource assignments. The transmitting component 112 can include a physical layer transmit processor and/or related antenna(s). The transmitting component 112 can also include, for example, a MAC layer transmission component. Moreover, for example, the vocoder component 108 can generate the data packets as a VoIP, voice-over-LTE (VoLTE) or similar packets for transmitting over the wireless network.

In one example, the eNB 104 can utilize dynamic scheduling to schedule resources to the UE 102. Dynamic scheduling can be implemented in various ways. As one example, the UE-side scheduler component 110 can initially send a SR to the eNB 104 to notify of data to send at the UE 102. The eNB 104 can then allocate resources for the UE 102 and communicate an indication of resources to the UE 102 in an uplink grant. The UE-side scheduler component 110 can then schedule data for transmitting over the resources indicated in the uplink grant (e.g., time and frequency) by the transmitting component 112.

The UE-side reconfiguration component 114 can monitor activity of the voice receiving component 106, the vocoder 108, and the transmitting component 112 and/or other components of the UE 102 for conditions or changes that make reconfiguration of an already-active SPS appropriate. In certain embodiments, the monitoring can include detecting a transition from a talk spurt to a silence interval, a transition from a silence interval to a talk spurt, a packet-size fluctuation event (e.g., as caused by ROHC and/or an adaptive codec), and/or the like.

In one example, based on the monitoring and/or other factors, the UE-side reconfiguration component 114 can identify one or more adjustments or modifications to a configuration parameter of the already-active uplink SPS. In some cases, the configuration parameter may relate to a packet-size profile supported by the RBA and MCS, a time-interval parameter, and/or the like. In certain embodiments, the UE-side reconfiguration component 114 can explicitly indicate the identified adjustment or modification to the eNB 104 via an SPS reconfiguration request, implicitly indicate the identified adjustment, etc. Additional examples of operation of the UE-side reconfiguration component 114 will be described in greater detail below with respect to the ensuing Figures.

In certain embodiments, the UE-side reconfiguration settings component 120 can establish and/or store reconfiguration settings in memory of the UE 102. The reconfiguration settings can relate, for example, to uplink SPS and/or downlink SPS. Examples of reconfiguration settings that can be established and/or stored by the UE-side reconfiguration settings component 120 will be described in greater detail below. The ROHC 122 can perform ROHC-related functionality as described above and in greater detail below with respect to FIGS. 2-2B.

The reporting component 116 can generate CSRs and initiate transmission of the CSRs to the eNB 104 (e.g., on the Physical Uplink Control Channel (PUCCH) or another channel). Each CSR can include, for example, a CQI that indicates a MCS recommended by the UE 102, a precoder matrix indication (PMI) that specifies a downlink precoder matrix recommended by the UE 102, a rank indication (RI) that specifies a number of layers that should be used for downlink transmission, and/or other suitable information. In some embodiments, the CSRs can assist the eNB 104 in downlink scheduling decisions such as, for example, what resource blocks and MCS to allocate to the UE 102. In many cases, the eNB 104 may follow a latest recommendation from the UE 102. In other cases, the eNB 104 may override the recommendation of the UE 102 based on other considerations.

In certain embodiments, the reporting component 116 can generate and initiate transmission of CSRs at a periodic interval. As described below, the eNB 104 may configure CSR parameters such as the periodic interval, or periodicity, at which the UE 102 sends the CSR (e.g. send every N subframes) and an offset (e.g., start sending at subframe M). In certain embodiments, the CSR parameters can be configured by the eNB 104 using the radio resource control (RRC) protocol.

The eNB-side reconfiguration component 118 can monitor uplink data, downlink data, radio conditions, and/or other factors for conditions or changes that make reconfiguration of an already-active SPS appropriate. In various embodiments, the eNB-side reconfiguration component 118 can initiate reconfiguration of already-active uplink SPS and/or already-active downlink SPS. In various embodiments, the eNB-side reconfiguration component 118 can interact with the UE-side reconfiguration component 114 on the UE 102 to receive and act on SPS reconfiguration requests. In addition, in various embodiments, the eNB-side reconfiguration component 118 can optimize the periodic interval at which the UE 102 sends CSRs. Further examples of operation of the eNB-side reconfiguration component 118 will be described below.

In certain embodiments, the eNB-side reconfiguration settings component 126 can establish and/or store reconfiguration settings in memory of the eNB 104. The reconfiguration settings can relate, for example, to uplink SPS and/or downlink SPS. Examples of reconfiguration settings that can be established and/or stored by the eNB-side reconfiguration settings component 126 will be described in greater detail below.

II. Example of a VoIP Coding and Communicating Process

Figure 2A:
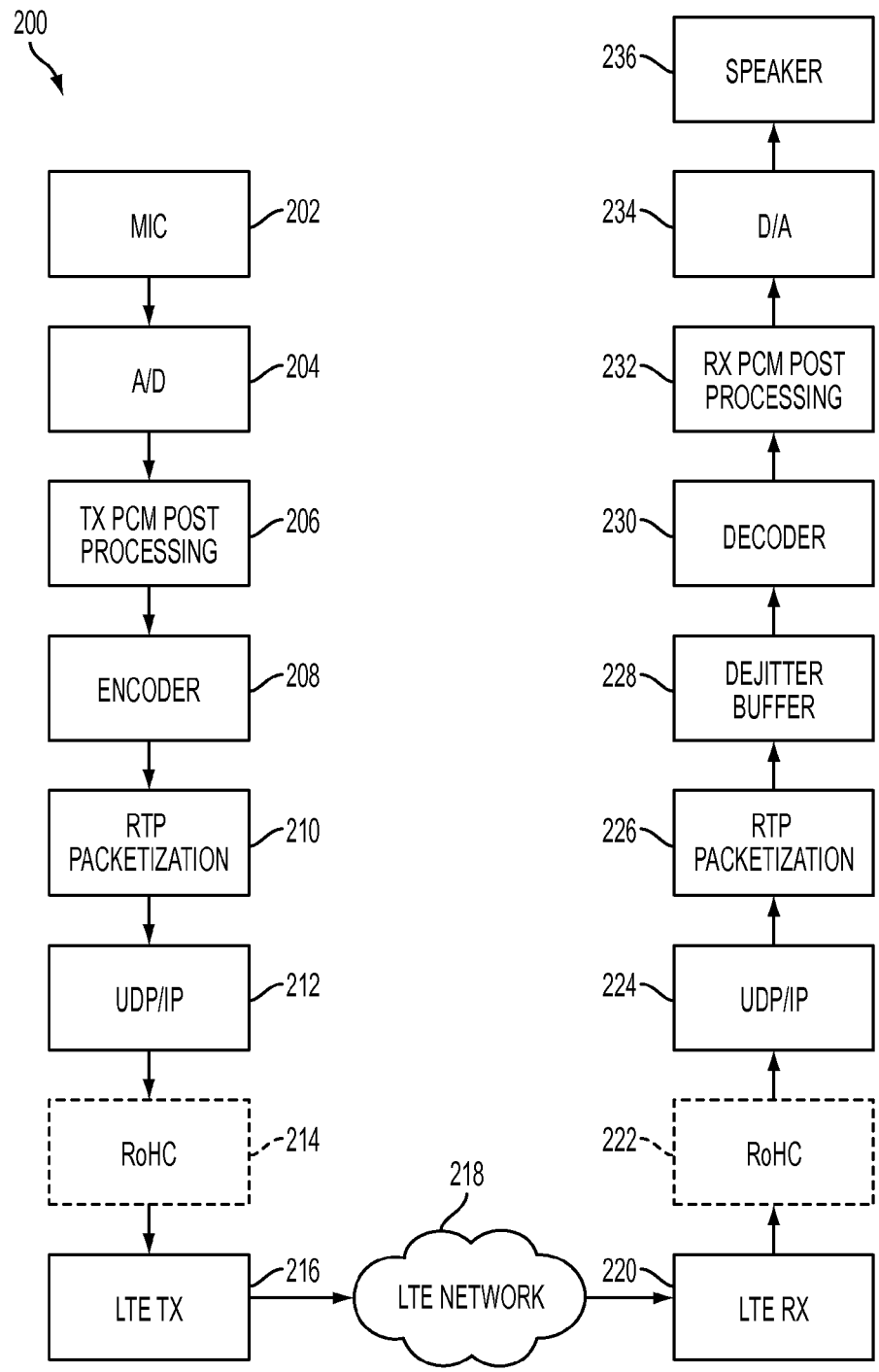
FIG. 2A illustrates an example VoIP coding and communicating process for a transmitter and receiver.

FIG. 2A illustrates an example VoIP coding and communicating process 200 for a transmitter and receiver. In certain embodiments, the UE-side reconfiguration component 114 can be resident on both the transmitter and the receiver. Each UE-side reconfiguration component 114 of FIG. 1 is operable to monitor the process 200.

For example, a microphone 202 can receive analog voice signals over a sampling interval and convert the analog signals to digital signals 204. Transmit pulse code modulation (PCM) post processing 206 can be performed for the digital signals, and the signals can be encoded by encoder 208, which can be the vocoder 108, for example. Real-time transport protocol (RTP) packetization 210 is performed to formulate the encoded signal into packets for transmitting in a wireless network. The packets can be provided to a user datagram protocol (UDP)/internet protocol (IP) layer 212. ROHC 214 is optionally performed on the packets (e.g., by the ROHC component 122), and the packets can be transmitted over an LTE network 218 using an LTE transmitter 216 (e.g., via an eNB and other LTE network components).

The packets are received at LTE receiver 220, which can be at a different network entity, such as a UE. ROHC decompression 222 is performed on the packets, and the packets are provided to UDP/IP layer 224. RTP packetization 226 can process the packets to generate the corresponding digital signal. The signal is provided to dejitter buffer 228 to queue the signal for providing to upper layers sequentially with other signals. Decoder 230 decodes the VoIP signal, and receive PCM post processing 222 is performed to demodulate the signal. The signal is converted from digital to an analog signal 234 and provided to a speaker at 236.

In certain embodiments, as part of monitoring the process 200, the UE-side reconfiguration component 114 can identify changes or conditions that may make adjustment to uplink SPS desirable. In one example, the UE-side reconfiguration component 114 detects transitions from a talk spurt to a silence interval and/or from a silence interval to a talk spurt. In another example, by monitoring output of the encoder 208, the UE-side reconfiguration component 114 may be able to identify a codec-related packet-fluctuation event. For example, AMR and AMR-WB may adjust their rates from 4.75 kbps to 12.2 kbps and from 6.6 kbps to 23.85 kbps, respectively. During silence intervals, these codecs may generate comfort-noise packets at a rate of about 1.8 kbps. The UE-side reconfiguration component 114 can detect the rate adjustment as a packet-fluctuation event that affects a size of future uplink packets.

Another example involves ROHC. ROHC can be modeled as an interaction between two state machines, one at a compressor (e.g., the ROHC 214) and one at a decompressor (e.g., the ROHC 222). ROHC can include, for example, three compressor states: Initialization and Refresh (IR), First Order (FO), and Second Order (SO), by increasing order of compression ratio. In a typical embodiment, the compressor starts in the IR state, where it sends uncompressed headers. Subsequently, the compressor can transition to a state of higher compression ratio when it is confident that the decompressor has the information necessary to decompress a header compressed according to that higher state. Such confidence can be attained, for example, through ROHC acknowledgements (ACKs) from the decompressor.

In general, the SO state reflects the state where a compression ratio is highest. Compressed header sizes are generally near constant in the SO state. Typically, once past the initialization stage of the IR state, the compressor may start a talk spurt in the FO state for a few packets before transitioning to the SO state. For the remainder of the talk spurt, the compressor may occasionally revert to the FO state for a few packets and then return to the SO state. In the SO state, the compressor may send, for example, type-0 packets, which can have a compressed header as small as 2 octets, assuming a 1-octet large cell ID (CID). In the FO state, the compressor may send, for example, type-1 and/or type-2 packets, whose header size may be in the range of 2-3 octets. In the IR state, the header may be roughly as large an uncompressed header (e.g., 40 to 60 octets).

ROHC can also include three modes: Unidirectional (U), Optimistic (O) and Reliable (R). In general, the U mode is designed for unidirectional communication where there is no feedback channel. LTE and similar networks may be considered bidirectional. For purposes of providing examples relative to LTE networks, the following description will focus on the O and R modes. In the R mode, the compressor relies on ROHC ACKs to be confident the decompressor has obtained the needed information to decompress headers compressed according to the next higher state, before the compressor transitions to that higher state.

In the O mode, the compressor assumes the decompressor has obtained the needed information after a certain number of packets carrying the information have been transmitted. The compressor can also rely on the ROHC ACKs. The ROHC ACKs may be considered part of the ROHC feedback, which feedback may be sent as standalone packets, piggybacked on packets with actual payload for the opposite direction, etc. Assuming a 1-octet large CID, a given ROCH ACK may be, for example, as small as three octets. Feedback sizes may be, for example, in the range of a few octets.

In certain embodiments, as a result of the ROHC functionality described above, the ROHC header (which can include the compressed header and the ROHC feedback, if piggybacked) may fluctuate and thereby cause packet sizes to fluctuate. In certain embodiments, the UE-side reconfiguration component 114 can monitor the ROHC 214 and/or the ROHC 222 for packet-size fluctuations according to the state.

Figure 2B:
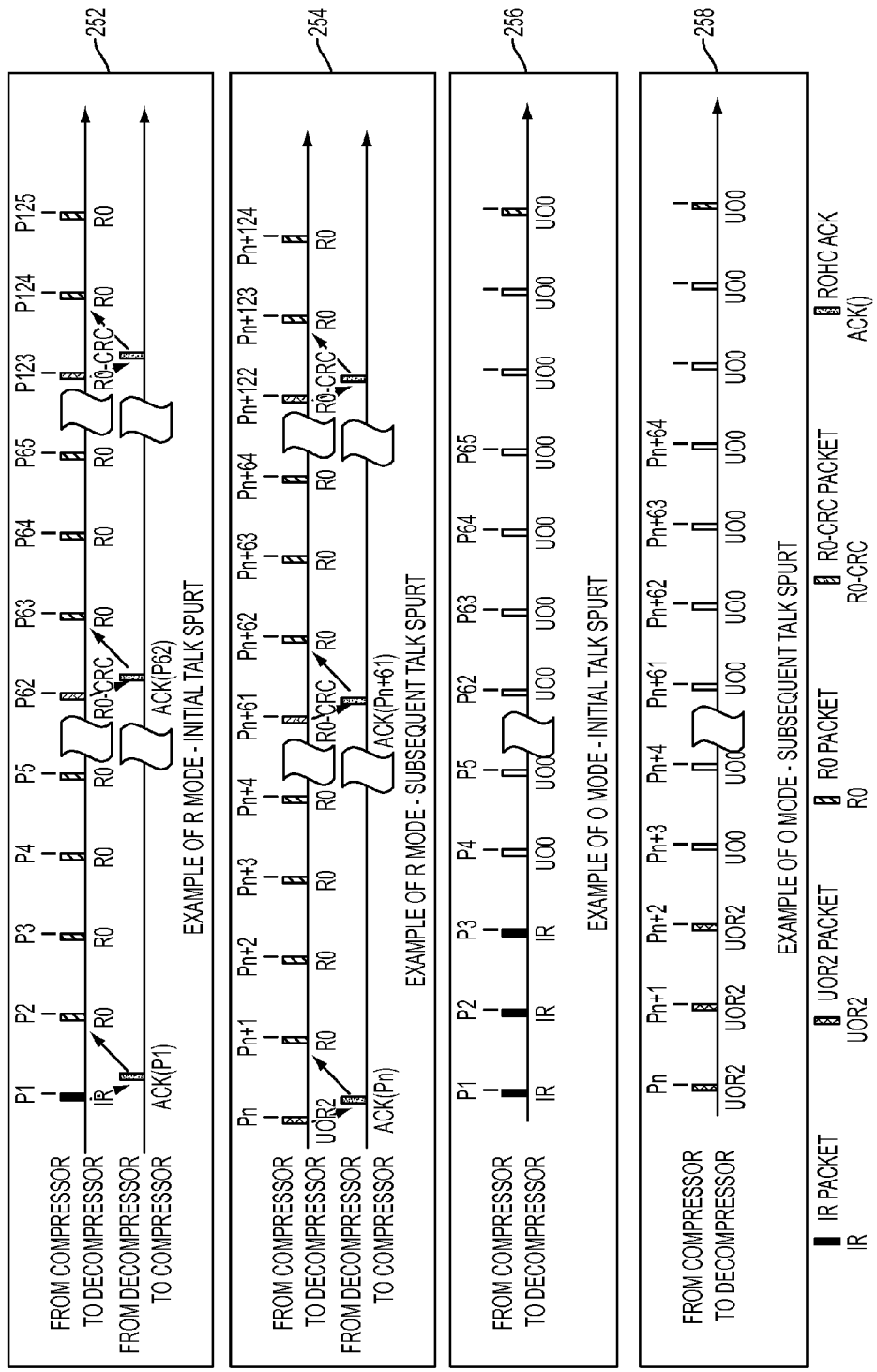
FIG. 2B illustrates examples of R-mode and O-mode operations.

FIG. 2B illustrates examples of R-mode and O-mode operations that can be detected by the UE-side reconfiguration module 114 during, for example, the process 200. In a typical embodiment, the UE-side reconfiguration component 114 is operable to detect a mode and compression state that is applicable at a given time. To simplify discussion, FIG. 2B assumes that no packet is sent during silence intervals.

In particular, FIG. 2B illustrates an R-mode initial talk spurt 252, an R-mode subsequent talk spurt 254, an O-mode initial talk spurt 256, and an O-mode subsequent talk spurt 258. The R-mode initial talk spurt 252, the R-mode subsequent talk spurt 254, the O-mode initial talk spurt 256, and the O-mode subsequent talk spurt 258 are examples of packet-size patterns that can form the basis for a packet-size profile. Once the R-mode initial talk spurt 252, the R-mode subsequent talk spurt 254, the O-mode initial talk spurt 256, and/or the O-mode subsequent talk spurt 258 are detected by the UE-side reconfiguration module 114, SPS reconfiguration can be triggered according to a corresponding packet-size profile.

In an example, during the R-mode initial talk spurt 252, the compressor starts in the IR state and sends IR packet P1. Upon receiving an ACK, the compressor transitions to a higher compression state, which is the SO state in this example. In the SO state, the compressor sends R0 packets. Periodically, the compressor may send R0-Cyclic-Redundancy-Check (CRC) packets (e.g. P62), which packets the decompressor is expected to acknowledge (e.g., ACK(P62)). After the compressor receives the ACK, it may again send R0 packets. Continuing this example, the compressor may start the R-mode subsequent talk spurt 254 in the FO state and send UOR2 packet Pn. When Pn is acknowledged, the compressor may transition to the SO state (i.e., a higher compressor state) and send R0 packets. As with the R-mode initial talk spurt 252, the compressor may periodically send R0-CRC packets (e.g., Pn+61), which packets the decompressor normally acknowledges (e.g., ACK(Pn+61)). After receiving the ACK, the compressor may again send R0 packets.

In another example, during the O-mode initial talk spurt 256, the compressor does not rely on ACKs from the decompressor but rather assumes it can safely transition to a higher compression state after sending three packets of the same type. For purposes of this example, P1, P2 and P3 are sent in the IR state. Thereafter, the compressor transitions to the SO state, where it sends type UO0 packets. During the subsequent O-mode talk spurt 258, the compressor begins in the FO state and sends three UOR2 packets, after which it transitions to the SO state and sends UO0 packets.

III. Example of User Equipment

Figure 3:
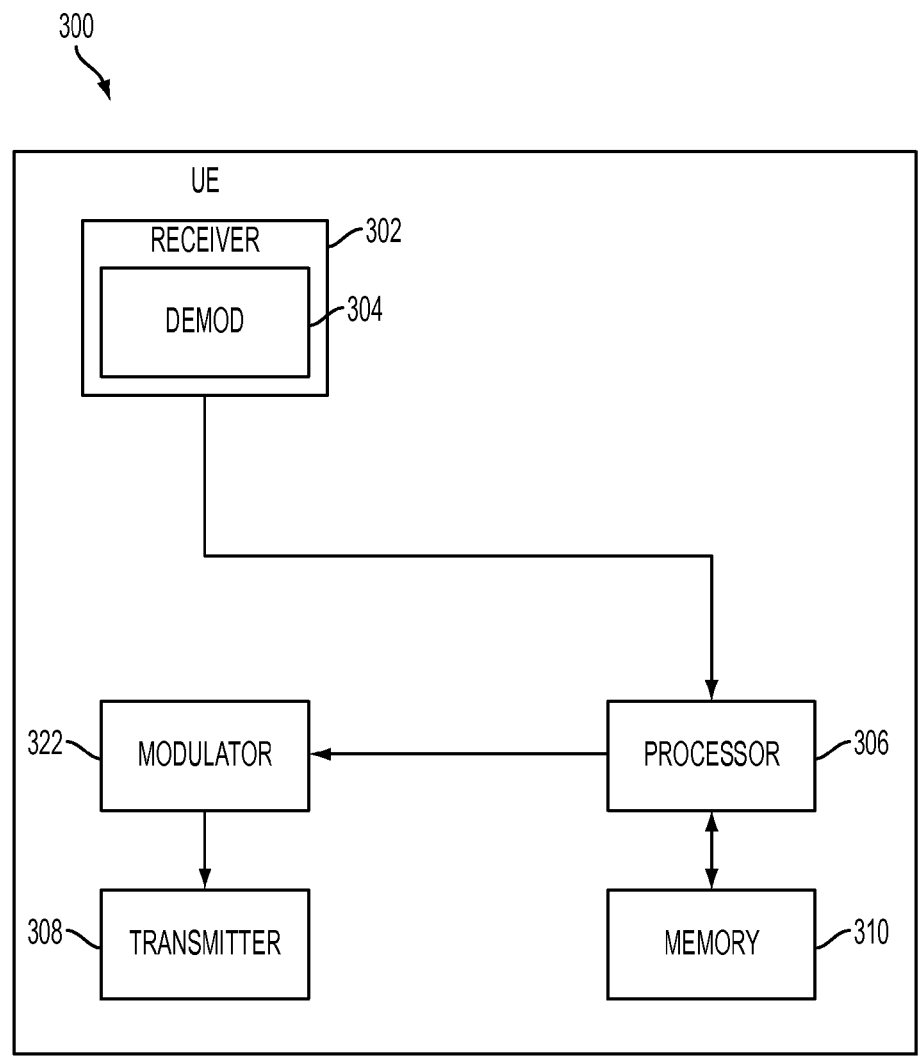
FIG. 3 illustrates user equipment that can facilitate SPS reconfiguration.

FIG. 3 illustrates a UE 300 that can facilitate SPS reconfiguration. In certain embodiments, the UE 300 can operate as described with respect to the UE 102 of FIG. 1. The UE 102 can include a receiver 302 that receives a signal from, for instance, a receive antenna (not shown), performs actions on (e.g., filters, amplifies, downconverts, etc.) the received signal, and digitizes the conditioned signal to obtain samples. The receiver 302 can include a demodulator 304 that can demodulate received symbols and provide them to a processor 306 for channel estimation. The processor 306 can be a processor dedicated to analyzing information received by receiver 302 and/or generating information for transmission by a transmitter 308, a processor that controls one or more components of the UE 300, and/or a processor that both analyzes information received by the receiver 302, generates information for transmission by a transmitter 308, and controls one or more components of the UE 300.

The UE 300 can additionally include memory 310 that is operatively coupled to the processor 306 and that can store data to be transmitted, received data, information related to available channels, data associated with analyzed signal and/or interference strength, information related to an assigned channel, power, rate, or the like, and any other suitable information for estimating a channel and communicating via the channel. The memory 310 can additionally store protocols and/or algorithms associated with estimating and/or utilizing a channel (e.g., performance based, capacity based, etc.).

It will be appreciated that the data store (e.g., memory 310) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 310 of the subject systems and methods is intended to include, without being limited to, these and any other suitable types of memory.

The UE 300 further includes a modulator 322 that modulates signals for transmission by the transmitter 308, for instance, to a base station, another UE, etc. For example, the transmitter 308 can transmit serving CIDs to a positioning server via one or more base stations, as described, and can be similar to transmitting component 112. Moreover, for example, the UE 300 can include multiple transmitters 308 for multiple network interfaces.

IV. Example of an LTE Network Architecture

Figure 4:
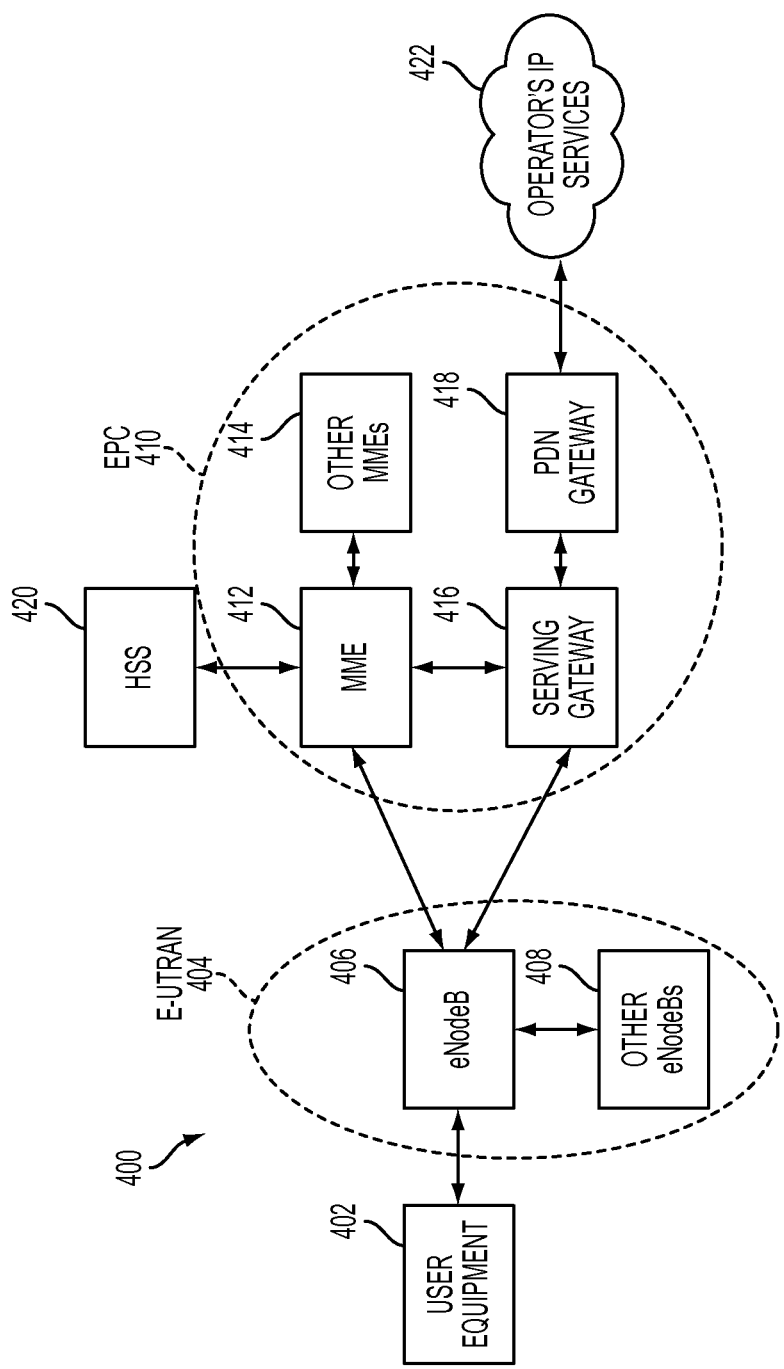
FIG. 4 is a illustrates an LTE network architecture.

FIG. 4 is a diagram illustrating an LTE network architecture 400. The LTE network architecture 400 may be referred to as an Evolved Packet System (EPS) 400. The EPS 400 may include one or more UE 402, an Evolved UMTS Terrestrial Radio Access Network (E-UTRAN) 404, an Evolved Packet Core (EPC) 410, a Home Subscriber Server (HSS) 420, and an Operator's IP Services 422. In certain embodiments, the one or more UE 402 can operate as described with respect to the UE 102 and/or the UE 300.

The EPS 400 can interconnect with other access networks, but for simplicity those entities/interfaces are not shown. The E-UTRAN 404 includes an eNB 406 and other eNBs 408. In certain embodiments, the eNB 406 and the other eNBs 408 can operate as described with respect to the eNB 104. The eNB 406 provides user and control planes protocol terminations toward the UE 402. The eNB 406 may be connected to the other eNBs 408 via an X2 interface (e.g., backhaul). The eNB 406 provides an access point to the EPC 410 for the one or more UE 402.

The eNB 406 is connected by an S1 interface to the EPC 410. The EPC 410 includes a Mobility Management Entity (MME) 412, other MMEs 414, a Serving Gateway 416, and a Packet Data Network (PDN) Gateway 418. The MME 412 is the control node that processes the signaling between the UE 402 and the EPC 410. Generally, the MME 412 provides bearer and connection management. All user IP packets are transferred through the Serving Gateway 416, which itself is connected to the PDN Gateway 418. The PDN Gateway 418 provides UE IP address allocation as well as other functions. The PDN Gateway 418 is connected to the Operator's IP Services 422. The Operator's IP Services 422 may include the Internet, the Intranet, an IP Multimedia Subsystem (IMS), and a PS Streaming Service (PSS).

V. Example of a Radio Protocol Architecture

Figure 5:
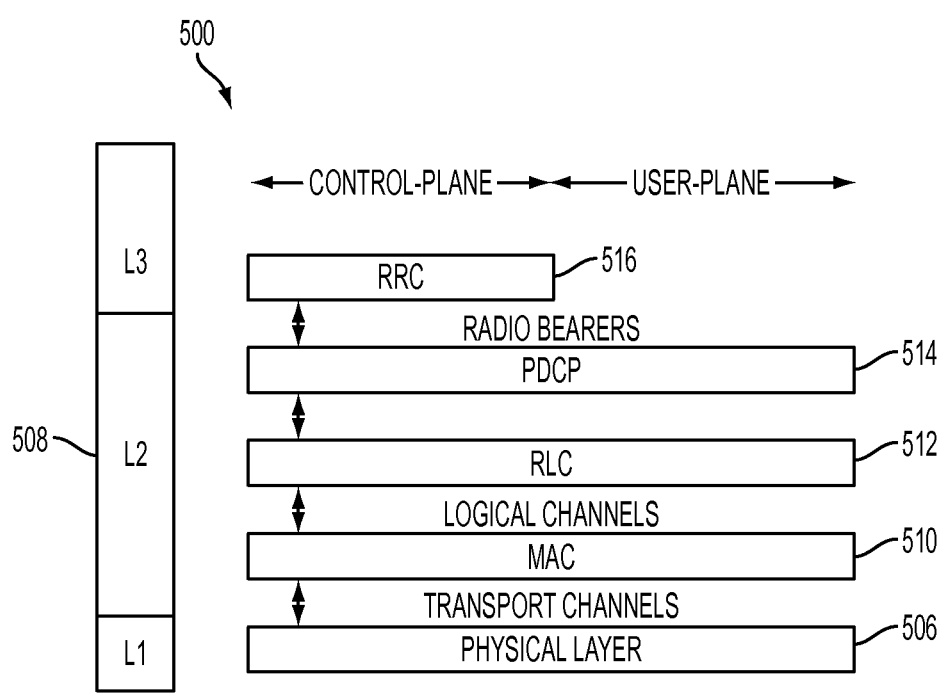
FIG. 5 illustrates an example of a radio protocol architecture for the user and control planes in LTE.

FIG. 5 is a diagram 500 illustrating an example of a radio protocol architecture for the user and control planes in LTE, which architecture can be used to perform signaling related to SPS reconfiguration. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB (e.g., the UE 102 and the eNB 104) over the physical layer 506.

In the user plane, the L2 layer 508 includes a MAC sublayer 510, a radio link control (RLC) sublayer 512, and a PDCP sublayer 514, which are terminated at the eNB (e.g., the eNB 104) on the network side. Although not shown, the UE (e.g., the UE 102) may have several upper layers above the L2 layer 508 including a network layer (e.g., IP layer) that is terminated at the PDN gateway 518 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression (e.g., ROHC as described above) for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ retransmissions. HARQ error detection/correction can occur, for example, at the physical layer 506 described above.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

VI. Example of eNB Communication with UE

Figure 6:
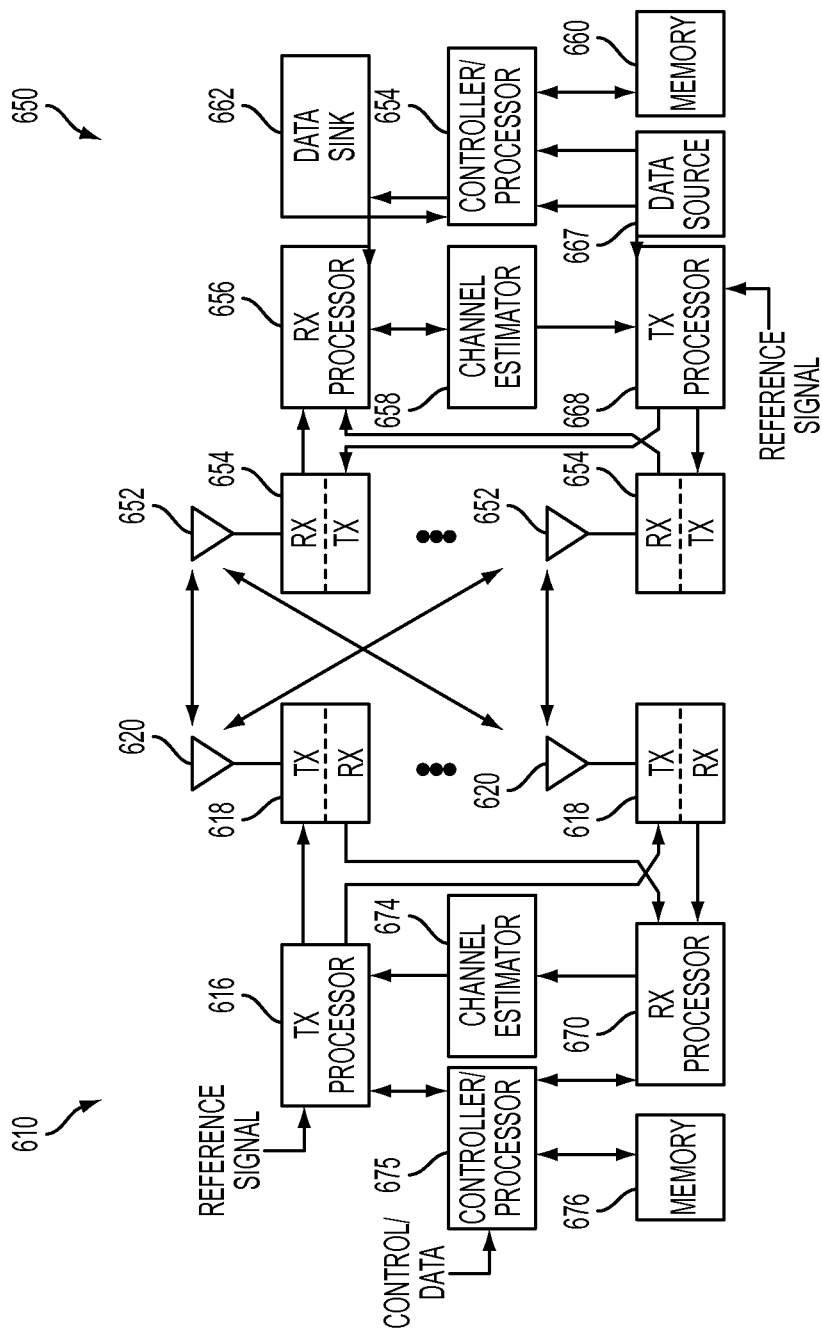
FIG. 6 illustrates an eNB in communication with a user equipment (UE).

FIG. 6 is a block diagram of an eNB 610 in communication with a UE 650 in an access network. In certain embodiments, the eNB 610 can operate as described with respect to the eNB 104 and/or the eNB 406. In certain embodiments, the UE 650 can operate as described with respect to the UE 102, the UE 300, and/or the UE 402. In the downlink, upper layer packets from the core network are provided to a controller/processor 675. The controller/processor 675 implements the functionality of the L2 layer. In the downlink, the controller/processor 675 provides header compression (e.g., ROHC), ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (e.g., physical layer). The signal processing functions includes coding and interleaving to facilitate forward error correction (FEC) at the UE 650 and mapping to signal constellations based on MCS (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the MCS, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an ACK and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate MCS and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

VII. Example of a Process for SPS Reconfiguration

Figure 7:
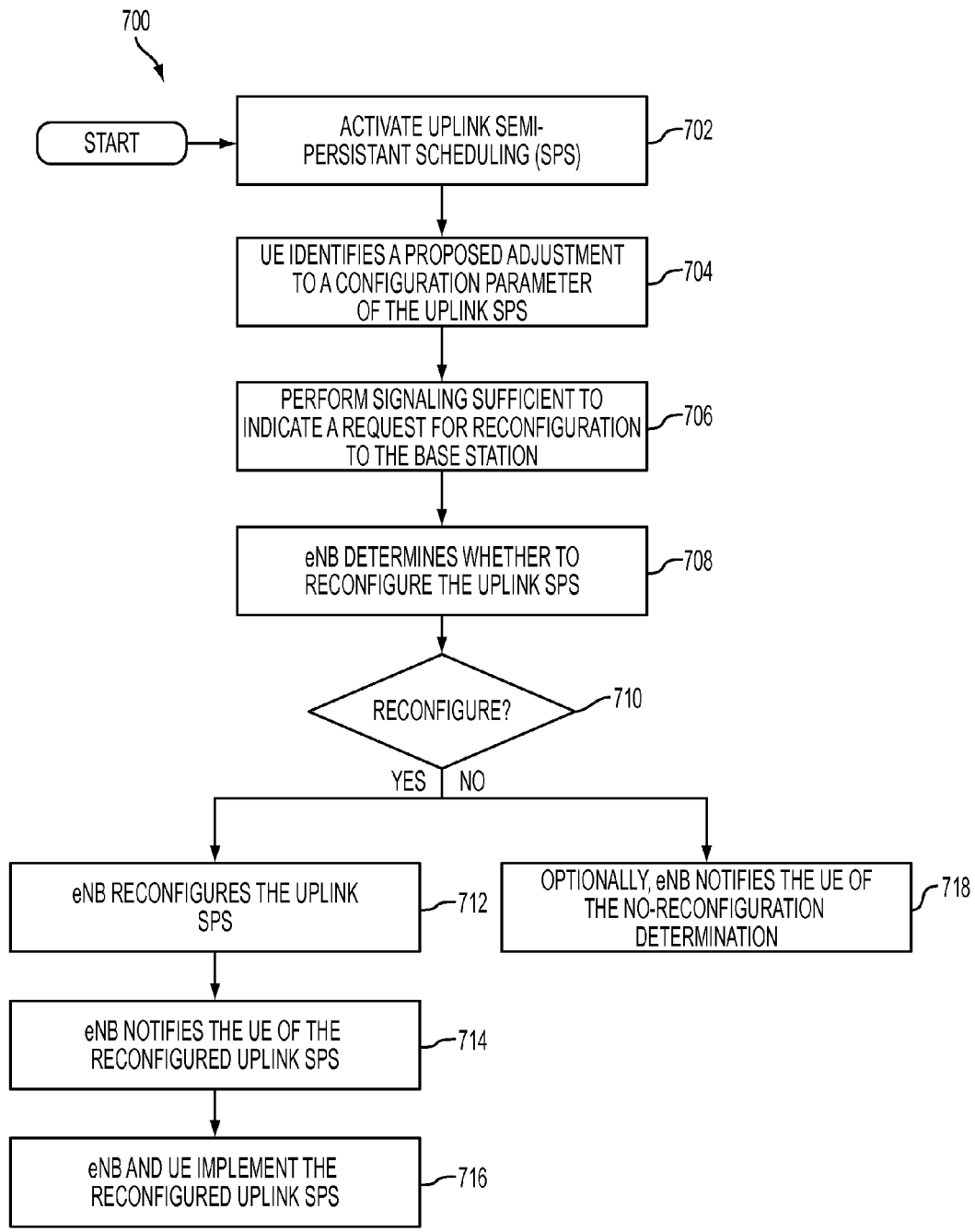
FIG. 7 illustrates an example of a process for performing uplink SPS reconfiguration.

FIG. 7 illustrates an example of a process 700 for performing uplink SPS reconfiguration. The process 700 can be implemented by any system that can process data and send/receive signals. For example, the process 700, in whole or in part, can be implemented by one or more of the UE 102, the eNB 104, the UE 300, the UE 402, the eNB 406, the UE-side scheduler component 110, the UE-side reconfiguration component 114, the UE-side reconfiguration settings component 120, the eNB-side reconfiguration component 118, and/or the eNB-side reconfiguration settings component 126. The process 700 can also be performed generally by the wireless communication system 100. Although any number of systems, in whole or in part, can implement the process 700, to simplify discussion, the process 700 will be described in relation to the UE 102 and/or the eNB 104, as appropriate.

At block 702, uplink SPS is activated. In certain embodiments, the uplink SPS can be activated via, for example, two signaling steps. First, the eNB 104 can send an SPS configuration to the UE 102 via RRC signaling (e.g., at the RRC sublayer 516). Second, the eNB 104 can send scheduling signaling (e.g., downlink control information (DCI) format 0) on a control channel (e.g., PDCCH, ePDCCH, etc.). The scheduling information can include, for example, a RBA and an MCS. In some embodiments, to indicate that this is not a regular DCI format 0 but rather one for SPS, the signaling can be addressed to an SPS Cell Radio Network Temporary Identifier (C-RNTI) of the UE 102 using, for example, specific bit patterns. A first SPS uplink transmission can be specified to begin at subframe n. The uplink SPS can include, for example, the parameters listed in Table 1 below.

TABLE 1

| Parameter | Description |
| --- | --- |
| Time-Interval Parameter ("semiPersistSchedIntervalUL") | Interval between the periodic transmission opportunities, in units of TTIs. m is set to this parameter value |
| Implicit-Release Parameter ("implicitReleaseAfter") | If there has been no uplink data (empty packets) after implicitReleaseAfter transmission opportunities, the SPS is released. |

At block 704, the UE 102 identifies a proposed adjustment to one or more configuration parameters of the uplink SPS. The configuration parameter can be a time-interval parameter, an implicit-release parameter, a packet size accommodated by the RBA and the MCS, and/or the like. In certain embodiments, the block 704 can include monitoring a VoIP coding and communicating process such as the process 200 for a talk-spurt-to-silence-interval transition, a silence-interval-to-talk-spurt transition, a packet-size fluctuation event (e.g., a packet-size change due to a codec-related event or a ROHC), etc. In some cases, the proposed adjustment can be based on predicted fluctuations or interval changes (e.g., based on a detected transition). In other cases, the proposed adjustment can be based on a detected (e.g., observed) fluctuation, interval change, etc.

At block 706, the UE 102 performs signaling sufficient to indicate a request for reconfiguration to the eNB 104. More particularly, the request can include information sufficient to identify the proposed adjustment. In some cases, the request can be indicated via explicit signaling. Examples of explicit signaling will be described in greater detail with respect to FIGS. 8-15C.

As indicated in Table 2 below, in various embodiments, the request may include information sufficient to identify a proposed time-interval parameter, a packet-size profile, a proposed starting subframe for the SPS reconfiguration, a combination of same, and/or the like. In a typical embodiment, the proposed starting subframe can be defined in terms of an offset. For example, a starting subframe can be specified as Starting_SF_UL+Last_subframe, where Last_subframe is either: (a) the subframe where the last uplink SPS transmission was sent, if SPS_Reconfig_Request is not sent as part of an uplink SPS transmission; or (b) the subframe where the SPS_Reconfig_Request is sent, if SPS_Reconfig_Request is sent as part of an uplink SPS transmission.

TABLE 2

Example Elements of an SPS Reconfiguration Request ("SPS_Reconfig_Request")

Proposed Time-Interval Parameter ("New_semiPersistSchedIntervalUL")
Packet-Size Profile ("Size_Profile")
Starting Subframe ("Starting_SF_UL")

In certain embodiments, by including a proposed time-interval parameter as part of an SPS reconfiguration request, the UE 102 can request the eNB 104 to reconfigure the uplink SPS with a new value for the interval between periodic uplink transmissions. In various embodiments, the proposed time-interval parameter may result from a transition from a talk spurt to a silence interval, a transition from a silence interval to a talk spurt, a change in operation by a vocoder such as the vocoder 108, and/or the like.

In certain embodiments, by including a packet-size profile as part of an uplink SPS reconfiguration request, the UE 102 can request the eNB 104 to adjust a scheduling decision so that sizes of upcoming packets Pn, Pn+1, Pn+2, etc. can be accommodated. Adjusting the scheduling decision can include adjusting a RBA, MCS, etc. In general, a packet-size profile can include information indicative of a size of each of one or more future uplink packets (e.g., Pn, Pn+1, Pn+2, etc.). In some cases, a given packet-size profile may include a single value to be applied, for example, to all packets Pn, Pn+1, Pn+2, etc. In other cases, more complex profiles can specify different values for each of the packets Pn, Pn+1, Pn+2, etc. In these cases, non-uniformly-sized future uplink packets can be efficiently accommodated. As elaborated on below, the packet-size profile may result from a transition from a talk spurt to a silence interval, ROHC, adaptive codecs, and/or the like.

In an example, with reference to FIG. 2B, a packet-size profile corresponding to the O-mode subsequent talk spurt 258 could include a size of a first three packets in an upcoming talk spurt (UOR2 packets), and a size of subsequent packets (UO0 packets). In another example, also with reference to FIG. 2B, a packet-size profile corresponding to the R-mode initial talk spurt 252 could include a size of IR packets, and a size of subsequent packets (R0 packets), with the exception that every 61st packet is a R0-CRC packet and can have a corresponding specified size.

For a given SPS reconfiguration request, a time-interval parameter, a packet-size profile, and/or a starting subframe can be encoded in various ways. For example, each can be expressly indicated via values, indirectly indicated by indices to a corresponding preconfigured array or table, and/or the like. Examples will be described in greater detail below.

At block 708, the eNB 104 optionally determines whether to reconfigure the uplink SPS. As part of the block 708, the eNB 104 may check that the proposed adjustment complies, for example, with bearer QoS attributes and/or other considerations. In some cases, the eNB 104 may determine to make an adjustment specified by the request for reconfiguration. In other cases, the eNB 104 may determine not to make any adjustment. In still other cases, the eNB 104 may determine to make a different adjustment from the adjustment specified by the request for reconfiguration. In some embodiments, the block 708 can be omitted. In these embodiments, the process 700 may proceed directly from block 706 to block 712.

At decision block 710, if the eNB 104 determines to reconfigure, the process 700 proceeds to block 712. Otherwise, the process 700 proceeds to block 718. At block 718, in some embodiments, the eNB 104 may notify the UE 102 of the no-reconfiguration determination. In other cases, the block 718 can be omitted such that the process 700 ends after the no-reconfiguration determination.

At block 712, the eNB 104 reconfigures the uplink SPS as determined at the block 708. At block 714, the eNB 104 notifies the UE 102 of the reconfigured uplink SPS. At block 716, the UE 102 and the eNB 104 implement the reconfigured uplink SPS. For example, the UE 102 may transmit uplink packets to the eNB 104 according to the reconfigured uplink SPS.

VIII. Examples of SPS Reconfiguration Settings

Further examples of content that can be included in an SPS reconfiguration request will now be described. In some embodiments, a time-interval parameter, a size profile, and a starting subframe as described above can each be encoded as indices to an array. For instance, reconfiguration settings can be established that include an array of time-interval-parameter values (e.g., New_semiPersistSchedIntervalUL [i], for i=0 to Length−1), an array of size profiles (e.g., Size_Profile[i], for i=0 to Length−1), an array of starting subframes (e.g., Starting_SF_UL[i], for i=0 to Length−1), and/or the like. The UE 102 and the eNB 104 can each be configured with the reconfiguration settings so that it is possible to exchange array indices instead of actual values. In various embodiments, the exchange of indices can further improve the efficiency of communication between the UE 102 and the eNB 104.

For simplicity of description, the examples described below assume that the vocoder 108 uses the AMR or AMR-WB codec and that ROHC is utilized. For the AMR and AMR-WB codecs, the periodicity intervals are assumed to be 160 ms and 20 ms for comfort noise and talk spurts, respectively. For purposes of ROHC, the following additional assumptions are made:

(1) An initial talk spurt starts with an IR packet having 50 bytes of speech and an IR header for a total of 90 bytes for IPv4 and 110 bytes for IPv6.

(2) A subsequent talk spurt starts with UOR2 packets having 50 bytes of speech and 3 bytes of compressed header for a total of 53 bytes.

(3) A subsequent silence interval starts with UOR2 packets having 5 bytes of comfort noise and 3 bytes of compressed header for a total of 8 bytes.

(4) In the higher compression state of a talk spurt, the compressor sends R0 or UO0 packets both of size 52 bytes. In the R mode, occasionally, R0-CRC packets of size 53 bytes are sent.

(5) In the higher compression state of a silence interval, the compressor sends R0 or UO0 packets both of size 7 bytes. In the R mode, occasionally, R0-CRC packets of size 8 bytes are sent; and (6) The compressor transitions to a higher compression state after transmitting one or three packets of the same type, depending on the particular example.

A. Example Reconfiguration Settings for a Time-Interval Parameter

Table 3 below illustrates an example of reconfiguration settings for a time-interval parameter. Specifically, Table 3 illustrates an array of length two such that an index of zero corresponds to a value of 20 ms and an index of one corresponds to a value of 160 ms. In an example, the index of zero can relate to a talk spurt while the index of one can relate to a silence interval.

TABLE 3

| Index | New_semiPersistSchedIntervalUL (in ms) |
|---|---|
| semiPersistSchedIntervalUL [0] | 20 |
| semiPersistSchedIntervalUL [1] | 160 |

In certain embodiments, when both the UE 102 and the eNB 104 have the reconfiguration settings shown in Table 3, a request for SPS reconfiguration from the UE 102 can specify an index (i.e., one or zero) corresponding to its proposed adjustment of the time-interval parameter. For example, upon a detected transition from a talk spurt to a silence interval, the UE 102 may send to the eNB 104 an SPS reconfiguration request that specifies an index of one. In similar fashion, upon a detected transition from a silence interval to a talk spurt, the UE 102 may send to the eNB 104 an SPS reconfiguration request that specifies an index of zero.

B. Example Reconfiguration Settings for a Starting Subframe

Table 4 below illustrates an example of reconfiguration settings for a starting subframe (e.g., in terms of an offset from a last subframe as described above). Specifically, Table 4 illustrates an array of length two such that an index of zero corresponds to a value of 20 ms and an index of one corresponds to a value of 60 ms. In an example, the index of zero can relate to a talk spurt while the index of one can relate to a silence interval.

TABLE 4

| Index | Starting_SF_UL (in ms) |
|---|---|
| Starting_SF_UL[0] | 20 |
| Starting_SF_UL[1] | 60 |

In certain embodiments, when both the UE 102 and the eNB 104 have the reconfiguration settings shown in Table 4, a request for SPS reconfiguration from the UE 102 can specify an index (i.e., one or zero) corresponding to its proposed starting subframe. For example, upon a detected transition from a talk spurt to a silence interval, the UE 102 may send to the eNB 104 an SPS reconfiguration request that specifies an index of one. In similar fashion, upon a detected transition from a silence interval to a talk spurt, the UE 102 may send to the eNB 104 an SPS reconfiguration request that specifies an index of zero.

C. Example Reconfiguration Settings for a Size Profile

Table 5 below illustrates an example of reconfiguration settings for a size profile. Specifically, Table 5 illustrates an array of two size profiles. For example, an index of zero can relate to a size profile such that a first three packets are of size 8 bytes and all subsequent packets are of size 7 bytes until further notice. In certain embodiments, the index of zero can be applicable to a silence interval in the O mode. Similarly, an index of one can mean that a first three packets are of size 53 bytes while all subsequent packets are of size 52 bytes until further notice.

TABLE 5

| Index | Size_Profile (in bytes) |
|---|---|
| Size_Profile [0] | 8, 8, 8, 7* |
| Size_Profile [1] | 53, 53, 53, 52* |

Table 6 illustrates another example of reconfiguration settings for a size profile. According to this example, an index of zero can relate to a size profile such that a first upcoming packet is of size 53 bytes, subsequent packets are of size 52 bytes, and every 61$^{st}$ packet is of size 53 bytes. In certain embodiments, the index of one can be applicable to a talk spurt in the R mode.

TABLE 6

| Index | Size_Profile (in bytes) |
|---|---|
| Size_Profile [0] | 8, 7*, 8+, 61 |
| Size_Profile [1] | 53, 52*, 53+, 61 |

D. Example of Scaled Encoding for Size Profiles

Table 7 illustrates an example of scaled encoding of size profiles. According to this example, an index can be used to specify a range of sizes rather than specific exact sizes. For example, an index of two can correspond to 20<Size<=35, an index of four can correspond to 40<Size<=50, etc. In many cases, the example size-profile reconfiguration settings described above can be expressed in terms of the scaled encoding of Table 7. For instance, the Size_Profile[0] of Table 6 can be expressed as index zero of Table 7. Likewise, the Size_Profile[1] of Table 6 can be expressed as Size_Profile[5] of Table 7.

TABLE 7

| Index | Range of Sizes (in bytes) |
|---|---|
| Size_Profile [0] | 0 < Size <= 10 |
| Size_Profile [1] | 10 < Size <= 20 |
| Size_Profile [2] | 20 < Size <= 35 |
| Size_Profile [3] | 35 < Size <= 40 |
| Size_Profile [4] | 40 < Size <= 50 |
| Size_Profile [5] | 50 < Size <= 60 |
| ... | |

E. Example of Configuration Profiles (Tuples)

In certain embodiments, reconfiguration settings can include an array of configuration profiles. In these embodiments, each configuration profile can be a tuple that includes, for example, a time-parameter value, a size profile, a starting subframe, and/or other configurations (e.g., Config_Profile[i]=(New_semiPersistSchedIntervalUL, Size_Profile, Starting_SF_UL), for i=0 to (M−1)). In that way, a single index can be used to reference the tuple.

Table 8 below illustrates an example of reconfiguration settings that can include an array of configuration profiles. In some embodiments, the array of configuration profiles shown in Table 8 can be used during the O mode described above. Examples utilizing Table 8 will be described with respect to FIGS. 15A-15C.

TABLE 8

| Index | New_semiPer-sistSchedIntervalUL (in ms) | Size_Profile (in bytes) | Starting_SF_UL (in ms) |
|---|---|---|---|
| ConfigProfile[0] | 160 | 8, 8, 8, 7* | 60 |
| ConfigProfile[1] | 20 | 53, 53, 53, 52* | 20 |
| ConfigProfile[2] | 20 | 90, 90, 90, 52* | 20 |
| ConfigProfile[3] | 160 | 8, 8, 8, 7* | 0 |

Table 9 below illustrates another example of reconfiguration settings that can include an array of configuration profiles. In some embodiments, the array of configuration profiles shown in Table 9 can be used during the R mode described above

TABLE 9

| Index | New_semiPer-sistSchedIntervalUL (in ms) | Size_Profile (in bytes) | Starting_SF_UL (in bytes) |
|---|---|---|---|
| ConfigProfile [0] | 160 | 8, 7*, 8+, 61 | 60 |
| ConfigProfile [1] | 20 | 53, 52*, 53+, 61 | 20 |
| ConfigProfile [2] | 20 | 90, 52*, 53+, 61 | 20 |
| ConfigProfile [3] | 160 | 8, 7*, 8+, 61 | 0 |

IX. Examples of Overrides

In various embodiments, the UE 102 can be permitted to override SPS for a defined number of next packet transmissions. In some cases, the UE 102 may request to override an already-active SPS. In other cases, the UE 102 may request SPS reconfiguration that includes an override for a certain initial number of packets. Other examples will be apparent to one skilled in the art after reviewing the present disclosure.

Table 10 illustrates an example of elements that an SPS reconfiguration request can include for purposes of requesting override of a current packet-size profile accommodated by uplink SPS. In particular, override size of Override_Size can be requested for Number_of_Overrides packet transmissions. After Number_of_Overrides packet transmissions, an otherwise applicable size profile again becomes effective. In some embodiments, it may be requested that the override apply until further notice, for example, by setting the Number_of_Overrides to zero.

TABLE 10

| SPS Reconfiguration Request Element | Description |
|---|---|
| Override_Size | Size of upcoming packet(s), for example, in bytes. |
| Number_of_Overrides | The Override_Size applies to the next Number_of_Overrides packet transmissions. |

To illustrate the override approach, the example of Table 8 is now encoded as shown in Table 11. Size overrides can be used with respect to Table 11 in order to attain results equivalent to those of Table 8. For example, the UE 102 can send an SPS reconfiguration request with index=1, Override_Size=90, and Number_of_Overrides=3. This can achieve the same result as ConfigProfile[2] of Table 8.

TABLE 11

| Index | New_semiPer-sistSchedIntervalUL (in ms) | Size_Profile (in bytes) | Starting_SF_UL (in ms) |
|---|---|---|---|
| ConfigProfile [0] | 160 | 7 | 60 |
| ConfigProfile [1] | 20 | 52 | 20 |
| ConfigProfile [3] | 160 | 7 | 0 |

To further illustrate the override approach, the example of Table 9 is now encoded as shown below in Table 12. Size overrides can be used with respect to Table 12 in order to attain results equivalent to those of Table 9. For example, at the start of an initial talk spurt, the UE 102 can send an SPS reconfiguration request with index=1, Override_Size=90, Number_of_Overrides=1. For the remainder of the initial talk spurt, the UE 102 can send an SPS reconfiguration request with Override_Size=53 and Number_of_Overrides=1 every $61^{st}$ packet. This can achieve the same result as ConfigProfile[2] of Table 9.

TABLE 12

| Index | New_semiPer-sistSchedIntervalUL (in ms) | Size_Profile (in bytes) | Starting_SF_UL (in ms) |
|---|---|---|---|
| 0 | 160 | 7 | 60 |
| 1 | 20 | 52 | 20 |
| 3 | 160 | 7 | 0 |

At the start of a subsequent talk spurt, the UE 102 can send an SPS reconfiguration request with index=1, Override_Size=53, and Number_of_Overrides=1. For the remainder of the subsequent talk spurt, the UE can send an SPS reconfiguration request with Override_Size=53 and Number_of_Overrides=1 every $61^{St}$ packet. This can achieve the same result as ConfigProfile[1] of Table 9.

At the start of a silence interval with comfort noise, the UE 102 can send an SPS reconfiguration request with an index value of 0 or 3, depending whether a first comfort-noise packet has already been transmitted. In either case, the SPS reconfiguration request can specify Override_Size=8 and Number_of_Overrides=1. For the remainder of the silence interval, the UE 102 can transmit an SPS reconfiguration request with Override_Size=8 and Number_of_Overrides=1 at every 61st packet. In cases where the first comfort-noise packet has not yet been transmitted, this functionality can achieve the same result as ConfigProfile[0] of Table 9. In cases where the first comfort-noise packet has already been transmitted, this functionality can achieve the same result as ConfigProfile[3] of Table 9.

In certain embodiments, size overrides can be used to accommodate numerous types of packet-size fluctuations in addition to those described above. In an example, the UE 102 could request a size override whenever detecting a need to send uplink data at a volume higher than can be accommodated by a current RBA and MCS. Size overrides can also be advantageous when used with non-voice packets. For example, size overrides can be requested to accommodate web browsing on the UE 102.

It should be appreciated that, in various embodiments, size profiles can also be specified to account for packet-size fluctuations or changes caused by other events and conditions not expressly described above. For example, in an embodiment, size profiles can be specified to account for piggybacked ROHC feedbacks. Scaled encoding as described above can also be derived to address such circumstances.

In addition, it should be appreciated that a size profile such as those described above are generally usable by the eNB 104 to determine a RBA and a MCS. In certain embodiments, a granularity of size profiles can be tailored according to packet sizes that might merit a different RBA and/or MCS. For instance, in the example of Table 12 above for a subsequent talk spurt (index=1), the UE 102 may not need to request a size override every $61^{st}$ packet if the RBA is not expected to change relative to an uplink packet of size 53 bytes.

X. Examples of Uplink SPS Reconfiguration

Figure 8:
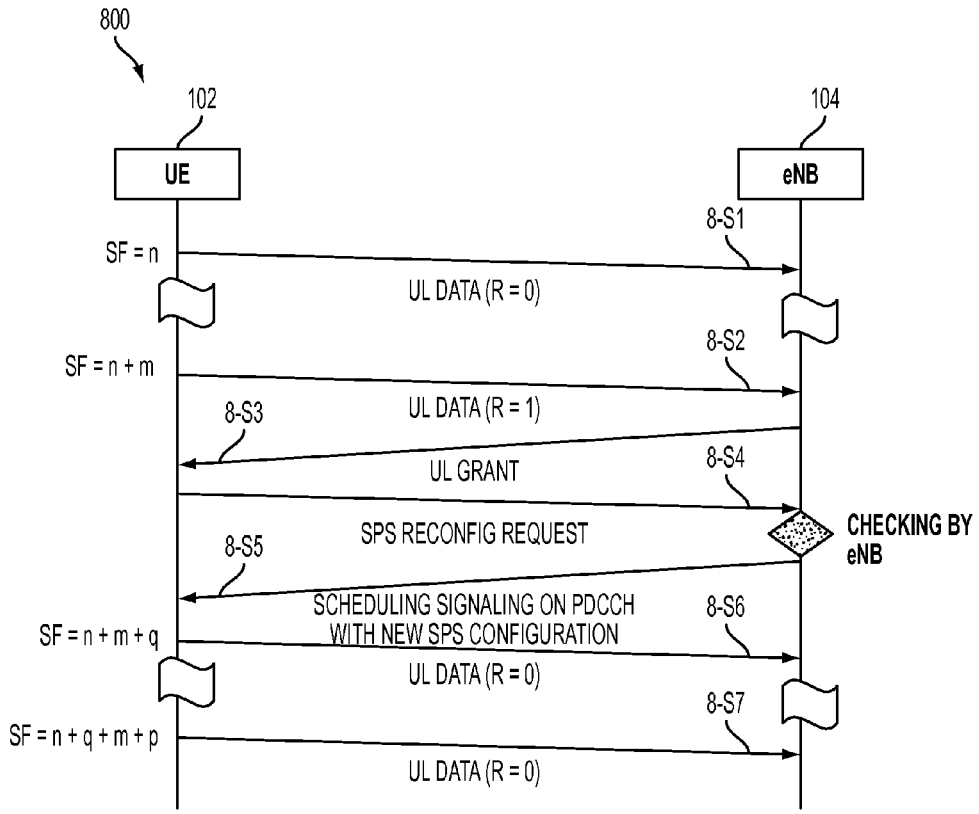
FIG. 8 illustrates an example of a signaling timeline for uplink SPS reconfiguration.

FIG. 8 illustrates a signaling timeline 800 for uplink SPS reconfiguration. For illustrative purposes, the signaling timeline 800 uses a reserved bit R that can be found, for example, in a MAC header of every uplink packet (e.g., at the MAC sublayer 510 of FIG. 5). The reserved bit R is typically set to zero in LTE specifications. In certain embodiments, the UE 102 can implicitly request an uplink grant by giving the reserved bit R a value of one.

At 8-S1, the UE 102 transmits an uplink packet to the eNB 104 using an already-active uplink SPS. As shown, the reserved bit R is set to zero in the uplink packet. At 8-S2, the UE 102 transmits another uplink packet to the eNB 104 in accordance with the uplink SPS; however, the reserved bit R is set to one. In certain embodiments, the reserved bit R being set to one can correspond to an implicit request for an uplink grant. At 8-S3, the eNB 104 allocates an uplink grant to the UE 102.

At 8-S4, according to the uplink grant, the UE 102 sends an SPS reconfiguration request, for example, as a MAC control element of an uplink packet. In general, the SPS reconfiguration request can include any of the example content described above such as actual values, indices to arrays, size overrides, etc. After verifying the SPS reconfiguration request as described, for example, with respect to blocks 708-710 of FIG. 7, at 8-S5, the eNB 104 sends scheduling signaling (e.g., DCI format 0) on a control channel such as, for example, PDCCH or ePDCCH. The scheduling signaling can include, for example, new parameters as requested in the SPS reconfiguration request. In some embodiments, rather than sending the scheduling signaling over the control channel, the eNB 104 can send an ACK (e.g., SPS_Reconfig_Ack) as a MAC control element. At 8-S6 and 8-S7, the UE 102 transmits uplink packets according to the reconfigured uplink SPS.

Figure 9:
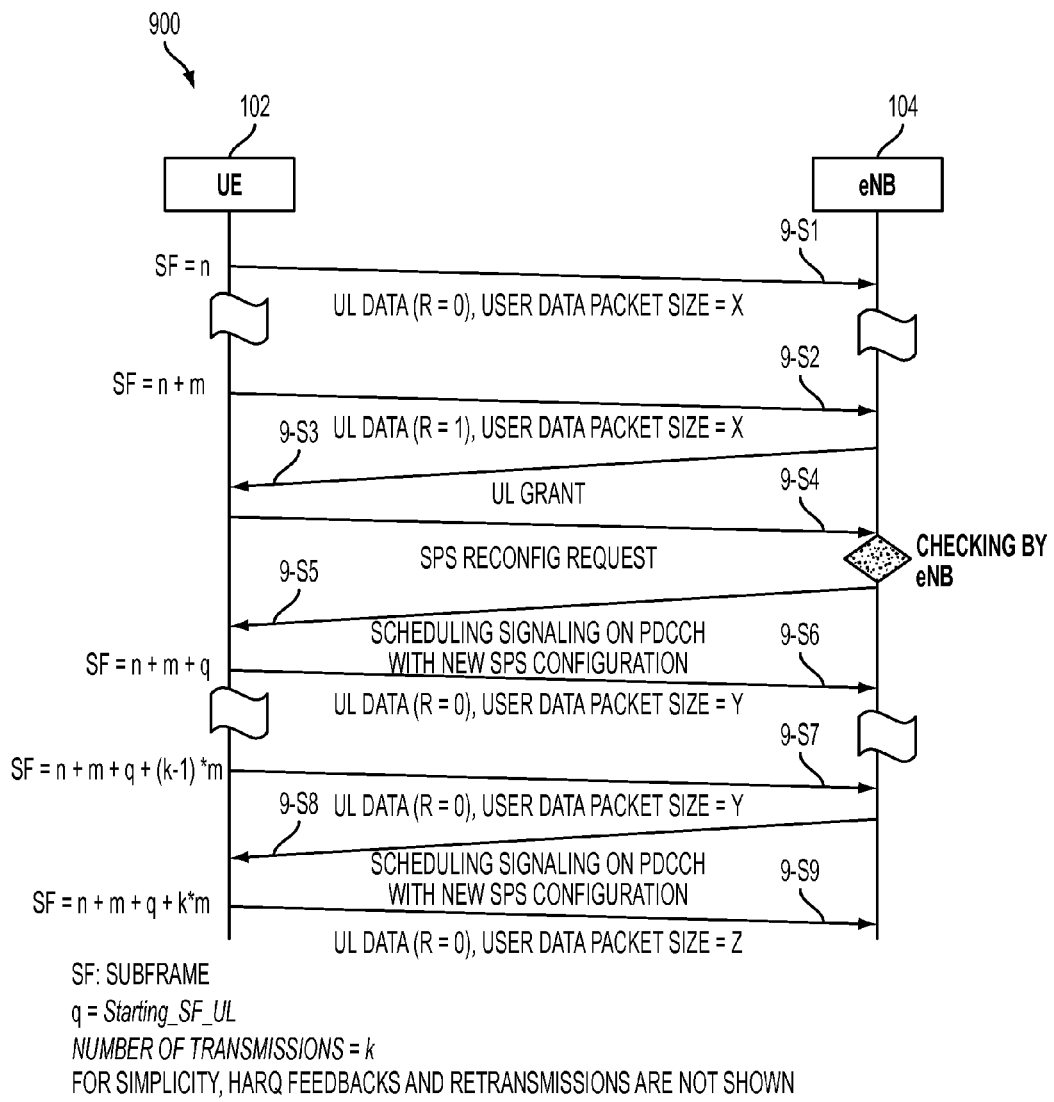
FIG. 9 illustrates an example of a signaling timeline for uplink SPS reconfiguration.

FIG. 9 illustrates a signaling timeline 900 for uplink SPS reconfiguration. For illustrative purposes, the signaling timeline 900 uses a reserved bit R that can be found, for example, in a MAC header of every uplink packet (e.g., at the MAC sublayer 510 of FIG. 5). The reserved bit R is typically set to zero in LTE specifications. In certain embodiments, the UE 102 can implicitly request an uplink grant by giving the reserved bit R a value of one.

At 9-S1, the UE 102 transmits an uplink packet of size X to the eNB 104 using an already-active uplink SPS. As shown, the reserved bit R is set to zero in the uplink packet. At 9-S2, the UE 102 transmits another uplink packet of size X to the eNB 104 in accordance with the uplink SPS; however, the reserved bit R is set to one. In certain embodiments, the reserved bit R being set to one can correspond to an implicit request for an uplink grant. At 9-S3, the eNB 104 allocates an uplink grant to the UE 102.

At 9-S4, according to the uplink grant, the UE 102 sends an SPS reconfiguration request, for example, as a MAC control element of an uplink packet. According to this example, the SPS reconfiguration request indicates a packet size of Y for future uplink packets. In various embodiments, the request can include a packet profile specifying the packet size of Y, an index to such a packet profile, etc. In general, the SPS reconfiguration request can include any of the example content described above such as actual values, indices to arrays, size overrides, etc.

After verifying the SPS reconfiguration request as described, for example, with respect to blocks 708-710 of FIG. 7, at 9-S5, the eNB 104 sends scheduling signaling (e.g., DCI format 0) on a control channel such as, for example, PDCCH or ePDCCH. The scheduling signaling can include, for example, new parameters as requested in the SPS reconfiguration request. In some embodiments, rather than sending the scheduling signaling over the control channel, the eNB 104 can send an ACK (e.g., SPS_Reconfig_Ack) as a MAC control element.

At 9-S6 and 9-S7, the UE 102 transmits uplink packets of size Y to the eNB 104 according to the reconfigured uplink SPS. For subsequent packets, the eNB 104 may send scheduling signaling as needed. In many cases, the applicable size profile may specify a set of non-uniformly-sized future uplink packets, some of which may require more or fewer RBs. For example, at 9-S8, the eNB 104 can send scheduling signaling indicative of additional SPS reconfiguration to accommodate a packet size of Z. At 9-S9, the UE 102 transmits an uplink packet of size Z to the eNB 104 according to the additional SPS reconfiguration.

Figure 10:
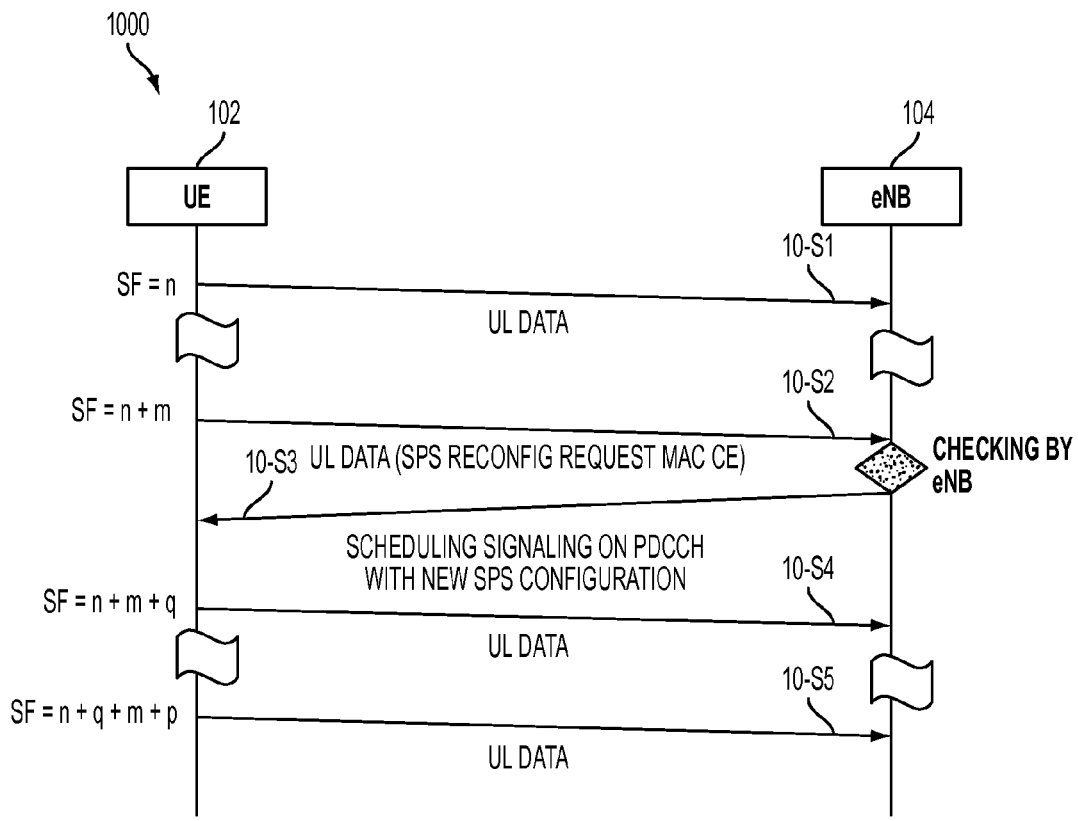
FIG. 10 illustrates an example of a signaling timeline for uplink SPS reconfiguration.

FIG. 10 illustrates a signaling timeline 1000 for uplink SPS reconfiguration. In particular, FIG. 10 depicts an example of including an SPS reconfiguration request as a MAC control element. At 10-S1, the UE 102 transmits an uplink packet to the eNB 104 using an already-active uplink SPS. At 10-S2, the UE 102 transmits an SPS reconfiguration request to the eNB 104. According to this example, the SPS reconfiguration request is transmitted at a regularly scheduled TTI according to a time-interval parameter of the already-active uplink SPS.

After verifying the SPS reconfiguration request as described, for example, with respect to blocks 708-710 of FIG. 7, at 10-S3, the eNB 104 sends scheduling signaling (e.g., DCI format 0) on a control channel such as, for example, PDCCH or ePDCCH. The scheduling signaling can include, for example, new parameters as requested in the SPS reconfiguration request. In some embodiments, rather than sending the scheduling signaling over the control channel, the eNB 104 can send an ACK (e.g., SPS_Reconfig_Ack) as a MAC control element. At 10-S4 and 10-S5, the UE 102 transmits uplink packets according to the reconfigured uplink SPS.

Figure 11:
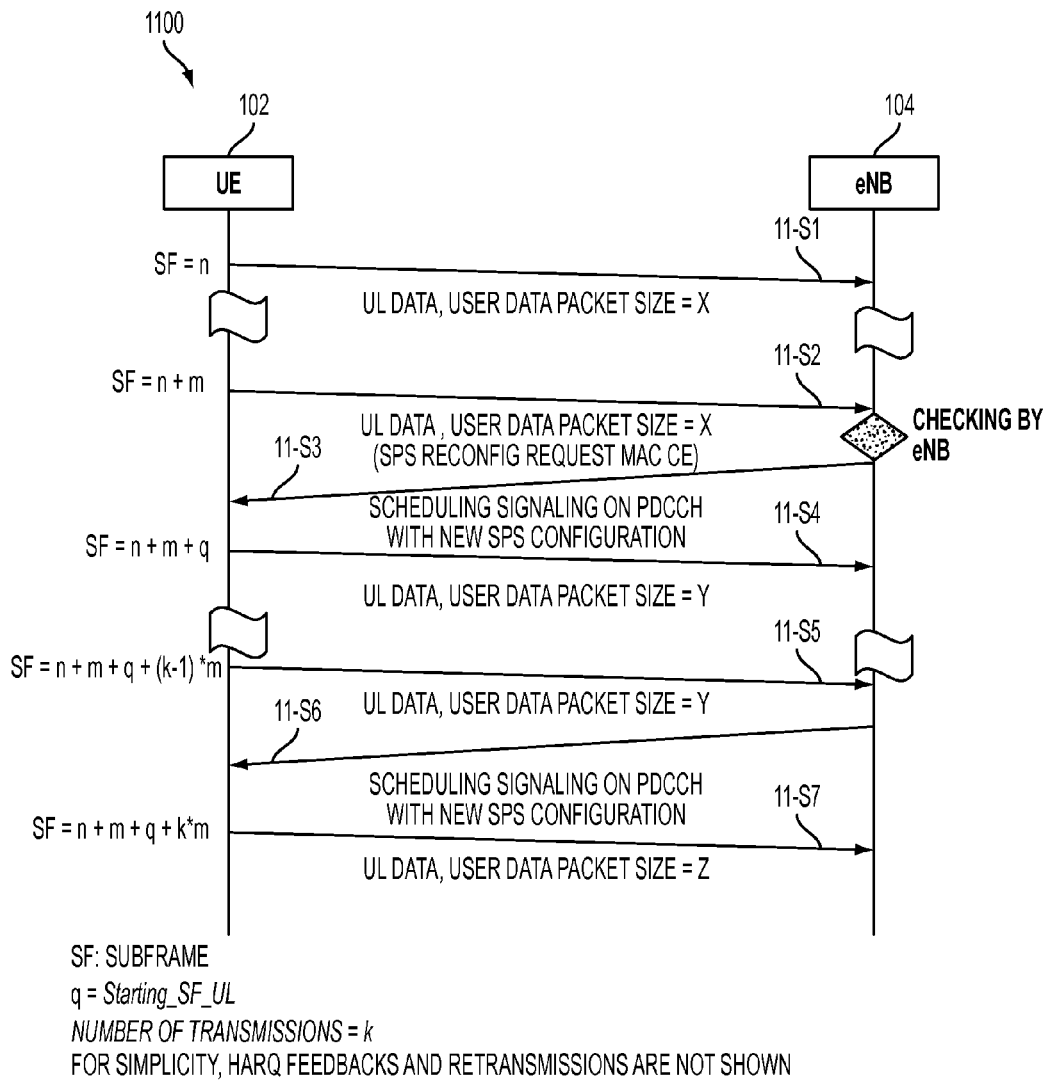
FIG. 11 illustrates an example of a signaling timeline for uplink SPS reconfiguration.

FIG. 11 illustrates a signaling timeline 1100 for uplink SPS reconfiguration. Like FIG. 10, FIG. 11 depicts an example of including an SPS reconfiguration request as a MAC control element. The example of FIG. 11 specifically relates to a reconfiguration that includes packet-size reconfiguration. At 11-S1, the UE 102 transmits an uplink packet of packet size X to the eNB 104 using an already-active uplink SPS.

At 11-S2, the UE 102 transmits another uplink packet of size X to the eNB 104. According to this example, the uplink packet of 11-S2 includes an SPS reconfiguration request as a MAC control element. The uplink packet of 11-S2 is transmitted at a regularly scheduled TTI according to a time-interval parameter of the already-active uplink SPS. According to this example, the SPS reconfiguration request indicates a packet size of Y for future uplink packets. In various embodiments, the request can include a packet profile specifying the packet size of Y, an index to such a packet profile, etc. In general, the SPS reconfiguration request can include any of the example content described above such as actual values, indices to arrays, size overrides, etc.

After verifying the SPS reconfiguration request as described, for example, with respect to blocks 708-710 of FIG. 7, at 11-S3, the eNB 104 sends scheduling signaling (e.g., DCI format 0) on a control channel such as, for example, PDCCH or ePDCCH. The scheduling signaling can include, for example, new parameters as requested in the SPS reconfiguration request. In some embodiments, rather than sending the scheduling signaling over the control channel, the eNB 104 can send an ACK (e.g., SPS_Reconfig_Ack) as a MAC control element.

At 11-S4 and 11-S5, the UE 102 transmits uplink packets of size Y to the eNB 104 according to the reconfigured uplink SPS. For subsequent packets, the eNB 104 may send scheduling signaling as needed. In many cases, the applicable size profile may specify a set of non-uniformly-sized future uplink packets, some of which may require more or fewer RBs. For example, at 11-S6, the eNB 104 can send scheduling signaling indicative of additional SPS reconfiguration to accommodate a packet size of Z. At 11-S7, the UE 102 transmits an uplink packet of size Z to the eNB 104 according to the additional SPS reconfiguration.

Figure 12:
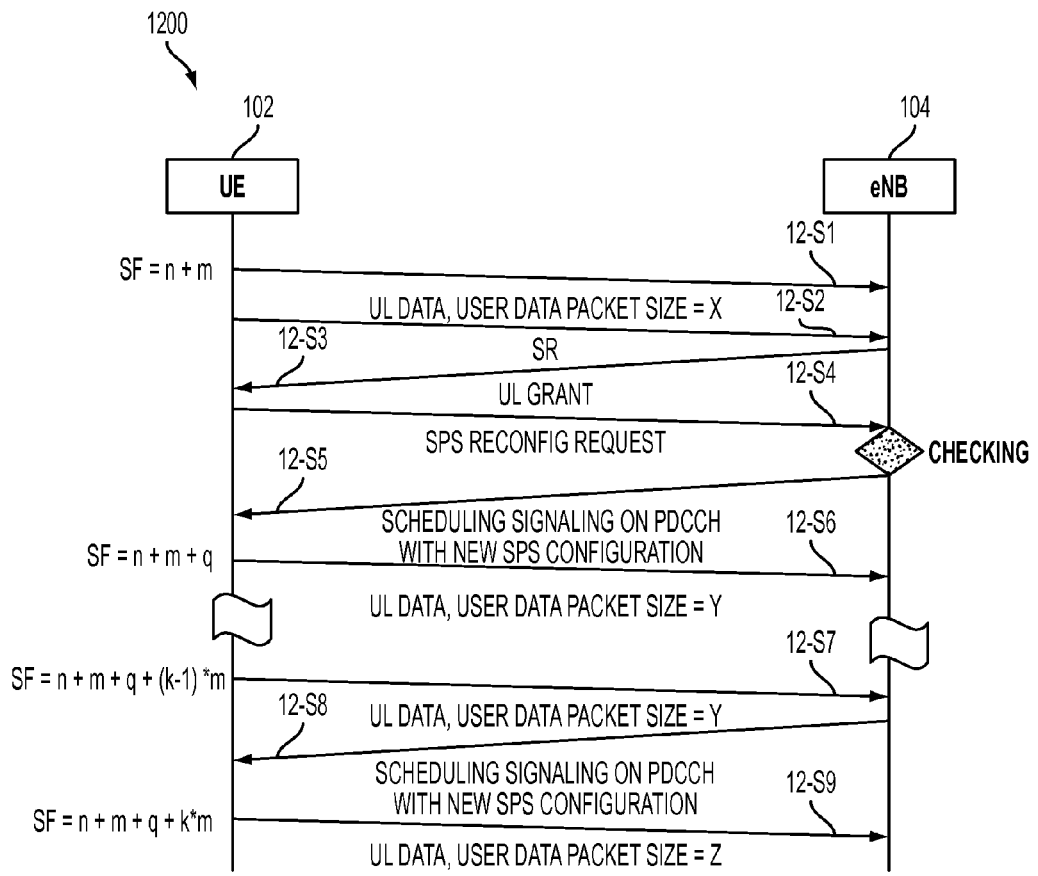
FIG. 12 illustrates an example of a signaling timeline for uplink SPS reconfiguration.

FIG. 12 illustrates a signaling timeline 1200 for uplink SPS reconfiguration. In particular, FIG. 12 depicts an example of using a SR to obtain an uplink grant for an SPS reconfiguration request. The example of FIG. 12 specifically relates to a reconfiguration that includes packet-size reconfiguration. At 12-S1, the UE 102 transmits an uplink packet of size X to the eNB 104 using an already-active uplink SPS. At 12-S2, the UE 102 transmits a SR to the eNB 104.

At 12-S3, the eNB 104 allocates an uplink grant to the UE 102 in response to the SR. At 12-S4, according to the uplink grant, the UE 102 sends an SPS reconfiguration request, for example, as a MAC control element of an uplink packet. According to this example, the SPS reconfiguration request indicates a packet size of Y for future uplink packets. In various embodiments, the request can include a packet profile specifying the packet size of Y, an index to such a packet profile, etc. In general, the SPS reconfiguration request can include any of the example content described above such as actual values, indices to arrays, size overrides, etc.

After verifying the SPS reconfiguration request as described, for example, with respect to blocks 708-710 of FIG. 7, at 12-S5, the eNB 104 sends scheduling signaling (e.g., DCI format 0) on a control channel such as, for example, PDCCH or ePDCCH. The scheduling signaling can include, for example, new parameters as requested in the SPS reconfiguration request. In some embodiments, rather than sending the scheduling signaling over the control channel, the eNB 104 can send an ACK (e.g., SPS_Reconfig_Ack) as a MAC control element.

At 12-S6 and 12-S7, the UE 102 transmits uplink packets of size Y to the eNB 104 according to the reconfigured uplink SPS. For subsequent packets, the eNB 104 may send scheduling signaling as needed. In many cases, the applicable size profile may specify a set of non-uniformly-sized future uplink packets, some of which may require more or fewer RBs. For example, at 12-S8, the eNB 104 can send scheduling signaling indicative of additional SPS reconfiguration to accommodate a packet size of Z. At 12-S9, the UE 102 transmits an uplink packet of size Z to the eNB 104 according to the additional SPS reconfiguration.

Figure 13:
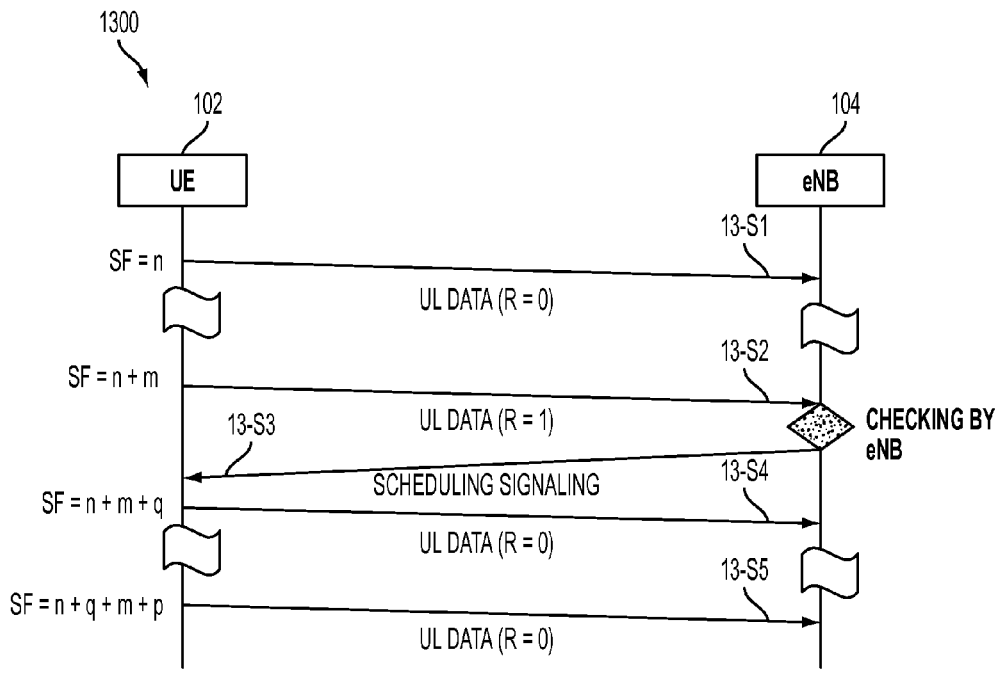
FIG. 13 illustrates an example of a signaling timeline for uplink SPS reconfiguration.

FIG. 13 illustrates a signaling timeline 1300 for uplink SPS reconfiguration. More specifically, FIG. 13 illustrates an example of performing SPS reconfiguration by toggling between two reconfiguration settings or sets of reconfiguration settings. The reconfiguration settings can be, for example, two configuration profiles, two alternative reconfiguration settings for a time-interval parameter, two alternative packet-size profiles, and/or the like. In certain embodiments, the toggling can be initiated responsive to a detected transition from a talk spurt to a silence interval, a detected transition from a silence interval to a talk spurt, etc.

In certain embodiments, the UE 102 can signal a toggling, for example, in a current uplink packet according to already-active uplink SPS. The example of FIG. 13 uses a reserved bit R that can be found, for example, in a MAC header of every uplink packet (e.g., at the MAC sublayer 510 of FIG. 5). The reserved bit R is typically set to zero in LTE specifications. In certain embodiments, the UE 102 can signal a toggling by setting the reserved bit R to one.

At 13-S1, the UE 102 transmits an uplink packet to the eNB 104 using an already-active uplink SPS. As shown, the reserved bit R is set to zero in the uplink packet. At 13-S2, the UE 102 transmits another uplink packet to the eNB 104 in accordance with the uplink SPS; however, the reserved bit R is now set to one. In certain embodiments, the reserved bit R being set to one can correspond to a toggle indicator. In other words, the toggle indicator can be considered an SPS reconfiguration request. For example, the toggle indicator may be indicative of a transition from a talk spurt to silence interval, a transition from a silence interval to a talk spurt, and/or the like.

After verifying the SPS reconfiguration request as described, for example, with respect to blocks 708-710 of FIG. 7, at 13-S3, the eNB 104 sends scheduling signaling (e.g., DCI format 0) on a control channel such as, for example, PDCCH or ePDCCH. The scheduling signaling can include, for example, new parameters that correspond to alternative settings or an alternative profile (i.e., as requested via the toggle indicator). In some embodiments, rather than sending the scheduling signaling over the control channel, the eNB 104 can send an ACK (e.g., SPS_Reconfig_Ack) as a MAC control element. At 13-S4 and 13-S5, the UE 102 transmits uplink packets according to the reconfigured uplink SPS.

Figure 14:
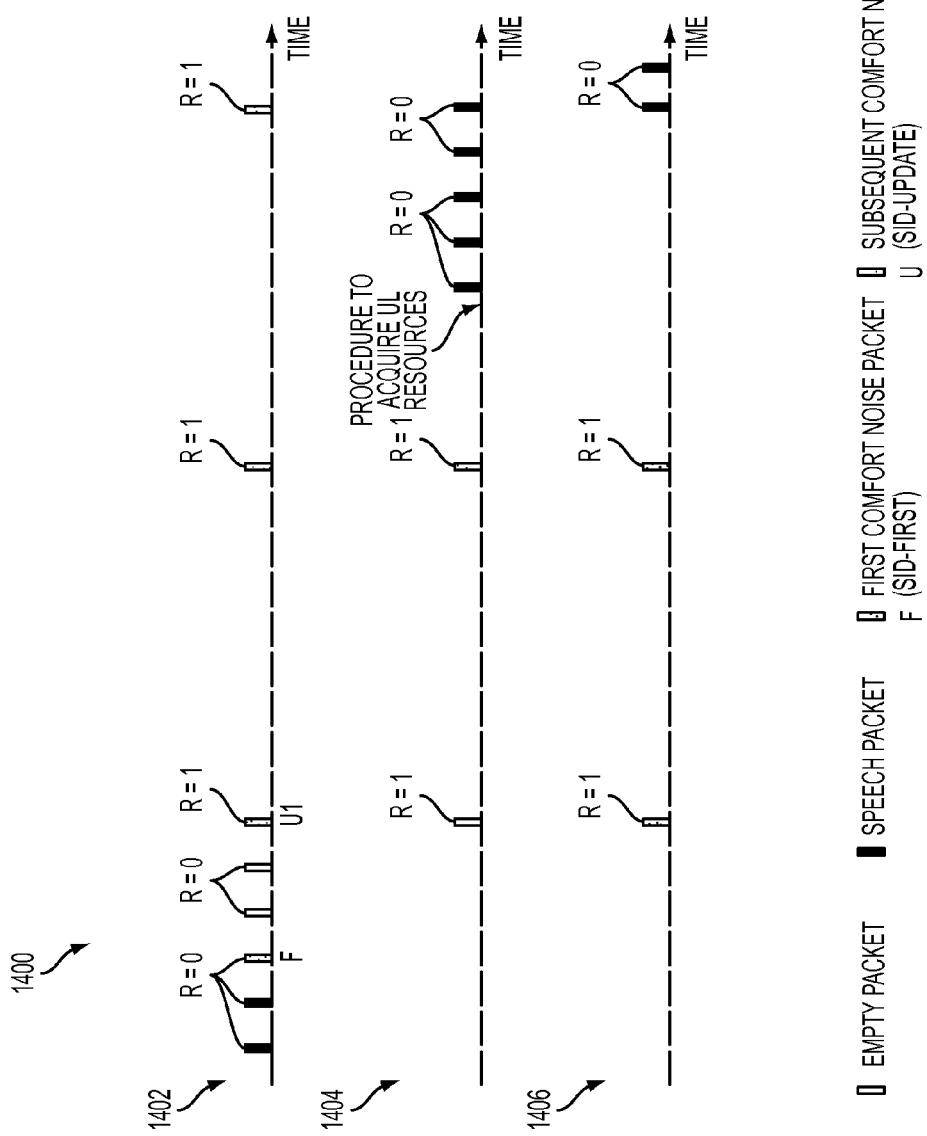
FIG. 14 illustrates an example of using a reserved bit to identify reconfiguration settings.

FIG. 14 illustrates an example 1400 of using the reserved bit R to identify reconfiguration settings. In similar fashion to the example of FIG. 13, the example 1400 relates to performing SPS reconfiguration when there are two reconfiguration settings or sets of reconfiguration settings. The reconfiguration settings can be, for example, two configuration profiles, two alternative reconfiguration settings for a time-interval parameter, two alternative packet-size profiles, and/or the like. Differently from the example of FIG. 13, however, FIG. 14 depicts utilization of the reserved bit R to identify an index value of reconfiguration settings or a set of reconfiguration settings that should be applicable.

Specifically, the example 1400 includes a timeline 1402, a timeline 1404, and a timeline 1406. The timeline 1402 illustrates an example of a transition from a talk spurt to a silence interval. At each uplink transmission, the UE 102 can indicate an index value (e.g., 0 or 1) that corresponds to a reconfiguration setting or set of reconfiguration settings that should be applicable. Therefore, the reserved bit R can be meaningful with each uplink transmission. For example, as illustrated in the timeline 1402, a value of zero can correspond to an index value for a talk spurt. Similarly, a value of one can correspond to an index value for a silence interval. In the timeline 1402, when the UE 102 transmits an uplink packet such that R equals one, a transition to the silence interval can be indicated and the eNB 104 can initiate uplink SPS reconfiguration and corresponding scheduling signaling in the fashion described above.

In a similar manner, the timelines 1404 and 1406 illustrate transitions from a silence interval to a talk spurt. Thus, R is set to one during each uplink transmission of the talk spurt. As shown in the timeline 1404, in some embodiments, the UE 102 can initiate SPS reconfiguration by requesting, for example, an uplink grant and setting the reserved bit R appropriately in a next uplink packet. The timeline 1404 can be advantageous, for example, if there is no scheduled transmission opportunity when the talk spurt starts. In other embodiments, as shown in the timeline 1406, the UE 102 can set the reserved bit R appropriately at a next scheduled transmission opportunity. The timeline 1406 can be beneficial, for example, if there is a scheduled transmission opportunity sufficiently close to when the talk spurt starts.

Figures 15A, 15B, 15C:
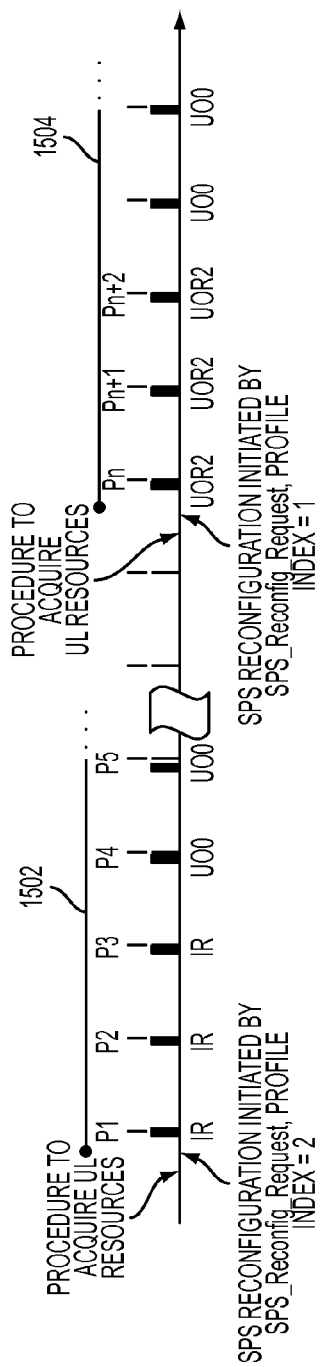
FIG. 15A illustrates an example of a SPS reconfiguration for an initial talk spurt and a subsequent talk spurt.
FIG. 15B illustrates an example of SPS reconfiguration for a silence interval.
FIG. 15C illustrates an example of SPS reconfiguration for a silence interval.

FIGS. 15A-15C illustrate examples of SPS reconfiguration using SPS reconfiguration settings as shown below in Table 13. It should be appreciated that the content of Table 13 is identical to that of Table 8 above.

TABLE 13

| Index | New_semiPer-<br>sistSchedIntervalUL<br>(in ms) | Size_Profile<br>(in bytes) | Starting_SF_UL<br>(in ms) |
|---|---|---|---|
| ConfigProfile[0] | 160 | 8, 8,<br>8, 7* | 60 |
| ConfigProfile[1] | 20 | 53, 53,<br>53, 52* | 20 |
| ConfigProfile[2] | 20 | 90, 90,<br>90, 52* | 20 |
| ConfigProfile[3] | 160 | 8, 8,<br>8, 7* | 0 |

FIG. 15A illustrates SPS reconfiguration for an initial talk spurt 1502 and a subsequent talk spurt 1504. For purposes of the example of FIG. 15A, it can be assumed that at least one silence interval occurs between the initial talk spurt 1502 and the subsequent talk spurt 1504.

At a start of the initial talk spurt 1502, or at a time just before the start, the UE 102 acquires uplink resources (e.g., an uplink grant) and transmits an SPS reconfiguration request to the eNB 104. With reference to Table 13 above, the SPS reconfiguration request specifies an index value of two. According to this example, the index value of two from Table 13 corresponds to a talk spurt that begins with IR packets (as is the case with the initial talk spurt 1502).

At a start of the subsequent talk spurt 1504, or at a time just before the start, the UE 102 acquires uplink resources (e.g., an uplink grant) and transmits a second SPS reconfiguration request to the eNB 104. With reference to Table 13 above, the second SPS reconfiguration request specifies an index value of one. According to this example, the index value of one from Table 13 corresponds to a talk spurt that begins with type UOR2 packets (as is the case with the subsequent talk spurt 1504).

FIG. 15B illustrates SPS reconfiguration for a silence interval 1506. FIG. 15B depicts a scenario in which the UE-side reconfiguration component 114 is aware of the silence interval 1506 from the very first packet thereof (e.g., first comfort-noise packet). In some embodiments, the vocoder 108 may give the UE-side reconfiguration component 114 advance notice of the silence interval 1506. At a start of the silence interval 1506, or just before the start, the UE 102 acquires uplink resources (e.g., an uplink grant) and transmits an SPS reconfiguration request to the eNB 104. With reference to Table 13 above, the SPS reconfiguration request specifies an index value of zero, which index value corresponds to an interval beginning with a first packet of the silence interval 1506.

FIG. 15C illustrates SPS reconfiguration for a silence interval 1508. In particular, FIG. 15C depicts a scenario in which the UE-side reconfiguration component 114 is not aware of the silence interval 1508 from the very first packet. In some embodiments, the vocoder 108 may not give the UE-side reconfiguration component 114 advance notice of the silence interval 1508. In these embodiments, the UE-side reconfiguration component 114 may infer the silence interval 1508, for example, after the transmission of two empty packets. After detecting the silence interval 1508, the UE 102 acquires uplink resources (e.g., an uplink grant) and transmits an SPS reconfiguration request to the eNB 104. With reference to Table 13 above, the SPS reconfiguration request can specify an index value of three, which index value corresponds to an interval that begins with a subsequent packet (e.g., a second packet) of the silence interval 1508.

It should be appreciated that, in some cases, a codec implemented by the vocoder 108 may not transmit comfort-noise packets during silence intervals. In such cases, when the UE 102 sends an SPS reconfiguration request responsive to a talk-spurt-to-silence-interval transition, the eNB 104 may elect to explicitly release an uplink SPS. According to this example, the UE 102 can initiate SPS activation upon transition to a subsequent talk spurt.

XI. Examples of Establishing Uplink SPS Reconfiguration Settings

In certain embodiments, uplinks SPS reconfiguration settings such as, for example, those settings described above with respect to Tables 3-12, can be established by the UE 102, the eNB 104, a combination thereof, and/or the like. For illustrative purposes, examples will be provided below relative to UE 102 and the eNB 104.

Figure 16:
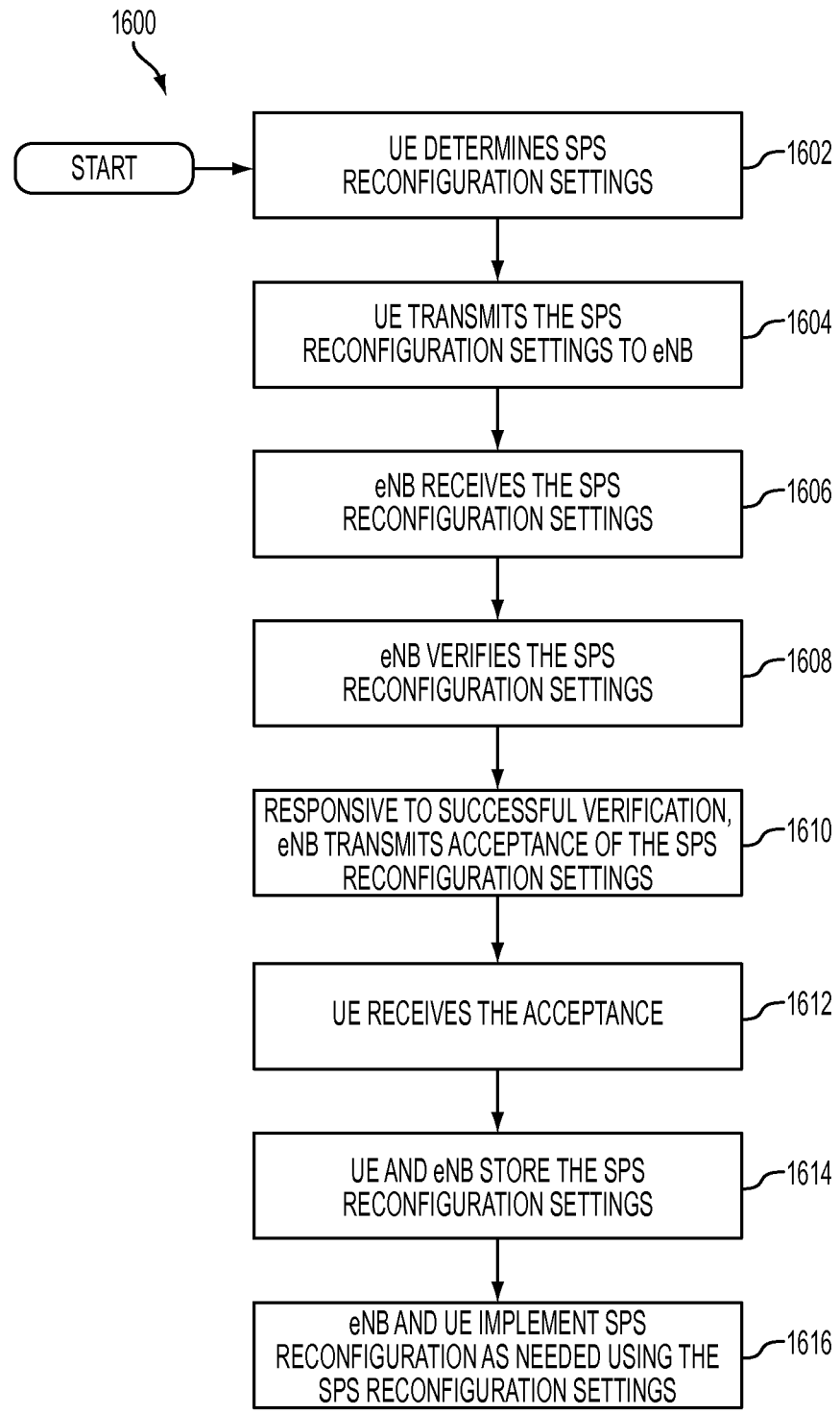
FIG. 16 illustrates an example of a process for UE establishment of SPS reconfiguration settings.

FIG. 16 illustrates an example of a process 1600 for UE establishment of SPS reconfiguration settings. The process 1600 can be implemented by any system that can process data and send/receive signals. For example, the process 1600, in whole or in part, can be implemented by one or more of the UE 102, the eNB 104, the UE 300, the UE 402, the eNB 406, the UE-side scheduler component 110, the UE-side reconfiguration component 114, the UE-side reconfiguration settings component 120, the eNB-side reconfiguration component 118, and/or the eNB-side reconfiguration settings component 126. The process 1600 can also be performed generally by the wireless communication system 100. Although any number of systems, in whole or in part, can implement the process 1600, to simplify discussion, the process 1600 will be described in relation to the UE 102 and/or the eNB 104, as appropriate.

At block 1602, the UE 102 determines uplink SPS reconfiguration settings. For example, in various embodiments, the UE-side reconfiguration component 114 can monitor time intervals, packet sizes, and transition spacing at an output of vocoder (e.g., the encoder 208 or the vocoder 108) as described with respect to FIGS. 1-2. The UE 102 can also monitor an output of an ROHC compressor or ROHC decompressor (e.g., the ROHC 214 or the ROHC 222 of FIG. 2). In certain embodiments, the UE-side reconfiguration component 114 can receive some of the uplink SPS reconfiguration settings, for example, from the vocoder, the ROHC compressor, or another suitable component. The uplink SPS reconfiguration settings can be similar to those described above, for example, with respect to Tables 3-12.

At block 1604, the UE 102 transmits the uplink SPS reconfiguration settings to the eNB 104. At block 1606, the eNB 104 receives the uplink SPS reconfiguration settings. At block 1608, the eNB 104 optionally verifies the uplink SPS reconfiguration settings. In certain embodiments, the block 1608 can include performing functionality similar to the functionality described with respect to blocks 708-712 of FIG. 7. In certain embodiments, the block 1608 may be omitted. In these embodiments, the process 1600 may proceed directly from block 1606 to 1610 without any requirement of successful verification.

At block 1610, responsive to successful verification, the eNB 104 transmits acceptance of the uplink SPS reconfiguration settings to the UE 102. At block 1612, the UE 102 receives the acceptance. At block 1614, the UE 102 and the eNB 104 store the uplink SPS reconfiguration settings, for example, in respective memory thereof. At block 1618, the UE 102 and the eNB 104 implement the uplink SPS reconfiguration settings as needed, for example, by performing corresponding functionality upon the occurrence of an appropriate transition or event.

Figure 17:
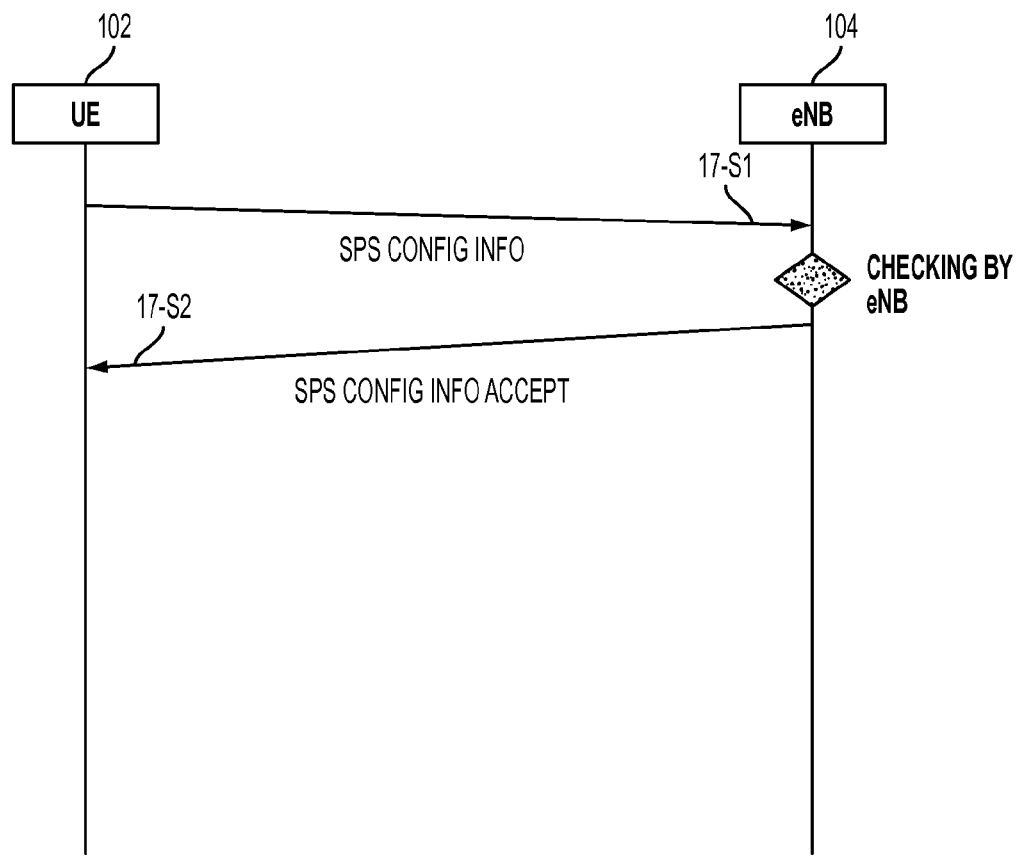
FIG. 17 illustrates an example of a signaling timeline for accomplishing transfer of uplink SPS reconfiguration settings from a UE to an eNB.

FIG. 17 illustrates an example of a signaling timeline 1700 for accomplishing transfer of uplink SPS reconfiguration settings from a UE to an eNB. For illustrative purposes, the signaling timeline 1700 will be described relative to the UE 102 and the eNB 104 of FIG. 1. In various embodiments, operations depicted in the signaling timeline 1700 may be performed as at least part of the process 1600 of FIG. 16.

At 17-S1, the UE 102 sends uplink SPS reconfiguration settings to the eNB 104. For example, the uplink SPS reconfiguration settings can be sent in a new MAC control element (e.g., SPS_Config_Info). In certain embodiments, the new MAC control element can be identified by a logical channel ID (LCID) value assigned from one of a set of reserved LCID values (e.g., "01100"). After verifying the uplink SPS reconfiguration settings, for example, as described with respect to block 1608 of FIG. 16, at 17-S2, the eNB 104 transmits an acceptance of the uplink SPS reconfiguration settings. The acceptance can be, for example, a new MAC control element (e.g., SPS_Config_Info_Accept). In certain embodiments, the new MAC control element can be identified by a new LCID value (e.g., "01101"). Subsequently, the UE 102 can send an SPS reconfiguration request to transition from one SPS configuration to another as described in detail above.

Figure 18:
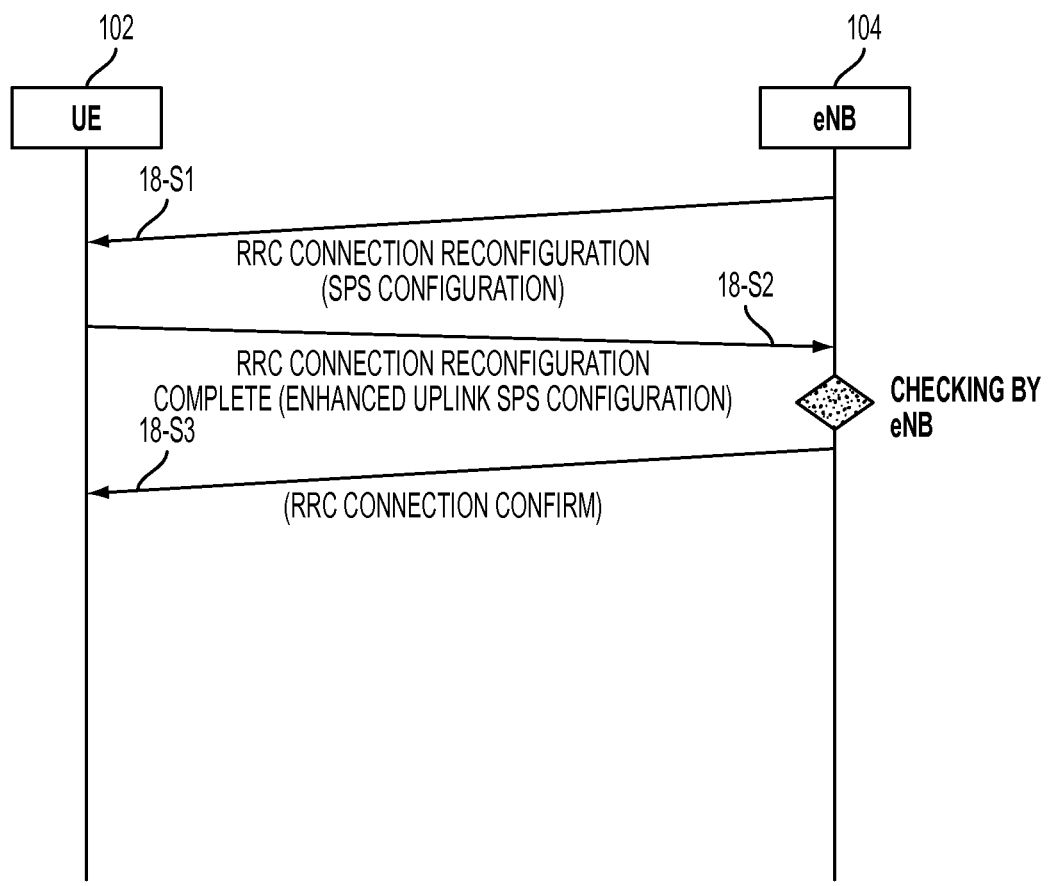
FIG. 18 illustrates an example of a signaling timeline for accomplishing transfer of uplink SPS reconfiguration settings from a UE to an eNB using RRC signaling.

FIG. 18 illustrates an example of a signaling timeline 1800 for accomplishing transfer of uplink SPS reconfiguration settings from a UE to an eNB using RRC signaling (e.g., at the RRC sublayer 516). For illustrative purposes, the signaling timeline 1800 will be described relative to the UE 102 and the eNB 104 of FIG. 1. In various embodiments, operations depicted in the signaling timeline 1800 may be performed as at least part of the process 1600 of FIG. 16.

At 18-S1, the eNB 104 transmits to UE 102 a RRC connection reconfiguration that includes information related to an active uplink SPS. At 18-S2, the UE 102 replies, for example, with a "RRC Connection Reconfiguration Complete" message, which message can include the uplink SPS reconfiguration settings. After verifying the uplink SPS reconfiguration settings, for example, as described with respect to block 1608 of FIG. 16, at 18-S3, the eNB 104 transmits, for example, a "RRC Connection Confirm" message. Subsequently, the UE 102 can send an SPS reconfiguration request to transition from one SPS configuration to another as described in detail above.

Figure 19:
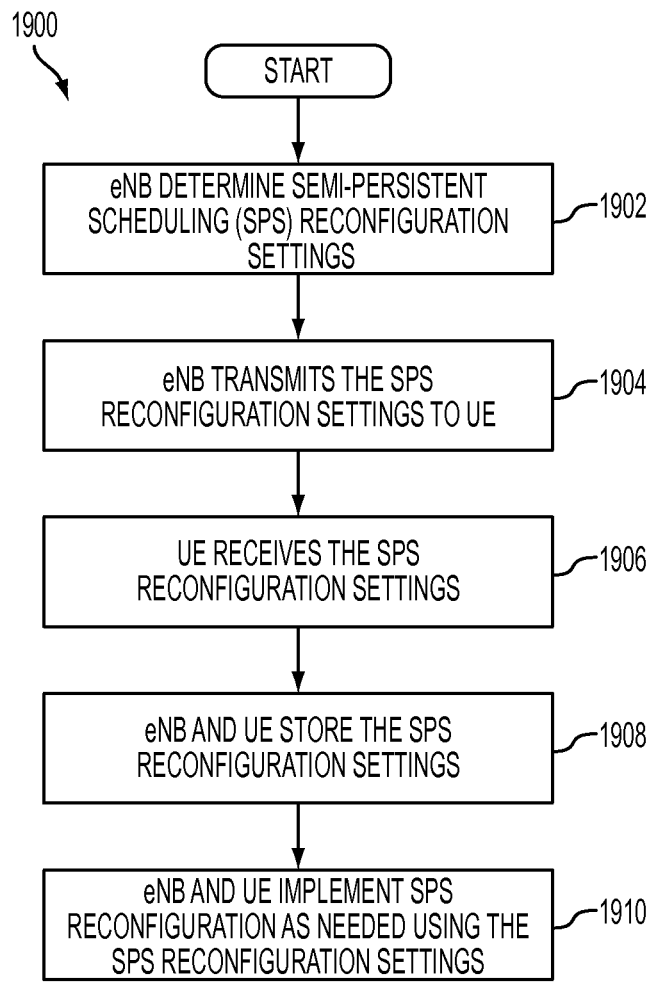
FIG. 19 illustrates an example of a process for eNB establishment of uplink SPS reconfiguration settings.

FIG. 19 illustrates an example of a process 1900 for eNB establishment of uplink SPS reconfiguration settings. The process 1900 can be implemented by any system that can process data and send/receive signals. For example, the process 1900, in whole or in part, can be implemented by one or more of the UE 102, the eNB 104, the UE 300, the UE 402, the eNB 406, the UE-side scheduler component 110, the UE-side reconfiguration component 114, the UE-side reconfiguration settings component 120, the eNB-side reconfiguration component 118, and/or the eNB-side reconfiguration settings component 126. The process 1900 can also be performed generally by the wireless communication system 100. Although any number of systems, in whole or in part, can implement the process 1900, to simplify discussion, the process 1900 will be described in relation to the UE 102 and/or the eNB 104, as appropriate.

At block 1902, the eNB 104 determines uplink SPS reconfiguration settings. In an example, the uplink SPS reconfiguration settings can be preconfigured on the eNB 104 based on known values for the most commonly expected codecs and/or expected ROHC implementation behavior. For example, in certain embodiments, the values in Table 8 above can be used assuming an AMR or AMR-WB codec and ROHC. In another example, the eNB 104 can determine the uplink SPS reconfiguration settings by observing intervals, packet sizes, transition spacing, and/or other characteristics of uplink transmissions from the UE 102. According to this example, the uplink SPS reconfiguration settings can be inferred. In another example, the uplink SPS reconfiguration settings can be determined by the eNB 104, for example, at bearer setup. In certain embodiments, from an IP version (e.g., v4 or v6) of the bearer, the eNB can determine a size of part of the static context. Bearer-level QoS attributes communicated to the eNB 104 at bearer setup can be enhanced to include the uplink SPS reconfiguration settings.

At block 1904, the eNB 104 transmits the uplink SPS reconfiguration settings to the UE 102. In one example, the uplink SPS reconfiguration settings can be transmitted to the UE 102 via RRC signaling at a time of uplink SPS activation (e.g., at block 702 of FIG. 7). Another example will be described with respect to FIG. 20.

At block 1906, the UE 102 receives the uplink SPS reconfiguration settings. At block 1908, the UE 102 and the eNB 104 store the uplink SPS reconfiguration settings, for example, in respective memory thereof. At block 1910, the UE 102 and the eNB 104 implement the uplink SPS reconfiguration settings as needed, for example, by performing corresponding functionality upon the occurrence of an appropriate transition or event.

Figure 20:
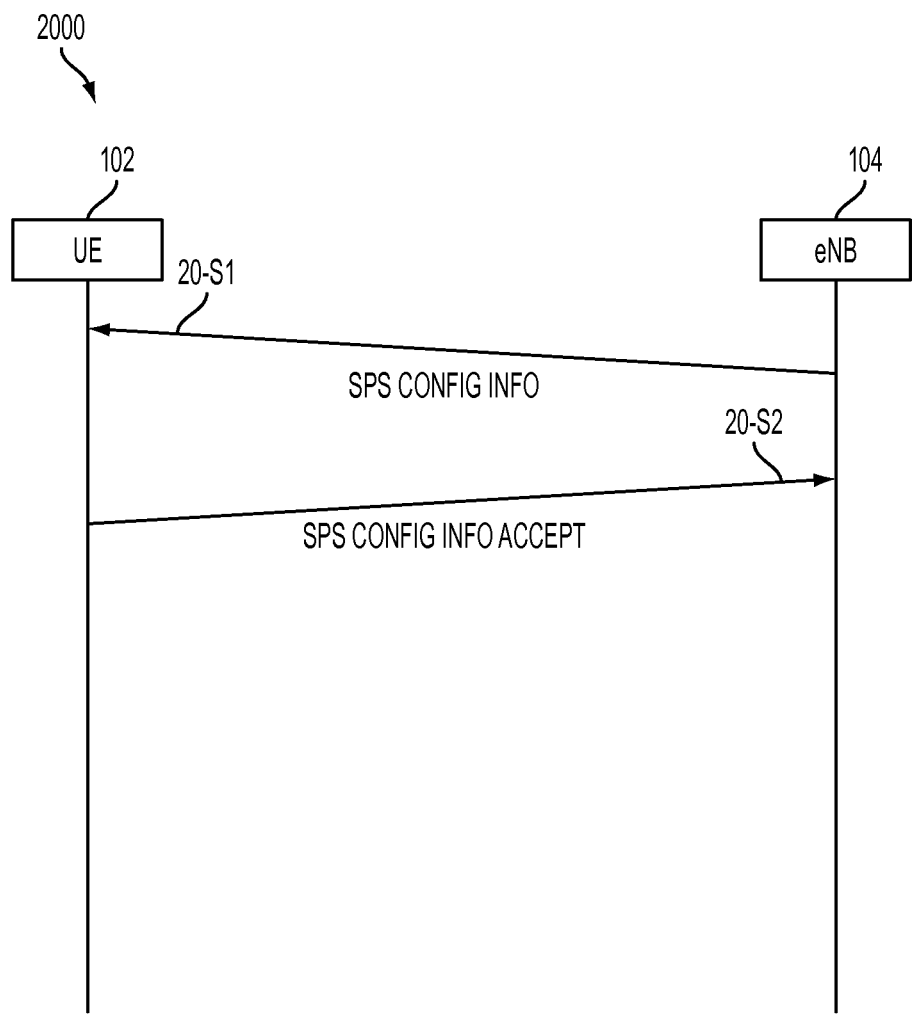
FIG. 20 illustrates an example of a signaling timeline for accomplishing transfer of uplink SPS reconfiguration settings from an eNB to a UE.

FIG. 20 illustrates an example of a signaling timeline 2000 for accomplishing transfer of uplink SPS reconfiguration settings from an eNB to a UE. For illustrative purposes, the signaling timeline 2000 will be described relative to the UE 102 and the eNB 104 of FIG. 1. In various embodiments, operations depicted in the signaling timeline 2000 may be performed as at least part of the process 1900 of FIG. 19.

At 20-S1, the eNB 104 sends uplink SPS reconfiguration settings to the UE 102. For example, the uplink SPS reconfiguration settings can be sent in a new MAC control element (e.g., SPS_Config_Info). In certain embodiments, the new MAC control element can be identified by a LCID value assigned from one of a set of reserved LCID values (e.g. "01100"). At 20-S2, the UE 102 transmits an acceptance of the uplink SPS reconfiguration settings. The acceptance can be, for example, a new MAC control element (e.g., SPS_Config_Info_Accept). In certain embodiments, the new MAC control element can be identified by a new LCID value (e.g., "01101"). Subsequently, the UE 102 can send an SPS reconfiguration request to transition from one SPS configuration to another as described in detail above.

XII. Examples of Implicit Uplink SPS Reconfiguration

In certain embodiments, uplink SPS can be designed to be implicitly reconfigured when a UE such as the UE 102 triggers an SPS-reconfiguration event. In an example, the implicit-reconfiguration event can be triggered by the UE 102 transmitting a certain number of consecutive empty packets (e.g., a MAC PDU with no MAC SDU). Particular criteria for the SPS-reconfiguration event (e.g., the certain number of empty packets) can be specified in an implicit-reconfiguration parameter of the uplink SPS. In various embodiments, the implicit-reconfiguration event can be associated with a set of SPS reconfiguration settings (e.g., a configuration profile as described above). In general, the associated reconfiguration settings can be similar to those described with respect to Tables 3-12. In that way, a preconfigured adjustment can occur when the UE 102 triggers the SPS-reconfiguration event.

In an example, a silence-interval configuration profile can be associated with a SPS-reconfiguration event. If the SPS-reconfiguration event is triggered by transmitting a certain number of empty packets as described above, upon a detected transition from a talk spurt to a silence interval, the UE 102 can unambiguously indicate to the eNB 104 both the transition and a desired SPS reconfiguration by transmitting the certain number of consecutive empty packets (i.e., in its transmission opportunities). According to this example, the eNB 104 can detect the transmission of the certain number of empty packets as a trigger of the SPS-reconfiguration event and optionally reconfigure the uplink SPS according to the silence-interval configuration profile. Additional examples will be described below with respect to FIGS. 21-22.

Figure 21:
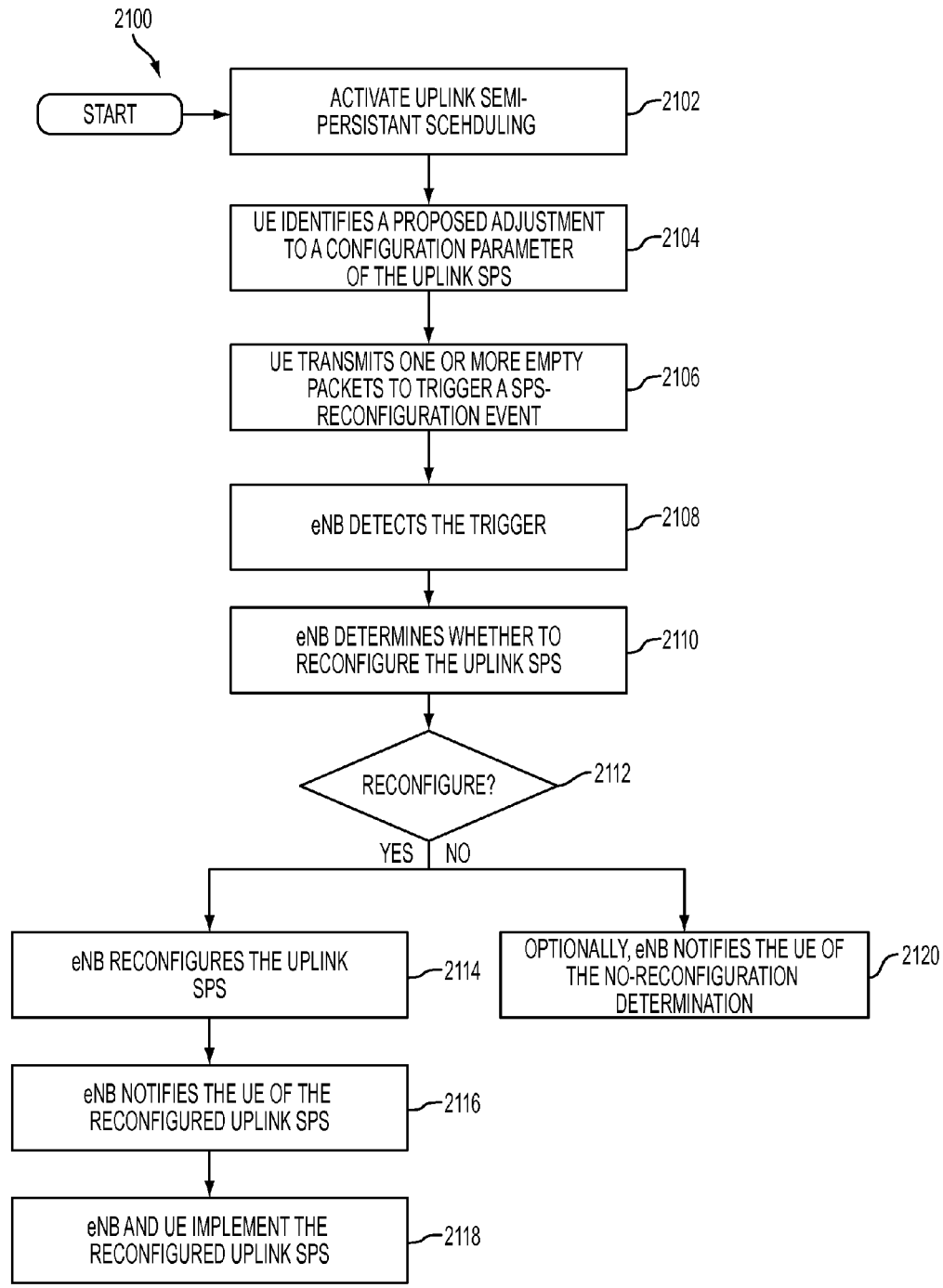
FIG. 21 illustrates an example of a process for performing implicit uplink SPS reconfiguration.

FIG. 21 illustrates an example of a process 2100 for performing implicit uplink SPS reconfiguration. The process 2100 can be implemented by any system that can process data and send/receive signals. For example, the process 2100, in whole or in part, can be implemented by one or more of the UE 102, the eNB 104, the UE 300, the UE 402, the eNB 406, the UE-side scheduler component 110, the UE-side reconfiguration component 114, the UE-side reconfiguration settings component 120, the eNB-side reconfiguration component 118, and/or the eNB-side reconfiguration settings component 126. The process 2100 can also be performed generally by the wireless communication system 100. Although any number of systems, in whole or in part, can implement the process 2100, to simplify discussion, the process 2100 will be described in relation to the UE 102 and/or the eNB 104, as appropriate.

At block 2102, uplink SPS is activated. In certain embodiments, the uplink SPS can be activated via, for example, two signaling steps. First, the eNB 104 can send an SPS configuration to the UE 102 via RRC signaling (e.g., at the RRC sublayer 516). Second, the eNB 104 can send scheduling signaling (e.g., downlink control information (DCI) format 0) on a control channel (e.g., PDCCH, ePDCCH, etc.). The scheduling information can include, for example, a RBA and an MCS. In some embodiments, to indicate that this is not a regular DCI format 0 but rather one for SPS, the signaling can be addressed to an SPS Cell Radio Network Temporary Identifier (C-RNTI) of the UE 102 using, for example, specific bit patterns. A first SPS uplink transmission can be specified to begin at subframe n. The uplink SPS can include, for example, the parameters listed in Table 14 below.

TABLE 14

| Parameter | Description |
| --- | --- |
| Time-Interval Parameter ("semiPersistSchedIntervalUL") | Interval between the periodic transmission opportunities, in units of TTIs. m is set to this parameter value |
| Implicit-Release Parameter ("implicitReleaseAfter") | If there has been no uplink data (e.g., only empty packets) after implicitReleaseAfter transmission opportunities, the SPS is released. |
| Implicit-Reconfiguration Parameter ("implicitReconfigurationAfter") | If there has been no uplink data (e.g., only empty packets) after implicitReconfigurationAfter transmission opportunities, the SPS is reconfigured in a preconfigured manner. |

In particular, Table 14 illustrates inclusion of an implicit-reconfiguration parameter in the uplink SPS. In general, the implicit-reconfiguration parameter can define a trigger for an SPS-reconfiguration event. For example, the implicit-reconfiguration parameter can specify a certain number of consecutive empty packets as described above. In a typical embodiment, the implicit-reconfiguration parameter is associated with a set of reconfiguration settings (e.g., a configuration profile for a silence interval). In certain embodiments, the set of reconfiguration settings can be determined and exchanged in any manner described above with respect to FIGS. 16-20.

At block 2104, the UE 102 identifies a proposed adjustment to a configuration parameter of the uplink SPS. The block 2104 can generally include performing any of the functionality described above with respect to block 704 of FIG. 7. For example, the UE 102 may identify a transition from a talk spurt to a silence interval. At block 2106, the UE 102 transmits the certain number of empty packets (e.g., one or more) to trigger the SPS-reconfiguration event. At block 2108, the eNB 104 detects the trigger. As described above, the SPS-reconfiguration event is associated with a preconfigured adjustment contained within reconfiguration settings.

At block 2110, the eNB 104 optionally determines whether to reconfigure the uplink SPS. As part of the block 2110, the eNB 104 may check that the preconfigured adjustment complies, for example, with bearer quality of service (QoS) attributes and/or other policy considerations. In some cases, the eNB 104 may determine to make the preconfigured adjustment. In other cases, the eNB 104 may determine not to make any adjustment. In still other cases, the eNB 104 may determine to make a different adjustment from the preconfigured adjustment. In some embodiments, the block 2110 is optional. In these embodiments, the process 2100 may proceed directly from block 2108 to block 2114.

At decision block 2112, if the eNB 104 determines to reconfigure, the process 2100 proceeds to block 2114. Otherwise, the process 2100 proceeds to block 2120. At block 2120, in some embodiments, the eNB 104 may notify the UE 102 of the no-reconfiguration determination. In other cases, the block 2120 can be omitted such that the process 2100 ends after the no-reconfiguration determination.

At block 2114, the eNB 104 reconfigures the uplink SPS as determined at the block 2110. At block 2116, the eNB 104 notifies the UE 102 of the reconfigured uplink SPS via, for example, scheduling signaling as described above. At block 2118, the UE 102 and the eNB 104 implement the reconfigured uplink SPS. For example, the UE 102 may transmit uplink packets to the eNB 104 according to the reconfigured uplink SPS.

Figure 22:
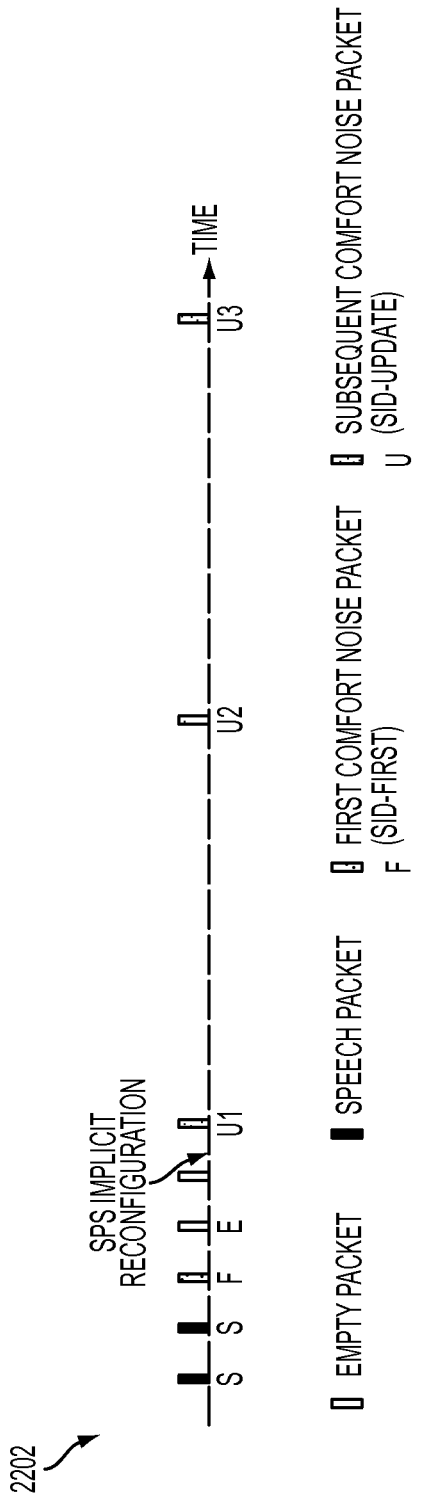
FIG. 22 illustrates an example of a timeline for implicit reconfiguration of uplink SPS.

FIG. 22 illustrates an example of a timeline 2202 for implicit reconfiguration of uplink SPS. The timeline 2202 depicts a transition from a talk spurt to a silence interval in the fashion described above. For purposes of illustration, the timeline 2202 assumes that an implicit-reconfiguration parameter of an active uplink SPS is set to two. As shown, after transmission of two empty packets by a UE such as the UE 102, the active uplink SPS is implicitly reconfigured via a process similar to the process 2100 of FIG. 21. For example, an eNB such as the eNB 104 can perform a preconfigured adjustment for the silence interval. The preconfigured adjustment can be contained within reconfiguration settings (e.g., a configuration profile) as described above.

XIII. Examples of Uplink SPS Reconfiguration Combinations

It should be appreciated that various embodiments of uplink SPS reconfiguration as described above can be combined. In an example, at a transition instance in which the UE 102 would like to reconfigure based on one of two alternative sets of reconfiguration settings (e.g., configuration profiles), toggling as described with respect to FIG. 13 can be used. As an alternative, in some embodiments, index signaling using a reserved bit R as described with respect to FIG. 14 can be used. As another alternative, in some embodiments, implicit uplink SPS reconfiguration can be initiated as described with respect to FIG. 21 (e.g., for a transition from a talk spurt to a silence interval). According to this example, if the UE 102 would like to reconfigure the SPS differently than specified, for example, in the two alternative sets of reconfiguration settings, explicit signaling to indicate a different set of reconfiguration settings can be used. Alternatively, the UE 102 can explicitly indicate actual values, for example, for a time-interval parameter, a packet-size profile, and/or a starting subframe, in an SPS reconfiguration request as described above.

By way of illustration, assume that the vocoder 108 implements the AMR-WB codec such that semiPersistSchedIntervalUL_0=20 and semiPersistSchedIntervalUL_1=160. In transitions from talk spurts to silence intervals, the transitional spacing may be, for example, either 60 ms or 160 ms. In a first case, the UE 102 may be informed via the AMR-WB codec of the occurrence of a first comfort-noise packet. In a second case, the UE 102 itself may determine, for example, via the UE-side reconfiguration component, the start of a silence interval without assistance from the AMR-WB codec. In the first case, a default value for Starting_SF_UL may be 60. In the second case, a default value for Starting_SF_UL is 160. In either case, in certain embodiments, the value of Starting_SF_UL does not need to be explicitly signaled when transitioning from talk spurts to silence intervals.

XIV. Example of Downlink SPS Reconfiguration

In various embodiments downlink SPS reconfiguration can occur in a manner similar to that described above with respect to uplink SPS reconfiguration. Examples will be described below.

Figure 23:
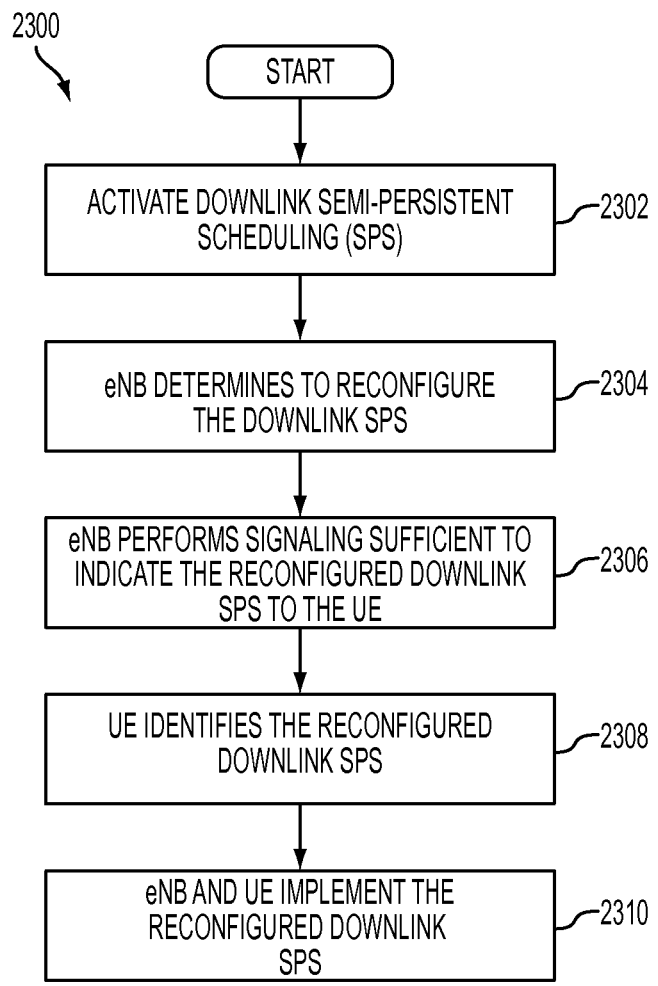
FIG. 23 illustrates an example of a process for performing downlink SPS reconfiguration.

FIG. 23 illustrates an example of a process 2300 for performing downlink SPS reconfiguration. The process 2300 can be implemented by any system that can process data and send/receive signals. For example, the process 2300, in whole or in part, can be implemented by one or more of the UE 102, the eNB 104, the UE 300, the UE 402, the eNB 406, the UE-side scheduler component 110, the UE-side reconfiguration component 114, the UE-side reconfiguration settings component 120, the eNB-side reconfiguration component 118, and/or the eNB-side reconfiguration settings component 126. The process 2300 can also be performed generally by the wireless communication system 100. Although any number of systems, in whole or in part, can implement the process 2300, to simplify discussion, the process 2300 will be described in relation to the UE 102 and/or the eNB 104, as appropriate.

At block 2302, downlink SPS is activated. In certain embodiments, the downlink SPS can be activated via, for example, two signaling steps. First, the eNB 104 can send an SPS configuration to the UE 102 via RRC signaling (e.g., at the RRC sublayer 516). Second, the eNB 104 can send scheduling signaling (e.g., downlink control information (DCI) format 0) on a control channel (e.g., PDCCH, ePDCCH, etc.). The scheduling information can include, for example, a RBA and an MCS. In some embodiments, to indicate that this is not a regular DCI format 0 but rather one for SPS, the signaling can be addressed to an SPS Cell Radio Network Temporary Identifier (C-RNTI) of the UE 102 using, for example, specific bit patterns. A first SPS downlink transmission can be specified to begin at subframe n. The downlink SPS can include, for example, a time-interval parameter (e.g., semiPersistSchedIntervalDL).

At block 2304, the eNB 104 determines to reconfigure the downlink SPS. In typical embodiments, the block 2304 involves the eNB 104 identifying an adjustment to one or more configuration parameters of the downlink SPS. The configuration parameter can be a time-interval parameter, a packet size accommodated by the RBA and the MCS, and/or the like. In certain embodiments, the block 2304 can include the eNB 104 monitoring a VoIP coding and communicating process such as the process 200 for intervals, packet sizes, and transition spacing of downlink transmissions.

At block 2306, the eNB 104 performs signaling sufficient to indicate a reconfigured downlink SPS to the UE 102. In particular, the signaling can include information sufficient to identify the adjustment. In various embodiments, the request may include information sufficient to identify a new time-interval parameter, a new packet-size profile, a starting subframe for the SPS reconfiguration, a combination of same, and/or the like.

In general, the new time-interval parameter, the new packet-size profile, and/or the starting subframe can be expressed in any form described above with respect to uplink SPS reconfiguration. For example, each can be expressly indicated via values, indirectly indicted by indices to a corresponding preconfigured array or table, and/or the like. More particularly, each can be represented in downlink SPS reconfiguration settings that are similar to uplink SPS reconfiguration settings described above with respect to Tables 3-12. Additionally, downlink SPS reconfiguration settings can be established and exchanged as described above with respect to uplink SPS reconfiguration settings (see description of FIGS. 16-20).

At block 2308, the UE 102 identifies the reconfigured downlink SPS based, at least in part, on the signaling. The block 2308 can include the UE 102 accessing downlink reconfiguration settings stored in memory thereof. At block 2310, the UE 102 and the eNB 104 implement the reconfigured downlink SPS. For example, the eNB 104 may transmit downlink packets to the UE 102 according to the reconfigured downlink SPS.

XV. Example of CSR Optimization

In certain embodiments, an eNB such as the eNB 104 can improve downlink scheduling decisions by optimizing when each UE such as the UE 102 sends a CSR. Each CSR can include, for example, a CQI that indicates a MCS recommended by the UE, a PMI that specifies a downlink precoder matrix recommended by the UE, a RI that specifies a number of layers that should be used for downlink transmission, and/or other suitable information. In some embodiments, the CSRs can assist the eNB 104 in downlink scheduling decisions such as, for example, what resource blocks and MCS to allocate to the UE 102. In many cases, the eNB 104 may follow a latest recommendation from the UE 102. In other cases, the eNB 104 may override the recommendation of the UE 102 based on other considerations.

In certain embodiments, the reporting component 116 can generate and initiate transmission of CSRs at a periodic interval. As described below, the eNB 104 may configure CSR parameters such as the periodic interval, or periodicity, at which the UE 102 sends the CSR (e.g. send every N subframes) and an offset (e.g. start sending at subframe M). In certain embodiments, the CSR parameters can be configured by the eNB 104 using the radio resource control (RRC) protocol. More particularly, the eNB 104 can instruct the reporting component 116 of the UE 102 to send a CSR a preconfigured time before a scheduled downlink transmission. In certain embodiments, the eNB 104 can reconfigure the CSR parameters each time downlink SPS configuration results in a modified time-interval parameter. In this fashion, the eNB 104 can minimize wasted CSRs and ensure that latest possible information is available before each downlink transmission.

Figure 24:
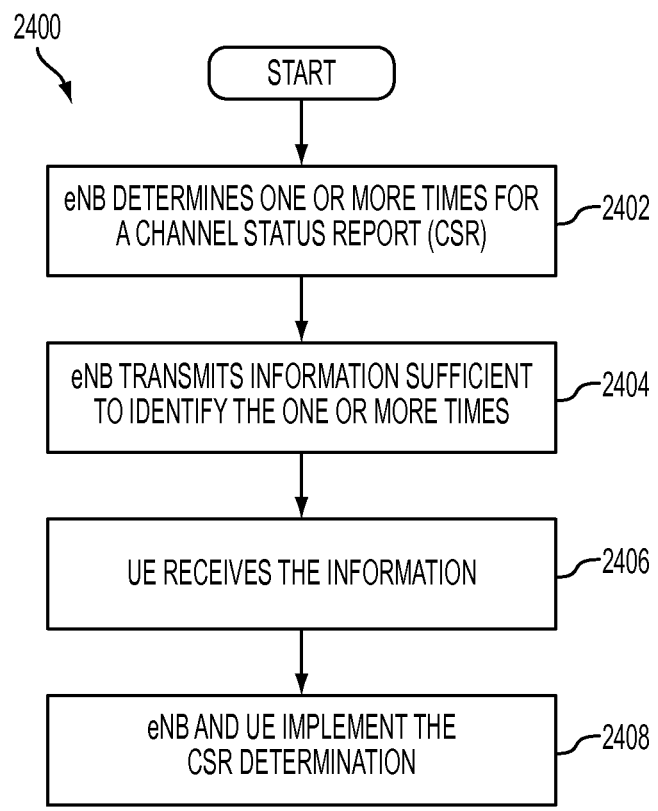
FIG. 24 illustrates an example of a process for performing CSR optimization.

FIG. 24 illustrates an example of a process 2400 for performing CSR optimization. The process 2400 can be implemented by any system that can process data and send/receive signals. For example, the process 2400, in whole or in part, can be implemented by one or more of the UE 102, the eNB 104, the UE 300, the UE 402, the eNB 406, the UE-side scheduler component 110, the UE-side reconfiguration component 114, the UE-side reconfiguration settings component 120, the eNB-side reconfiguration component 118, and/or the eNB-side reconfiguration settings component 126. The process 2400 can also be performed generally by the wireless communication system 100. Although any number of systems, in whole or in part, can implement the process 2400, to simplify discussion, the process 2400 will be described in relation to the UE 102 and/or the eNB 104, as appropriate.

At block 2402, the eNB 104 determines one or more times when the UE 102 should send a CSR based, at least in part, on a modified time-interval parameter. In various embodiments, the modified time interval parameter may be a result of a process such as the process 2300. In certain embodiments, the block 2402 can include determining a CSR configuration that can include CSR parameters such as a periodic interval, or periodicity, at which the UE 102 sends the CSR (e.g., send every N subframes) and an offset (e.g., start sending at subframe M). In an example, the eNB 104 may configure the periodic interval and the offset such that: (a) a single CSR will be transmitted by the UE 102 per time interval; and (b) the single CSR will arrive a configurable time before a next downlink packet to the UE 102 (e.g., r subframes before subframe q, 1 subframe before subframe q, etc.).

At block 2404, the eNB 104 transmits information sufficient for the UE 102 to identify the determined one or more times. For example, in some embodiments, the eNB 104 may transmit a CSR configuration to the UE 102. At block 2406, the UE 102 receives the information. At block 2408, the UE 102 and the eNB 104 implement the CSR determination from the block 2402. For example, the block 2408 can include the reporting component 116 of the UE 102 generating and transmitting CSRs according to a CSR configuration. By way of further example, the block 2408 can include the eNB 104 using the CSR in its downlink scheduling decisions.

In various embodiments, CSR reconfiguration can implicitly occur each time a process such as the process 2300 is executed. For example, the eNB 104 can instruct the UE 102 to send a CSR a certain number of subframes (e.g., one) prior to a start of a scheduled downlink packet. Stated somewhat differently, the CSR configurations can be defined relative to the time-interval parameter. In these embodiments, upon each reconfiguration of a time-interval parameter, the UE 102 can recognize, without specific instructions from the eNB 104, a corresponding CSR reconfiguration. Advantageously, such embodiments can result in reduced signaling between the UE 102 and the eNB 104.

Figure 25:
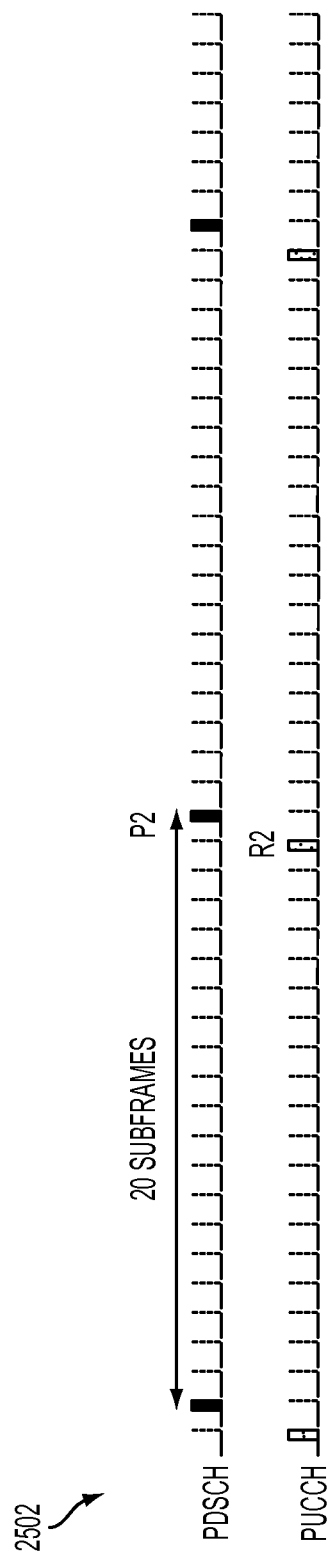
FIG. 25 illustrates an example of a timeline for reporting.

FIG. 25 illustrates an example of a timeline 2502 for reporting. In a typical embodiment, the timeline 2502 can result from a CSR optimization process such as the process 2400 of FIG. 24. In the example of FIG. 25, a report periodicity is set to once per twenty subframes, and an offset is such that a report is received by the eNB 104 one subframe prior to downlink transmission on a Physical Downlink Shared Channel (PDSCH). Based on each received report, the eNB 104 can decide to change a RBA and downlink MCS allocated to the UE 102 without releasing a downlink SPS. Any changed MCS, for example, can be signaled to the UE 102 through scheduling signaling on PDCCH. The new MCS can remain in effect indefinitely (e.g., until further notice, for a remainder of the downlink SPS, etc.).

XVI. Examples of Implicit Downlink SPS Reconfiguration

In certain embodiments, downlink SPS can be designed to be implicitly reconfigured when a eNB such as the eNB 104 triggers an SPS-reconfiguration event. In an example, the implicit-reconfiguration event can be triggered by the eNB transmitting a certain number of consecutive empty packets (e.g., a MAC PDU with no MAC SDU). Particular criteria for the SPS-reconfiguration event (e.g., the certain number of empty packets) can be specified in an implicit-reconfiguration parameter of the downlink SPS. In various embodiments, the implicit-reconfiguration event can be associated with a set of SPS reconfiguration settings (e.g., a configuration profile as described above). In general, the associated reconfiguration settings can be similar to those described with respect to Tables 3-12. In that way, a preconfigured adjustment can occur and be communicated when the eNB triggers the SPS-reconfiguration event.

In an example, a silence-interval configuration profile can be associated with a SPS-reconfiguration event. If the SPS-reconfiguration event is triggered by transmitting a certain number of empty packets as described above, upon a detected transition from a talk spurt to a silence interval in downlink transmissions, the eNB 104 can unambiguously indicate to the UE 102 both the transition and a corresponding SPS reconfiguration by transmitting the certain number of consecutive empty packets (i.e., in downlink transmission opportunities). According to this example, the UE 102 can detect the transmission of the certain number of empty packets as a trigger of the SPS-reconfiguration event and immediately implement the silence-interval configuration profile. An additional example will be described below with respect to FIG. 26.

Figure 26:
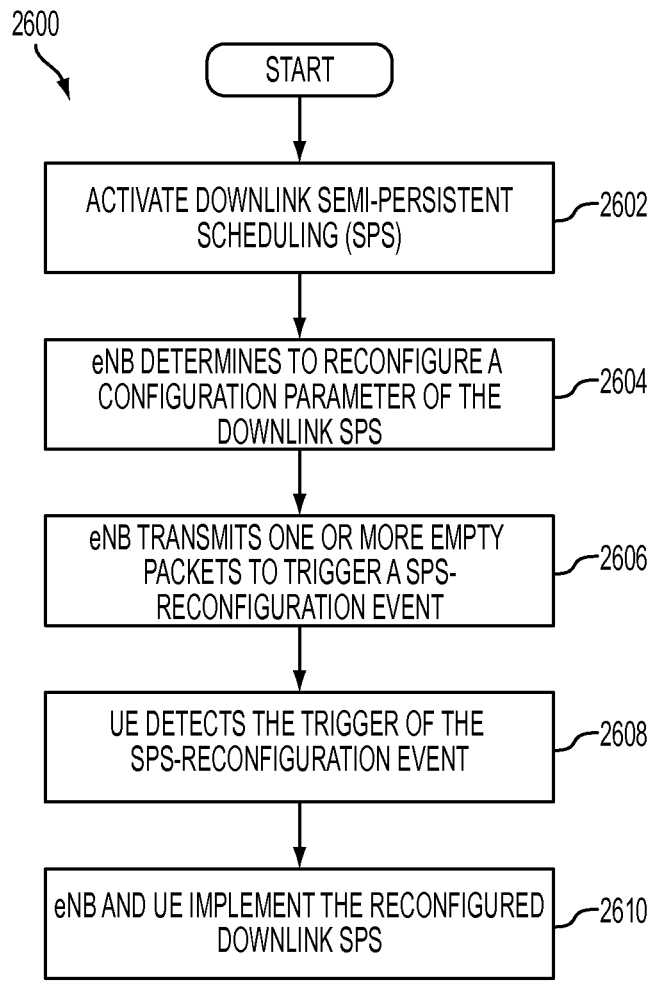
FIG. 26 illustrates an example of a process for performing implicit downlink SPS reconfiguration.

FIG. 26 illustrates an example of a process 2600 for performing implicit downlink SPS reconfiguration. The process 2600 can be implemented by any system that can process data and send/receive signals. For example, the process 2600, in whole or in part, can be implemented by one or more of the UE 102, the eNB 104, the UE 300, the UE 402, the eNB 406, the UE-side scheduler component 110, the UE-side reconfiguration component 114, the UE-side reconfiguration settings component 120, the eNB-side reconfiguration component 118, and/or the eNB-side reconfiguration settings component 126. The process 2600 can also be performed generally by the wireless communication system 100. Although any number of systems, in whole or in part, can implement the process 2600, to simplify discussion, the process 2600 will be described in relation to the UE 102 and/or the eNB 104, as appropriate.

At block 2602, downlink SPS is activated. In certain embodiments, the downlink SPS can be activated via, for example, two signaling steps. First, the eNB 104 can send an SPS configuration to the UE 102 via RRC signaling (e.g., at the RRC sublayer 516). Second, the eNB 104 can send scheduling signaling (e.g., downlink control information (DCI) format 0) on a control channel (e.g., PDCCH, ePDCCH, etc.). The scheduling information can include, for example, a RBA and an MCS. In some embodiments, to indicate that this is not a regular DCI format 0 but rather one for SPS, the signaling can be addressed to an SPS Cell Radio Network Temporary Identifier (C-RNTI) of the UE 102 using, for example, specific bit patterns. A first SPS downlink transmission can be specified to begin at subframe n. The downlink SPS can include, for example, the parameters listed in Table 15 below.

TABLE 15

| Parameter | Description |
| --- | --- |
| Time-Interval Parameter ("semiPersistSchedIntervalUL") | Interval between the periodic transmission opportunities, in units of TTIs. m is set to this |

TABLE 15-continued

| Parameter | Description |
| --- | --- |
| | parameter value |
| Implicit-Reconfiguration Parameter ("implicitReconfigurationAfter") | If there has been no downlink data (e.g., only empty packets) after implicitReconfigurationAfter transmission opportunities, the SPS is reconfigured in a preconfigured manner. |

In particular, Table 15 illustrates inclusion of an implicit-reconfiguration parameter in the downlink SPS. In general, the implicit-reconfiguration parameter can define a trigger for an SPS-reconfiguration event. For example, the implicit-reconfiguration parameter can specify a certain number of consecutive empty packets as described above. In a typical embodiment, the implicit-reconfiguration parameter is associated with a set of reconfiguration settings (e.g., a configuration profile for a silence interval). In certain embodiments, the set of reconfiguration settings can be determined and exchanged in any manner described above with respect to FIGS. 16-20.

At block 2604, the eNB 104 determines to reconfigure a configuration parameter of the downlink SPS. For example, the eNB 104 may identify a transition from a talk spurt to a silence interval. In various embodiments, the block 2604 can include reconfiguring the downlink SPS accordingly. At block 2606, the eNB 104 transmits the certain number of empty packets (e.g., one or more) to trigger the SPS-reconfiguration event. At block 2608, the UE 102 detects the trigger. As described above, the SPS-reconfiguration event is associated with a preconfigured adjustment contained within reconfiguration settings. At block 2610, the UE 102 and the eNB 104 implement the reconfigured downlink SPS. For example, the eNB 104 may transmit downlink packets to the UE 102 according to the reconfigured downlink SPS.

XVII. Examples of Downlink SPS Reconfiguration Combinations

It should be appreciated that various embodiments of downlink SPS reconfiguration can be combined in numerous fashions as described above relative to uplink SPS reconfiguration. In an example, at a transition instance in which the eNB 104 would like to reconfigure based on one of two alternative sets of reconfiguration settings (e.g., configuration profiles), toggling can be used in a manner similar to that which is described with respect to FIG. 13 relative to uplink SPS reconfiguration. As an alternative, in some embodiments, index signaling using a reserved bit R can be used in a manner similar to that which is described with respect to FIG. 14 relative to uplink SPS reconfiguration. As another alternative, in some embodiments, implicit downlink SPS reconfiguration can be initiated as described with respect to FIG. 26 (e.g., for a transition from a talk spurt to a silence interval). According to this example, if the eNB 104 would like to reconfigure the downlink SPS differently than specified, for example, in the two alternative sets of reconfiguration settings, explicit signaling to indicate a different set of reconfiguration settings can be used. Alternatively, the eNB 104 can explicitly indicate actual values, for example, for a time-interval parameter, a packet-size profile, and/or a starting subframe, in scheduling signaling as described above.

In certain embodiments, additional signaling efficiency can be attained when a same codec and/or a same ROHC implementation is used by the eNB 104 for both uplink and downlink. If both uplink and downlink are based on the same codec and ROHC implementation, SPS reconfiguration settings for uplink and downlink can also be the same. For example, assume that the eNB 104 determines downlink SPS reconfiguration settings and transmits the downlink SPS reconfiguration settings to the UE 102. If the UE 102 determines uplink SPS reconfiguration settings that are the same as the downlink SPS reconfiguration settings, in some embodiments, the UE 102 can send only a signaling flag to the eNB 104. In these embodiments, the UE 102 can avoid sending, for example, entire arrays.

Any suitable combination of various embodiments, or the features thereof, is contemplated. For example, any of the devices disclosed herein can include features of other embodiments. Thus, the eNB 104 may have any of the features described herein with respect to the eNB 406 and the UE 102 may have any of the features described herein with respect to the UE 300 and/or the UE 402. As another example, any steps or blocks disclosed in a process herein may be used in other processes described herein. Thus, a block of one of the processes described in FIGS. 7-26 may be used in any of the processes described in these Figures.

In a typical embodiment, the method comprises establishing uplink SPS reconfiguration settings and wherein the uplink SPS reconfiguration settings comprise an array of values for at least one of the following the time-interval parameter and a starting subframe. The establishing comprises receiving proposed uplink SPS reconfiguration settings from the user device, transmitting acceptance of the proposed uplink SPS reconfiguration settings to the user device, and storing the proposed uplink SPS reconfiguration settings in memory, the proposed uplink SPS reconfiguration settings comprising the array of values. Prior to the transmitting of the acceptance, verifying that the proposed uplink SPS reconfiguration settings satisfy at least one quality-of-service criterion.

The establishing comprises observing uplink packets from the user device, inferring the uplink SPS reconfiguration settings based, at least in part, on the observing, transmitting the uplink SPS reconfiguration settings to the user device, and storing the uplink SPS reconfiguration settings in memory. The establishing further comprises accessing preconfigured stored settings based, at least in part, on a codec utilized by the user device and transmitting the preconfigured stored settings to the user device.

In a typical embodiment, the uplink SPS reconfiguration settings comprise an array of configuration profiles, each configuration profile in the array comprising a time-interval-parameter value and a starting-subframe identifier. In a typical embodiment the wireless network comprises a Long Term Evolution (LTE) network and the base station and the user device exchange voice data over the LTE network.

In a typical embodiment, the method further comprises receiving from the user device a subsequent request to reconfigure the already-active uplink SPS, the subsequent request comprising subsequent information related to a subsequent proposed adjustment, reconfiguring the already-active uplink SPS, the reconfiguring comprising newly modifying the time-interval parameter based, at least in part, on the subsequent information, and sending new updated scheduling information to the user device, the new updated scheduling information comprising the newly modified time-interval parameter.

In a typical embodiment, a method comprises, by a user device in a wireless network, identifying a proposed adjustment to a time-interval parameter of already-active uplink semi-persistent scheduling (SPS), wherein the already-active uplink SPS grants the user device a resource block allocation (RBA) and a modulation and coding scheme (MCS) for periodic uplink transmissions, wherein the already-active uplink SPS comprises a time-interval parameter, the time-interval parameter specifying a time interval between the periodic uplink transmissions, and transmitting to a base station a request to reconfigure the already-active uplink SPS, the request comprising information related to the proposed adjustment.

The method further comprises receiving notification of a reconfiguration of the already-active uplink SPS, the reconfiguration comprising a modified time-interval parameter and a starting subframe and sending an uplink transmission pursuant to the reconfiguration, wherein the modified time-interval parameter reflects the proposed adjustment, and wherein the modified time-interval parameter reflects an adjustment that is different from the proposed adjustment.

In a typical embodiment, the method comprises transmitting to the base station a subsequent request to reconfigure the already-active uplink SPS, the subsequent request comprising subsequent information related to a subsequent proposed adjustment and receiving notification of a subsequent reconfiguration of the already-active uplink SPS, the subsequent reconfiguration comprising a newly modified time-interval parameter and a new starting subframe.

In a typical embodiment, the method comprises, prior to the transmitting of the request to reconfigure, sending an uplink-grant request to the base station, receiving an allocation of an uplink grant responsive to the uplink-grant request, wherein the request to reconfigure is transmitted pursuant to the uplink grant, wherein the uplink-grant request is a scheduling request, wherein the uplink-grant request is specified using one or more reserved bits of a header of an uplink packet, wherein the request to reconfigure is specified in at least one of the following portions of a media access control (MAC) protocol data unit (PDU) a reserved bit of a header of the MAC PDU, a control-element field of a payload of the MAC PDU, and a padding field of the payload.

In a typical embodiment, the request to reconfigure is specified in a control-element field of a media access control (MAC) payload, the control-element field identified by a logical channel ID (LCID) value assigned from a set of reserved LCID values and the information related to the proposed adjustment comprises a proposed value of the time-interval parameter, wherein the information related to the proposed adjustment comprises an index to an array of time-interval-parameter values stored in memory on the user device.

In a typical embodiment, the time-interval parameter comprises two possible values, the two possible values comprising a current value and an alternative value and the request comprises a toggle indicator, the toggle indicator comprising the information related to the proposed adjustment, the toggle indicator requesting that the time-interval parameter be toggled to the alternative value, wherein one of the two possible values corresponds to a talk spurt and another of the two values corresponds to a silence interval, and wherein the information related to the proposed adjustment identifies a proposed starting subframe.

In a typical embodiment, prior to the transmitting of the request for reconfiguration, sending an uplink transmission pursuant to the already-active uplink SPS, wherein the identifying comprises determining a transition on the user device, wherein the determined transition is selected from the group consisting of a transition from a talk spurt to a silence interval, and a transition from a silence interval to a talk spurt.

In a typical embodiment, establishing uplink SPS reconfiguration settings and the uplink SPS reconfiguration settings comprise an array of values for at least one of the following the time-interval parameter and a starting subframe.

In a typical embodiment, the establishing comprises determining the uplink SPS reconfiguration settings, transmitting the uplink SPS reconfiguration settings to the base station, receiving an acceptance of the uplink SPS reconfiguration settings, and storing the uplink SPS reconfiguration settings in memory. The determining comprises observing intervals and transition spacing at an output of a vocoder resident on the user device, inferring the uplink SPS reconfiguration settings based, at least in part, on the observing, and receiving the uplink SPS reconfiguration settings from a vocoder resident on the user device. The establishing comprises receiving the uplink SPS reconfiguration settings from the base station and storing the uplink SPS reconfiguration settings in memory. The uplink SPS reconfiguration settings comprise an array of configuration profiles, each configuration profile in the array comprising a time-interval-parameter value and a starting-subframe identifier. The wireless network comprises a Long Term Evolution (LTE) network and the base station and the user device exchange voice data over the LTE network.

In a typical embodiment a method comprises, by a base station in a wireless network, receiving from a user device a request to reconfigure already-active uplink semi-persistent scheduling (SPS) to accommodate at least one packet-size change, wherein the already-active uplink SPS comprises a modulation and coding scheme (MCS) and a resource block allocation (RBA) for periodic uplink transmissions, wherein the request comprises information related to a size of each of one or more future uplink packets, and reconfiguring the already-active uplink SPS, the reconfiguring comprising modifying at least one of the RBA and the MCS to accommodate at least a next packet of the one or more future uplink packets. Prior to the reconfiguring, determining whether to reconfigure the already-active uplink SPS responsive to the request, notifying the user device of the modified at least one of the RBA and the MCS, and receiving from the user device an uplink transmission pursuant to the reconfigured already-active uplink SPS.

In a typical embodiment, the one or more future uplink packets comprise a plurality of packets of non-uniform size, reconfiguring the already-active uplink SPS without further request from the user device, the reconfiguring comprising newly modifying at least one of the RBA and the MCS to accommodate a subsequent packet of the one or more future uplink packets, and notifying the user device of the newly modified at least one of the RBA and the MCS. The information comprises the size of each of the one or more future uplink packets. The information comprises an index to a particular packet-size profile in an array of packet-size profiles stored in memory on the base station, wherein the modifying comprises accommodating at least a next packet of the particular packet-size profile, wherein the request specifies the index in a reserved bit of a media access control (MAC) header. The particular packet-size profile comprise a range of packet sizes and the modifying comprising accommodating the range of packet sizes.

In a typical embodiment, the method further comprises receiving a packet-size-override request relative to the particular packet-size profile, the packet-size-override request comprising an override size and a specified number of packets, reconfiguring the already-active uplink SPS, the reconfiguring comprising modifying at least one of the RBA and the MCS to accommodate the override size for the specified number of packets, and reconfiguring the already-active uplink SPS after the specified number of packets, the reconfiguring comprising modifying at least one of the RBA and the MCS to accommodate at least a next packet of the particular packet-size profile. The information comprises an index to a particular packet-size profile in an array of packet-size profiles stored in memory on the base station, a packet-size-override request relative to the particular packet-size profile, the packet-size-override request comprising an override size and a specified number of packets, and wherein the modifying comprises accommodating the override size for the specified number of packets.

In a typical embodiment, the already-active uplink SPS comprises a time-interval parameter, the time-interval parameter specifying a time interval between the periodic uplink transmissions, wherein the request comprises information related to a proposed adjustment of the time-interval parameter, and wherein the reconfiguring comprises modifying the time-interval parameter based, at least in part, on the information related to the proposed adjustment. The request specifies an index to a particular configuration profile in an array of configuration profiles stored in memory on the base station, the index is the information related to the proposed adjustment of the time-interval parameter and the information related to the size of each of the one or more future uplink packets, the particular configuration profile comprises a packet-size profile and a time-interval-parameter value, the modifying of the at least one of the RBA and the MCS comprises accommodating at least a next packet of the packet-size profile, and the modifying of the time-interval parameter comprises setting the time-interval parameter to the time-interval-parameter value. The already-active uplink SPS toggles between two packet-size profiles, the two packet-size profiles comprising a current packet-size profile and an alternative packet-size profile, wherein the information comprises a toggle indicator, and the modifying comprises accommodating at least a next packet of the alternative packet-size profile. One of the two packet-size profiles corresponds to a talk spurt and another of the two packet-size profiles corresponds to a silence interval.

In a typical embodiment, the method further comprises receiving a packet-size-override request relative to a packet-size profile, the packet-size-override request comprising an override size and a number of packets. The request to reconfigure is responsive to at least one of the following a determined change in Robust Header Compression (ROHC) state, a determined change in ROHC mode, a determined transition from a talk spurt to a silence interval, and a determined transition from a silence interval to a talk spurt. The request to reconfigure is responsive to a codec-related packet fluctuation.

In a typical embodiment, prior to the receiving of the request for reconfiguration, receiving an uplink transmission pursuant to the already-active uplink SPS and prior to the reconfiguring, verifying that the request for reconfiguration satisfies at least one quality-of-service criterion. The method further comprises establishing uplink SPS reconfiguration settings and wherein the uplink SPS reconfiguration settings comprise an array of packet-size profiles.

The establishing comprises receiving proposed uplink SPS reconfiguration settings from the user device, verifying that the proposed uplink SPS reconfiguration settings satisfy at least one quality-of-service criterion, responsive to successful verification, transmitting acceptance of the proposed uplink SPS reconfiguration settings to the user device, storing the proposed uplink SPS reconfiguration settings, the proposed uplink SPS reconfiguration settings comprising the array of packet-size profiles, observing uplink packets from the user device, inferring the uplink SPS reconfiguration settings based, at least in part, on the observing, transmitting the uplink SPS reconfiguration settings to the user device, storing the uplink SPS reconfiguration settings in memory, accessing preconfigured stored settings based, at least in part, on a codec utilized by the user device, and transmitting the preconfigured stored settings to the user device.

In a typical embodiment, the uplink SPS reconfiguration settings comprise an array of configuration profiles, each configuration profile in the array comprising a time-interval-parameter value, a packet-size profile, starting-subframe identifier. The wireless network comprises a Long Term Evolution (LTE) network and the base station and the user device exchange voice data over the LTE network.

In a typical embodiment, a method comprising, by a user device in a wireless network, determining at least one packet-size change in one or more future uplink packets, transmitting to a base station a request to reconfigure already-active uplink SPS to accommodate the at least one packet-size change, wherein the already-active uplink SPS comprises a modulation and coding scheme (MCS) and a resource block allocation (RBA) for periodic uplink transmissions, and wherein the request comprises information related to a size of each of one or more future uplink packets. The method further comprises receiving notification of a reconfiguration of the already-active uplink SPS, the reconfiguration comprising at least one of a modified RBA and a modified MCS, sending an uplink transmission pursuant to the reconfiguration, wherein the one or more future uplink packets comprise a plurality of packets of non-uniform size, and receiving notification of a subsequent reconfiguration of the already-active uplink SPS without further request from the user device, the subsequent reconfiguration comprising at least one of a newly modified RBA and a newly modified MCS to accommodate a subsequent packet of the one or more future uplink packets. In a typical embodiment, the information comprises the size of each of the one or more future uplink packets.

In a typical embodiment, the information comprises an index to a particular packet-size profile in an array of packet-size profiles stored in memory on the user device and receiving notification of a reconfiguration of the already-active uplink SPS, the reconfiguration comprising at least one of a modified RBA and a modified MCS that are based, at least in part, on the particular packet-size profile. The request specifies the index in a reserved bit of a media access control (MAC) header. The particular packet-size profile comprise a range of packet sizes and the at least one of a modified RBA and a modified MCS is based, at least in part, on the range of packet sizes.

In a typical embodiment, the method further comprises transmitting a packet-size-override request relative to the particular packet-size profile, the packet-size-override request comprising an override size and a specified number of packets, receiving notification of a reconfiguration of the already-active uplink SPS, the reconfiguration comprising at least one of a modified RBA and a modified MCS that is based, at least in part, on the packet-size-override request, and after the specified number of packets, receiving notification of a reconfiguration of the already-active uplink SPS, the reconfiguration comprising at least one of a newly modified RBA and a newly modified MCS.

The information comprises an index to a particular packet-size profile in an array of packet-size profiles stored in memory on the base station, a packet-size-override request relative to the particular packet-size profile, the packet-size-override request comprising an override size and a specified number of packets, and receiving notification of a reconfiguration of the already-active uplink SPS, the reconfiguration comprising at least one of a modified RBA and a modified MCS that is based, at least in part, on the packet-size-override request. The already-active uplink SPS comprises a time-interval parameter, the time-interval parameter specifying a time interval between the periodic uplink transmissions, wherein the request comprises information related to a proposed adjustment of the time-interval parameter, and receiving notification of a reconfiguration of the already-active uplink SPS, the reconfiguration comprising a modified time-interval parameter and at least one of a modified RBA and a modified MCS.

In a typical embodiment, the request specifies an index to a particular configuration profile in an array of configuration profiles stored in memory on the user device, the index is the information related to the proposed adjustment of the time-interval parameter and the information related to the size of each of the one or more future uplink packets, and the particular configuration profile comprises a packet-size profile and a time-interval-parameter value. The already-active uplink SPS toggles between two packet-size profiles, the two packet-size profiles comprising a current packet-size profile and an alternative packet-size profile, wherein the information comprises a toggle indicator, and receiving notification of a reconfiguration to the already-active uplink SPS, the reconfiguration comprising at least one of a modified RBA and a modified MCS that is based, at least in part, on the alternative packet-size profile. One of the two packet-size profiles corresponds to a talk spurt and another of the two packet-size profiles corresponds to a silence interval.

In a typical embodiment, the method further comprises transmitting to the base station a packet-size-override request relative to a packet-size profile, the packet-size-override request comprising an override size and a number of packets. The determining comprises determining a transition on the user device and the determined transition is selected from the group consisting of a determined change in Robust Header Compression (ROHC) state and a determined change in ROHC mode.

In a typical embodiment, the determined transition is selected from the group consisting of a determined transition from a talk spurt to a silence interval and a determined transition from a silence interval to a talk spurt. The determined transition comprises a codec-related packet fluctuation. Prior to the transmitting of the request for reconfiguration, sending an uplink transmission pursuant to the already-active uplink SPS and wherein the one or more future uplink packets relate to voice data.

In a typical embodiment, the method further comprises establishing uplink SPS reconfiguration settings and wherein the uplink SPS reconfiguration settings comprise an array of packet-size profiles. The establishing comprises determining the uplink SPS reconfiguration settings, transmitting the uplink SPS reconfiguration settings to the base station, receiving an acceptance of the uplink SPS reconfiguration settings, and storing the uplink SPS reconfiguration settings in memory. The determining comprises observing packet sizes at an output of a vocoder resident on the user device, inferring the uplink SPS reconfiguration settings based, at least in part, on the observing, and receiving the uplink SPS reconfiguration settings from a vocoder resident on the user device. The establishing comprises receiving the uplink SPS reconfiguration settings from the base station and storing the uplink SPS reconfiguration settings in memory. The uplink SPS reconfiguration settings comprise an array of configuration profiles, each configuration profile in the array comprising a packet-size profile, a time-interval-parameter value, and a starting-subframe identifier. In a typical embodiment, the wireless network comprises a Long Term Evolution (LTE) network and the base station and the user device exchange voice data over the LTE network.

In a typical embodiment, a method comprising, by a base station in a wireless network, detecting a trigger, by a user device subject to already-active uplink semi-persistent scheduling (SPS), of a SPS-reconfiguration event, wherein the already-active uplink SPS grants the user device a resource block allocation (RBA) and a modulation and coding scheme (MCS) for periodic uplink transmissions, wherein the already-active uplink SPS comprises a time-interval parameter, the time-interval parameter specifying a time interval between the periodic uplink transmissions, wherein the detected trigger comprises transmission by the user device of one or more empty packets, wherein the SPS-reconfiguration event is associated with a preconfigured adjustment to at least one configuration parameter of the already-active uplink SPS, and reconfiguring the already-active uplink SPS based, at least in part, on the preconfigured adjustment. The already-active uplink SPS comprises an implicit-reconfiguration parameter that specifies a number of the one or more empty packets. Each empty packet comprises a media access control (MAC) protocol data unit (PDU) with no MAC service data unit (SDU).

In a typical embodiment, the method comprising, prior to the detecting, establishing uplink SPS reconfiguration settings and wherein the uplink SPS reconfiguration settings specify the preconfigured adjustment. The establishing comprises receiving proposed uplink SPS reconfiguration settings from the user device, transmitting acceptance of the proposed uplink SPS reconfiguration settings to the user device, and storing the proposed uplink SPS reconfiguration settings in memory. Prior to the transmitting of the acceptance, verifying that the proposed uplink SPS reconfiguration settings satisfy at least one quality-of-service criterion.

The establishing comprises observing uplink packets from the user device, inferring the uplink SPS reconfiguration settings based, at least in part, on the observing, transmitting the uplink SPS reconfiguration settings to the user device, and storing the uplink SPS reconfiguration settings in memory.

The establishing comprises accessing preconfigured stored settings based, at least in part, on a codec utilized by the user device and transmitting the preconfigured stored settings to the user device. The uplink SPS reconfiguration settings comprise an array of configuration profiles, each configuration profile in the array comprising one or more of a packet-size profile, a time-interval-parameter value, and a starting-subframe identifier, wherein the SPS reconfiguration event is responsive to a determined transition on the user device, wherein the determined transition comprises a transition from a talk spurt to a silence interval, wherein the preconfigured adjustment relates to a packet size accommodated by the reconfigured already-active uplink SPS, and wherein the preconfigured adjustment comprises a modification to the time-interval parameter. The method further comprising, prior to the reconfiguring, verifying that the preconfigured adjustment satisfies at least one quality-of-service criterion.

In a typical embodiment, a method comprising, by a user device in a wireless network, identifying at least one configuration parameter of already-active uplink semi-persistent scheduling (SPS) for adjustment, wherein the already-active uplink SPS grants the user device a resource block allocation (RBA) and a modulation and coding scheme (MCS) for periodic uplink transmissions, wherein the already-active uplink SPS comprises a time-interval parameter, the time-interval parameter specifying a time interval between the periodic uplink transmissions, responsive to the identifying, triggering a SPS-reconfiguration event, the triggering comprising transmitting to a base station one or more empty packets, and wherein the SPS-reconfiguration event is associated with a preconfigured adjustment to the at least one configuration parameter.

The already-active uplink SPS comprises an implicit-reconfiguration parameter that specifies a number of the one or more empty packets. Each empty packet comprises a media access control (MAC) protocol data unit (PDU) with no MAC service data unit (SDU).

In a typical embodiment, the method further comprising, prior to the identifying establishing uplink SPS reconfiguration settings and wherein the uplink SPS reconfiguration settings specify the preconfigured adjustment. The establishing comprises determining the uplink SPS reconfiguration settings, transmitting the uplink SPS reconfiguration settings to the base station, receiving an acceptance of the uplink SPS reconfiguration settings, and storing the uplink SPS reconfiguration settings in memory. The determining comprises observing packet sizes at an output of a vocoder resident on the user device and inferring the uplink SPS reconfiguration settings based, at least in part, on the observing. The determining comprises receiving the uplink SPS reconfiguration settings from a vocoder resident on the user device. The establishing comprises receiving the uplink SPS reconfiguration settings from the base station and storing the uplink SPS reconfiguration settings in memory.

In a typical embodiment, the uplink SPS reconfiguration settings comprise an array of configuration profiles, each configuration profile in the array comprising one or more of a packet-size profile, a time-interval-parameter value, and a starting-subframe identifier. The wireless network comprises a Long Term Evolution (LTE) network and the base station and the user device exchange voice data over the LTE network. The identifying comprises determining a transition on the user device, wherein the determined transition comprises a transition from a talk spurt to a silence interval, wherein the preconfigured adjustment wherein the preconfigured adjustment relates to a packet size accommodated by the already-active uplink SPS, and wherein the preconfigured adjustment comprises a modification to the time-interval parameter.

In a typical embodiment, a method comprising, by a base station in a wireless network, responsive to a reconfiguration determination, reconfiguring already-active downlink semi-persistent scheduling (SPS) to accommodate a plurality of non-uniformly-sized future downlink packets, wherein the already-active downlink SPS grants a user device a resource block allocation (RBA) and a modulation and coding scheme (MCS) for periodic downlink transmissions, wherein the already-active downlink SPS comprises a time-interval parameter, the time-interval parameter specifying a time interval between the periodic downlink transmissions, and sending to the user device a notification of the reconfigured already-active downlink SPS, the notification comprising information related to a size of each of the plurality of non-uniformly-sized future downlink packets.

In a typical embodiment, the method further comprises transmitting to the user device a downlink transmission pursuant to the reconfigured already-active downlink SPS, wherein the information comprises the size of each of the plurality of non-uniformly-sized future downlink packets, wherein the information comprises an index to a particular packet-size profile in an array of packet-size profiles stored in memory on the base station, wherein the reconfiguring comprises modifying at least one of the RBA and the MCS to accommodate at least a next packet of the particular packet-size profile, and wherein the notification specifies the index in a reserved bit of a media access control (MAC) header. The particular packet-size profile comprise a range of packet sizes and the modifying comprising modifying the at least one of the RBA and the MCS to accommodate the range of packet sizes.

In a typical embodiment, the method further comprises reconfiguring the already-active downlink SPS to accommodate a packet-size override relative to the particular packet-size profile, wherein the packet-size override comprises an override size for a specified number of packets, wherein the reconfiguring comprises modifying at least one of the RBA and the MCS to accommodate the override size, and notifying the user device of the packet-size override. Reconfiguring the already-active downlink SPS after the specified number of packets, the reconfiguring comprising modifying at least one of the RBA and the MCS to accommodate at least a next packet of the particular packet-size profile, wherein the notification comprises information related to a proposed adjustment of the time-interval parameter and the reconfiguring of the already-active downlink SPS comprises modifying at least one of the RBA and the MCS to accommodate at least a next packet of the plurality of non-uniformly-sized future downlink packets and modifying the time-interval parameter based, at least in part, on the information related to the proposed adjustment.

The notification specifies an index to a particular configuration profile in an array of configuration profiles stored in memory on the base station, the index is the information related to the proposed adjustment of the time-interval parameter and the information related to the size of each of the plurality of non-uniformly-sized future downlink packets, the particular configuration profile comprises a packet-size profile and a time-interval-parameter value, the modifying of the at least one of the RBA and the MCS comprises accommodating at least a next packet of the packet-size profile, and the modifying of the time-interval parameter comprises setting the time-interval parameter to the time-interval-parameter value. The already-active downlink SPS toggles between two packet-size profiles, the two packet-size profiles comprising a current packet-size profile and an alternative packet-size profile, wherein the information comprises a toggle indicator, and the reconfiguring comprises modifying at least one of the RBA and the MCS to accommodate at least a next packet of the alternative packet-size profile. One of the two packet-size profiles corresponds to a talk spurt and another of the two packet-size profiles corresponds to a silence interval.

In a typical embodiment, the reconfiguration determination is responsive to at least one of the following a determined change in Robust Header Compression (ROHC) state, a determined change in ROHC mode, a determined transition from a talk spurt to a silence interval, a determined transition from a silence interval to a talk spurt, and wherein the reconfiguration determination is responsive to a codec-related packet fluctuation. Prior to the reconfiguration determination, transmitting a downlink transmission pursuant to the already-active downlink SPS. The method further comprises establishing downlink SPS reconfiguration settings and wherein the downlink SPS reconfiguration settings comprise an array of packet-size profiles.

The establishing comprises receiving proposed downlink SPS reconfiguration settings from the user device, verifying that the proposed downlink SPS reconfiguration settings satisfy at least one quality-of-service criterion, responsive to successful verification, transmitting acceptance of the proposed downlink SPS reconfiguration settings to the user device, and storing the proposed downlink SPS reconfiguration settings, the proposed downlink SPS reconfiguration settings comprising the array of packet-size profiles.

The establishing comprises observing downlink packets, inferring the downlink SPS reconfiguration settings based, at least in part, on the observing, transmitting the downlink SPS reconfiguration settings to the user device, storing the downlink SPS reconfiguration settings in memory, accessing preconfigured stored settings, and transmitting the preconfigured stored settings to the user device. The downlink SPS reconfiguration settings comprise an array of configuration profiles, each configuration profile in the array comprising a time-interval-parameter value, a packet-size profile, starting-subframe identifier, wherein the wireless network comprises a Long Term Evolution (LTE) network and the base station and the user device exchange voice data over the LTE network.

In a typical embodiment, a method comprising, by a user device in a wireless network, receiving from a base station a notification of reconfigured downlink semi-persistent scheduling (SPS), wherein the reconfigured downlink SPS reconfigures already-active downlink SPS to accommodate a plurality of non-uniformly-sized future downlink packets, wherein the already-active downlink SPS grants the user device a resource block allocation (RBA) and a modulation and coding scheme (MCS) for periodic downlink transmissions, wherein the already-active downlink SPS comprises a time-interval parameter, the time-interval parameter specifying a time interval between the periodic downlink transmissions, wherein the notification comprises information related to a size of each of the plurality of non-uniformly-sized future downlink packets, and implementing the reconfigured downlink SPS. The implementing comprising receiving a downlink transmission pursuant to the reconfigured downlink SPS.

In a typical embodiment, the method further comprises receiving notification of a subsequent reconfiguration of the already-active downlink SPS, the subsequent reconfiguration comprising at least one of a newly modified RBA and a newly modified MCS to accommodate a subsequent packet of the plurality of non-uniformly-sized future downlink packets, wherein the information comprises the size of each of the plurality of non-uniformly-sized future downlink packets, wherein the information comprises an index to a particular packet-size profile in an array of packet-size profiles stored in memory on the user device, wherein the reconfiguration comprises at least one of a modified RBA and a modified MCS that is based, at least in part, on the particular packet-size profile, wherein the notification specifies the index in a reserved bit of a media access control (MAC) header, wherein the particular packet-size profile comprise a range of packet sizes and wherein the modified at least one of the RBA and the MCS accommodates the range of packet sizes.

In a typical embodiment, the notification comprises information related to a modified time-interval parameter, the notification specifies an index to a particular configuration profile in an array of configuration profiles stored in memory on the user device, the index is the information related to the modified time-interval parameter and the information related to the size of each of the plurality of non-uniformlysized future downlink packets, and the particular configuration profile comprises a packet-size profile and a time-interval-parameter value.

In a typical embodiment, the method further comprises, prior to the receiving of the notification, receiving a downlink transmission pursuant to the already-active downlink SPS. Receiving downlink SPS reconfiguration settings from the base station and storing the downlink SPS reconfiguration settings in memory. The downlink SPS reconfiguration settings comprise an array of configuration profiles, each configuration profile in the array comprising a packet-size profile, a time-interval-parameter value, and a starting-subframe identifier and wherein the wireless network comprises a Long Term Evolution (LTE) network and the base station and the user device exchange voice data over the LTE network.

In a typical embodiment, a method comprising, by a base station in a wireless network, responsive to a reconfiguration determination, reconfiguring already-active downlink semi-persistent scheduling (SPS), the reconfiguring comprising modifying a time-interval parameter of the already-active downlink SPS, wherein the already-active downlink SPS grants a user device a resource block allocation and a modulation and coding scheme (MCS) for periodic downlink transmissions, wherein the time-interval parameter specifies a time interval between the periodic downlink transmissions, sending to the user device a notification of the reconfigured already-active downlink SPS, determining one or more times when the user device should send a channel status report (CSR) to the base station based, at least in part, on the modified time-interval parameter, and transmitting to the user device information sufficient to identify the determined one or more times.

In a typical embodiment, the determining comprises determining a CSR configuration based, at least in part, on the modified time-interval parameter, the CSR configuration specifies, in terms of the modified time-interval parameter, when the user device should send a CSR to the base station, the CSR configuration comprising a periodic interval and an offset, and the transmitting comprises transmitting to the user device information sufficient to identify the CSR configuration. The method further comprises receiving a CSR pursuant to the determined one or more times and making a scheduling decision based, at least in part, on the received CSR.

In a typical embodiment, a method comprising, by a user device in a wireless network, receiving, from a base station, a notification of reconfigured downlink SPS, wherein the reconfigured downlink SPS reconfigures already-active downlink SPS, wherein the already-active downlink SPS grants the user device a resource block allocation (RBA) and a modulation and coding scheme (MCS) for periodic downlink transmissions, wherein the already-active downlink SPS comprises a time-interval parameter, the time-interval parameter specifying a time interval between the periodic downlink transmissions, wherein the reconfigured downlink SPS comprises a modified time-interval parameter, and receiving from the base station information sufficient to identify one or more times at which a channel status report (CSR) should be sent. The information comprises a CSR configuration and the CSR configuration specifies, in terms of the modified time-interval parameter, when the user device should send a CSR to the base station, the CSR configuration comprising a periodic interval and an offset. The method further comprises transmitting a CSR to the base station pursuant to the information.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, by a base station in a wireless network:
   receiving from a user device a request to reconfigure already-active uplink semi-persistent scheduling (SPS);
   wherein the already-active uplink SPS grants the user device a resource block allocation (RBA) and a modulation and coding scheme (MCS) for periodic uplink transmissions;
   wherein the already-active uplink SPS comprises a time-interval parameter, the time-interval parameter specifying a time interval between the periodic uplink transmissions;
   wherein the request comprises information related to a proposed adjustment of the time-interval parameter and the request is specified in at least one of the following portions of a media access control (MAC) protocol data unit (PDU);
   a reserved bit of a header of the MAC PDU;
   a control-element field of a payload of the MAC PDU; and
   a padding field of the payload; and
   reconfiguring the already-active uplink SPS, the reconfiguring comprising modifying the time-interval parameter based, at least in part, on the information.

2. The method of claim 1, comprising notifying the user device of the reconfigured already-active uplink SPS.

3. The method of claim 1, comprising receiving from the user device an uplink transmission pursuant to the reconfigured already-active uplink SPS.

4. The method of claim 1, wherein:
   the reconfiguring comprises establishing a starting subframe; and
   the reconfigured already-active uplink SPS comprises a starting-subframe identifier.

5. The method of claim 1, wherein the modifying comprises performing the proposed adjustment.

6. The method of claim 1, wherein the modifying comprises performing an adjustment that is different from the proposed adjustment.

7. The method of claim 1, comprising sending updated scheduling information to the user device, the updated scheduling information comprising the modified time-interval parameter.

8. The method of claim 1, comprising:
   prior to the receiving of the request to reconfigure:
   receiving an uplink-grant request from the user device; and
   allocating to the user device an uplink grant responsive to the uplink-grant request; and
   wherein the request to reconfigure is received pursuant to the uplink grant.

9. The method of claim 8, wherein the uplink-grant request is a scheduling request.

10. The method of claim 8, wherein the uplink-grant request is specified using one or more reserved bits of a header of an uplink packet.

11. The method of claim 1, wherein the request to reconfigure is specified in a control-element field of a media access control (MAC) payload, the control-element field identified by a logical channel ID (LCID) value assigned from a set of reserved LCID values.

12. The method of claim 1, wherein the information related to the proposed adjustment comprises a proposed value of the time-interval parameter.

13. The method of claim 1, wherein the information related to the proposed adjustment comprises an index to an array of time-interval-parameter values stored in memory on the base station.

14. The method of claim 1, comprising:
   wherein the time-interval parameter comprises two possible values, the two possible values comprising a current value and an alternative value;
   wherein the information related to the proposed adjustment comprises a toggle indicator;
   and reconfiguring the already-active uplink SPS, the reconfiguring comprising toggling the time-interval parameter to the alternative value.

15. The method of claim 14, wherein one of the two possible values corresponds to a talk spurt and another of the two possible values corresponds to a silence interval.

16. The method of claim 1, wherein the information related to the proposed adjustment identifies a proposed starting subframe.

17. The method of claim 1, comprising, prior to the receiving of the request for reconfiguration, receiving an uplink transmission pursuant to the already-active uplink SPS.

18. The method of claim 1, comprising, prior to the reconfiguring, determining whether to reconfigure the already-active uplink SPS responsive to the request.

19. The method of claim 1, wherein the request to reconfigure is responsive to a determined transition on the user device, wherein the determined transition is selected from the group consisting of:
   a transition from a talk spurt to a silence interval; and
   a transition from a silence interval to a talk spurt.

* * * * *